US011738893B2

(12) United States Patent
Curhan et al.

(10) Patent No.: US 11,738,893 B2
(45) Date of Patent: Aug. 29, 2023

(54) PICKING, PLACING, AND SCANNING BAGGED CLOTHING AND OTHER ARTICLES

(71) Applicant: SOFT ROBOTICS, INC., Bedford, MA (US)

(72) Inventors: Jeffrey Curhan, Bedford, MA (US); Brendan Cavanaugh, Bedford, MA (US); William Gunner, Bedford, MA (US)

(73) Assignee: SOFT ROBOTICS, INC., Bedford, MA (US)

( * ) Notice: Subject to any disclaimer, the term of this patent is extended or adjusted under 35 U.S.C. 154(b) by 475 days.

(21) Appl. No.: 16/863,071

(22) Filed: Apr. 30, 2020

(65) Prior Publication Data
US 2020/0346792 A1 Nov. 5, 2020

Related U.S. Application Data

(60) Provisional application No. 62/948,798, filed on Dec. 16, 2019, provisional application No. 62/945,217, (Continued)

(51) Int. Cl.
*B65B 5/08* (2006.01)
*B65G 47/90* (2006.01)
(Continued)

(52) U.S. Cl.
CPC .............. *B65B 5/08* (2013.01); *B25J 15/0023* (2013.01); *B25J 15/0253* (2013.01); *B25J 15/10* (2013.01);
(Continued)

(58) Field of Classification Search
CPC ........ B65B 5/08; B65B 5/105; B25J 15/0023; B25J 15/0253; B25J 15/10; B25J 15/12; B65G 47/90; B65G 47/908
See application file for complete search history.

(56) References Cited

U.S. PATENT DOCUMENTS 3,144,947 A 8/1964 Pittwood
3,343,864 A 9/1967 Baer
(Continued)

FOREIGN PATENT DOCUMENTS

CN 102821918 A 12/2012
EP 0534778 A2 3/1993
(Continued)

OTHER PUBLICATIONS

Falco, J., et al., "Proposed Standard Terminiology for Robotic Hands and Associated Performance Metrics", Draft NIST Special Publication 1229, U.S. Department of Commerce, [online] Oct. 2018 [retrieved on Apr. 28, 2021]. Retrieved from Internet URL: https://doi.org/10.6028/NIST.SP.1229-draft.
(Continued)

*Primary Examiner* — Stephen A Vu
(74) *Attorney, Agent, or Firm* — Goodwin Procter LLP

(57) ABSTRACT

A method for picking polybagged articles includes targeting the polybagged article, placing a multistage gripper adjacent the polybagged article, tenting, pressing on, or suspending the polybagged article from the tenting tool, and gathering the polybagged article with a perimeter gripper.

30 Claims, 60 Drawing Sheets

Related U.S. Application Data filed on Dec. 8, 2019, provisional application No. 62/945,108, filed on Dec. 6, 2019, provisional application No. 62/841,209, filed on Apr. 30, 2019.

(51) Int. Cl.

| | | |
|---|---|---|
| *B65B 5/10* | (2006.01) | |
| *B25J 15/02* | (2006.01) | |
| *B25J 15/00* | (2006.01) | |
| *B25J 15/10* | (2006.01) | |
| *B25J 15/12* | (2006.01) | |

(52) U.S. Cl.
CPC .............. *B25J 15/12* (2013.01); *B65B 5/105* (2013.01); *B65G 47/90* (2013.01); *B65G 47/908* (2013.01)

(56) References Cited

U.S. PATENT DOCUMENTS

| | | | |
|---|---|---|---|
| 3,601,442 | A | 8/1971 | Orndorff |
| 3,640,564 | A | 2/1972 | Kuster |
| 4,114,464 | A | 9/1978 | Schubert et al. |
| 4,636,135 | A | 1/1987 | Bancon |
| 4,850,631 | A | 7/1989 | Dotsko |
| 5,156,081 | A | 10/1992 | Suzumori |
| 5,317,956 | A | 6/1994 | Devenish |
| 5,385,080 | A | 1/1995 | Suzumori |
| 5,568,957 | A | 10/1996 | Haugs |
| 6,178,872 | B1 | 1/2001 | Schulz |
| 6,484,601 | B1 | 11/2002 | Arrichiello |
| 6,718,766 | B2 | 4/2004 | Seto et al. |
| 6,846,029 | B1 | 1/2005 | Ragner et al. |
| 7,794,171 | B2 | 9/2010 | Park et al. |
| 8,251,420 | B2 | 8/2012 | Mizuno et al. |
| 8,880,358 | B2 | 11/2014 | Cunningham |
| 9,144,909 | B2 | 9/2015 | DeLouis et al. |
| 9,314,933 | B2 | 4/2016 | Calisti et al. |
| 9,332,768 | B2 | 5/2016 | Goodyear, Jr. |
| 9,492,930 | B2 | 11/2016 | Galloway |
| 9,506,455 | B2 | 11/2016 | Mazzeo et al. |
| 9,598,192 | B2* | 3/2017 | Yoshikane ............... B65B 3/045 |
| 9,718,195 | B1 | 8/2017 | Youmans |
| 9,790,968 | B2 | 10/2017 | Whitesides et al. |
| 9,797,415 | B2 | 10/2017 | Martinez et al. |
| 9,981,377 | B2 | 5/2018 | Branch et al. |
| 10,087,020 | B1* | 10/2018 | Ruiz .................... B25J 15/0023 |
| 10,118,301 | B2 | 11/2018 | Lessing et al. |
| 10,189,168 | B2 | 1/2019 | Lessing et al. |
| 10,308,038 | B2* | 6/2019 | Hoover ................. B25J 15/0616 |
| 10,357,883 | B1* | 7/2019 | O'Connor ............ B25J 15/0616 |
| 11,110,616 | B2 | 9/2021 | Lessing et al. |
| 2002/0157388 | A1 | 10/2002 | Seto et al. |
| 2003/0032855 | A1 | 2/2003 | Shahinpoor |
| 2004/0103740 | A1 | 6/2004 | Townsend et al. |
| 2004/0199206 | A1 | 10/2004 | Muramatsu |
| 2005/0081711 | A1 | 4/2005 | Kerekes et al. |
| 2005/0218679 | A1 | 10/2005 | Yokoyama et al. |
| 2006/0028041 | A1 | 2/2006 | Ono et al. |
| 2007/0144299 | A1 | 6/2007 | Okazaki |
| 2009/0044655 | A1 | 2/2009 | DeLouis et al. |
| 2011/0136376 | A1 | 6/2011 | Johnson et al. |
| 2011/0148132 | A1 | 6/2011 | Park et al. |
| 2011/0193362 | A1 | 8/2011 | Prahlad et al. |
| 2012/0267055 | A1 | 10/2012 | Rogalla et al. |
| 2012/0325219 | A1 | 12/2012 | Smith |
| 2013/0008546 | A1 | 1/2013 | Haimi |
| 2013/0149079 | A1 | 6/2013 | Ohiso et al. |
| 2013/0183129 | A1 | 7/2013 | Nammoto et al. |
| 2013/0298759 | A1 | 11/2013 | Rotinat-Libersa et al. |
| 2014/0318118 | A1 | 10/2014 | Mazzeo et al. |
| 2015/0151433 | A1 | 6/2015 | Rust et al. |
| 2015/0224326 | A1 | 8/2015 | Toth et al. |
| 2015/0272749 | A1* | 10/2015 | Amend, Jr. ............. A61F 2/588 623/64 |
| 2015/0360372 | A1 | 12/2015 | Schiettecatte et al. |
| 2016/0075036 | A1 | 3/2016 | Lessing et al. |
| 2016/0252110 | A1 | 9/2016 | Galloway et al. |
| 2017/0036355 | A1 | 2/2017 | Lessing et al. |
| 2017/0072572 | A1* | 3/2017 | Wagner .................. B25J 15/065 |
| 2018/0117773 | A1 | 5/2018 | Jentoft et al. |
| 2019/0263002 | A1 | 8/2019 | Herrstrom |

FOREIGN PATENT DOCUMENTS

| | | | |
|---|---|---|---|
| EP | 1319845 | A2 | 6/2003 |
| JP | S4916164 | A | 2/1974 |
| JP | S4916165 | A | 2/1974 |
| JP | S5123956 | B2 | 7/1976 |
| JP | S58500112 | A | 1/1983 |
| JP | S5924310 | B2 | 6/1984 |
| JP | S62213986 | A | 9/1987 |
| JP | H05332325 | A | 12/1993 |
| JP | H08300284 | A | 11/1996 |
| JP | H08300288 | A | 11/1996 |
| JP | H09109077 | A | 4/1997 |
| JP | 2993506 | B2 | 12/1999 |
| JP | 2003343513 | A | 12/2003 |
| JP | 2004181585 | A | 7/2004 |
| JP | 2005333827 | A | 12/2005 |
| JP | 2007222971 | A | 9/2007 |
| JP | 2008012667 | A | 1/2008 |
| JP | 2008073823 | A | 4/2008 |
| JP | 2008100323 | A | 5/2008 |
| JP | 2009166181 | A | 7/2009 |
| JP | 2010264543 | A | 11/2010 |
| JP | 2012055999 | A | 3/2012 |
| JP | 2012148380 | A | 8/2012 |
| JP | 2012166297 | A | 9/2012 |
| JP | 2013519532 | A | 5/2013 |
| JP | 6199494 | B2 | 9/2017 |
| WO | WO-8202872 | A1 | 9/1982 |
| WO | WO-2004000508 | A1 | 12/2003 |
| WO | WO-2012150551 | A1 | 11/2012 |
| WO | WO-2013088733 | A1 | 6/2013 |
| WO | WO-2013103412 | A2 | 7/2013 |
| WO | WO-2014138123 | A1 | 9/2014 |
| WO | WO-2015050852 | A1 | 4/2015 |
| WO | WO-2015102723 | A2 | 7/2015 |

OTHER PUBLICATIONS

"ISO 14539:2000 Manipulating industrial robots—Object handling with grasp-type grippers—Vocabulary and presentation of characteristics" online [retrieved on Apr. 28, 2021]. Retrieved from Internet URL: https://www.iso.org/obp/ui/#iso:std:iso:14539:ed-1:v1:en.
International Search Report and Written Opinion of PCT/US2015/050793 dated Jan. 29, 2016, 9 pages.
International Search Report and Written Opinion of PCT/US2015/061352 dated Mar. 30, 2016, 8 pages.
Extended European Search Report for EP Application No. 21153406.0, dated May 26, 2021, 10 pages.
Tondu, "Modeling and Control of McKibben Artificial Muscle Robot Actuators", IEEE Signal Process Sing Mag, IEEE Service Center 20(2):15-38 (2000). Abstract.
Stokes et al., "A Hybrid Combining Hard and Soft Robotics", Soft Robotics 1(1):70-74 (2014).
Extended European Search Report for Application No. 15841652.9, dated Apr. 19, 2018, 8 pages.
Communication pursuant to Article 94(3) EPC for Application No. 15861785.2, dated Dec. 10, 2020, 6 pages.
International Preliminary Report on Patentability for International application No. PCT/US2015/050793, dated Mar. 21, 2017, 6 pages.
Office Action for Chinese application No. 201580061370.9, dated Jan. 15, 2020, 12 pages.
Extended European Search Report for European Patent Application No. 22204811.8 dated Feb. 14, 2023, 9 pages.

* cited by examiner

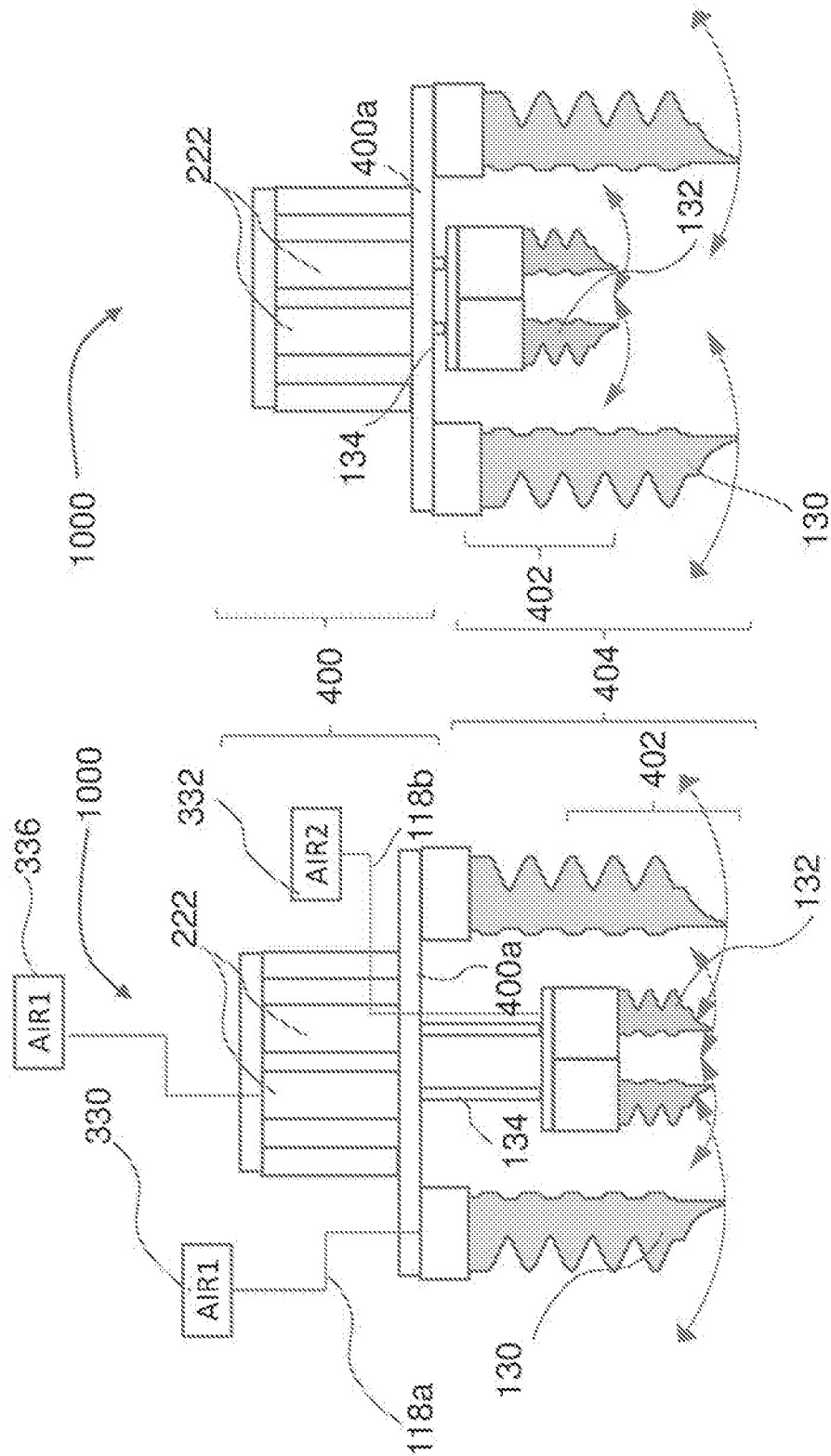

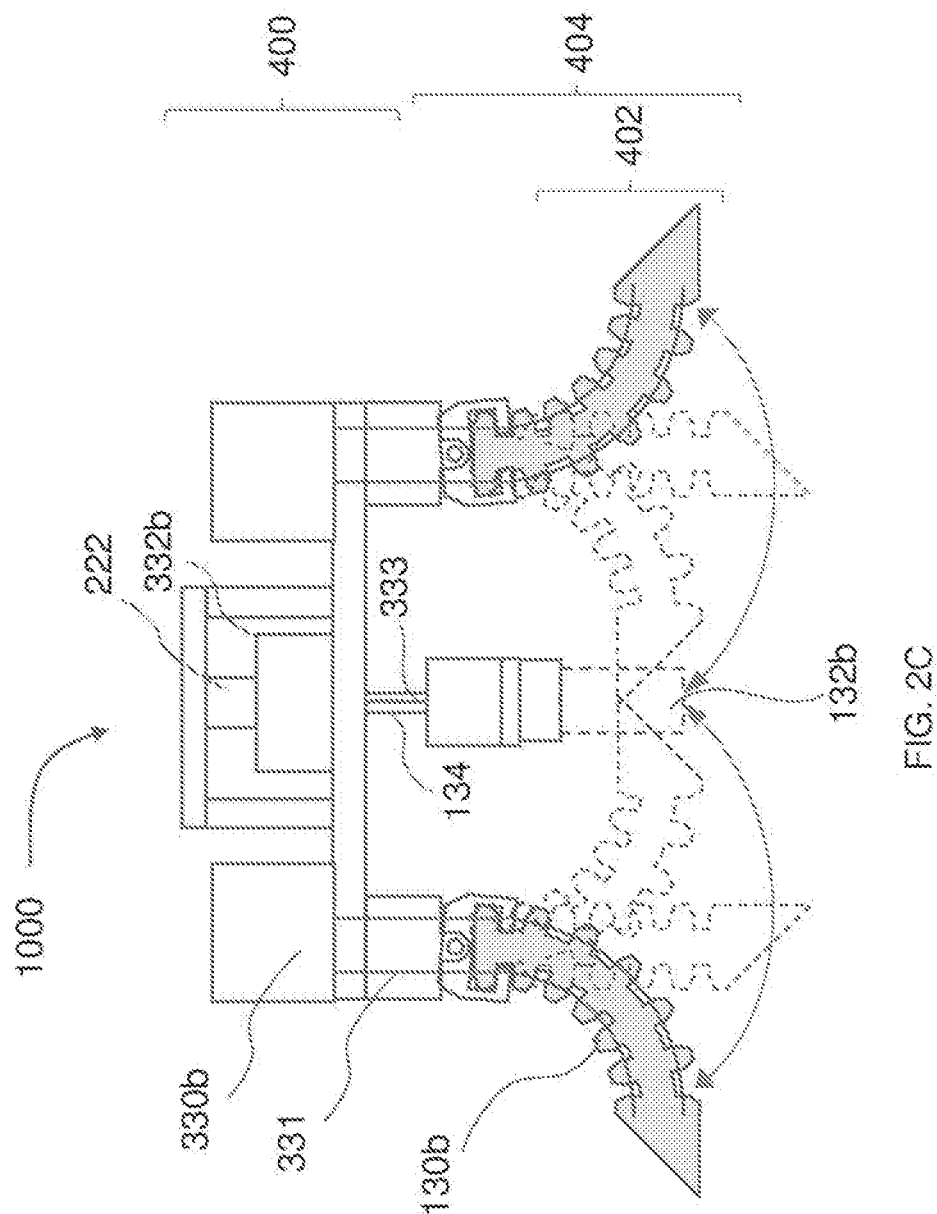

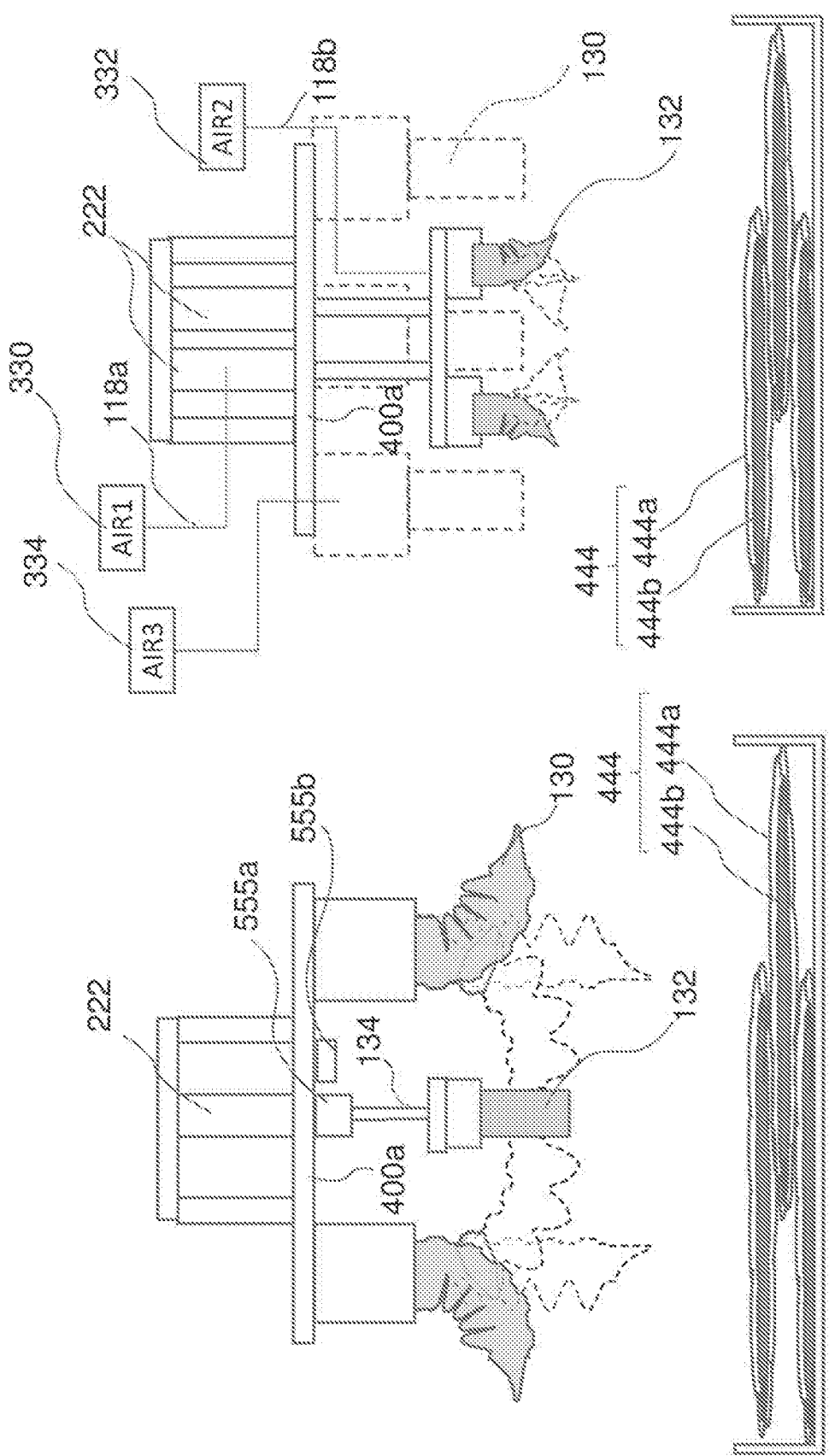

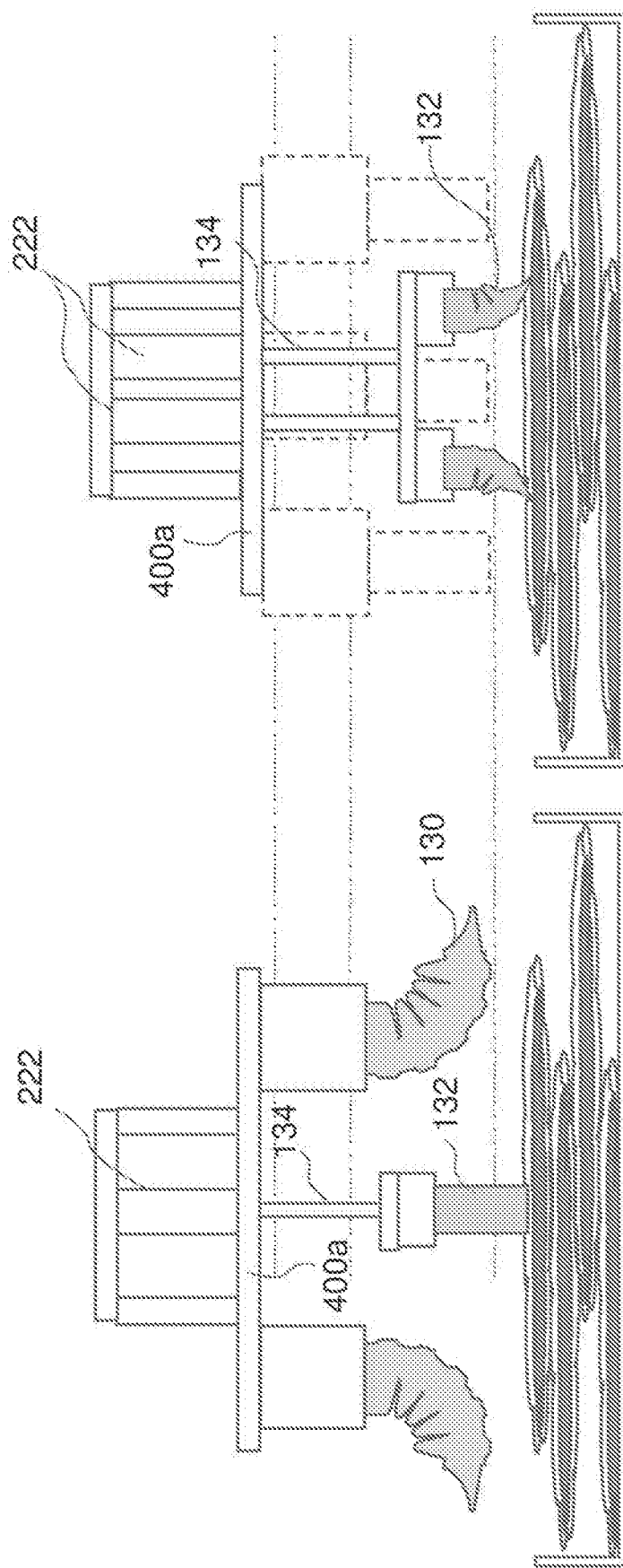

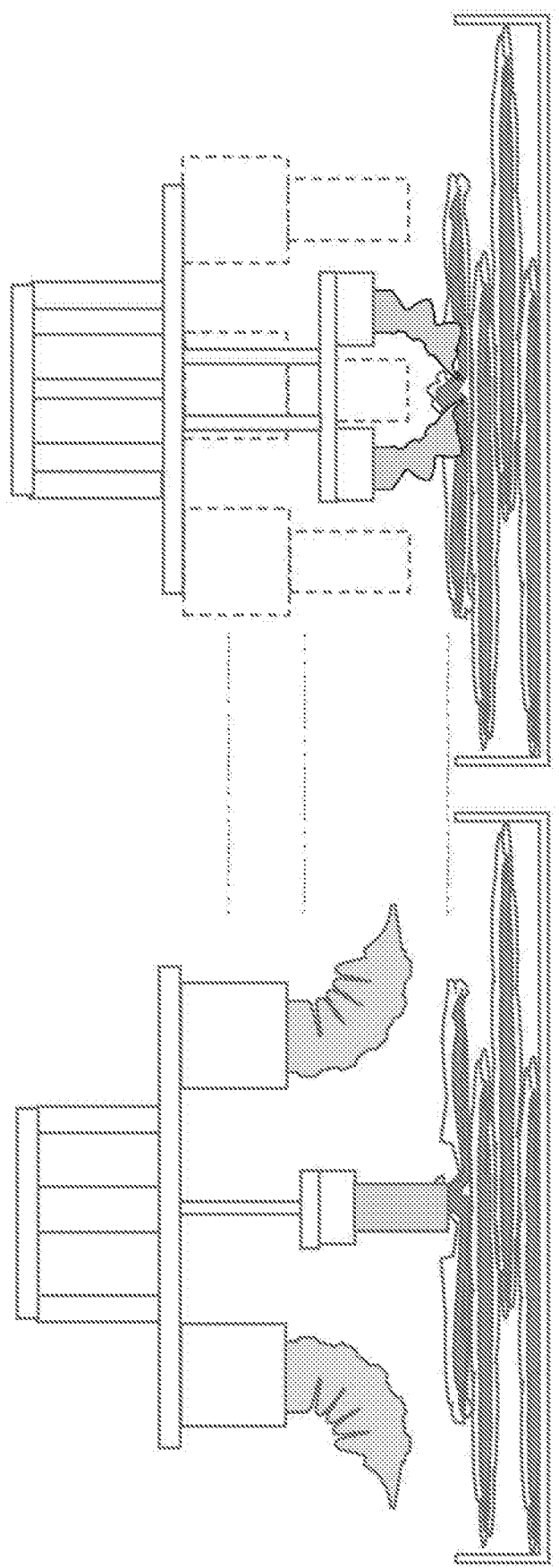

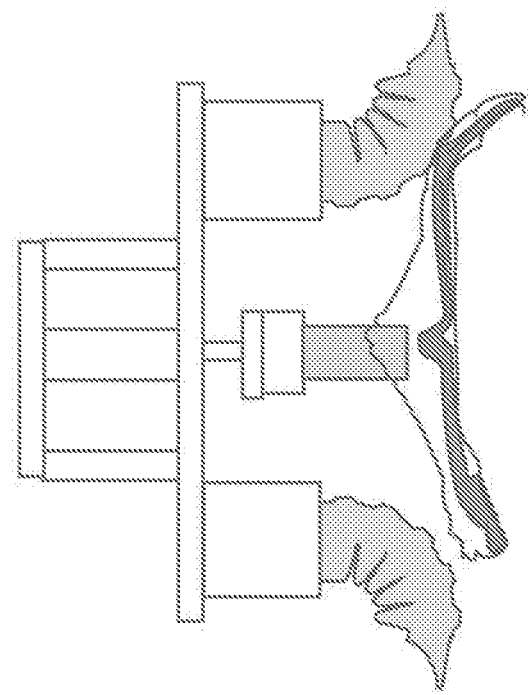
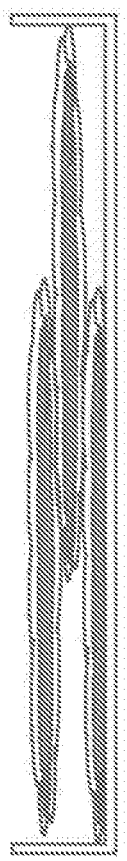
FIG. 10A
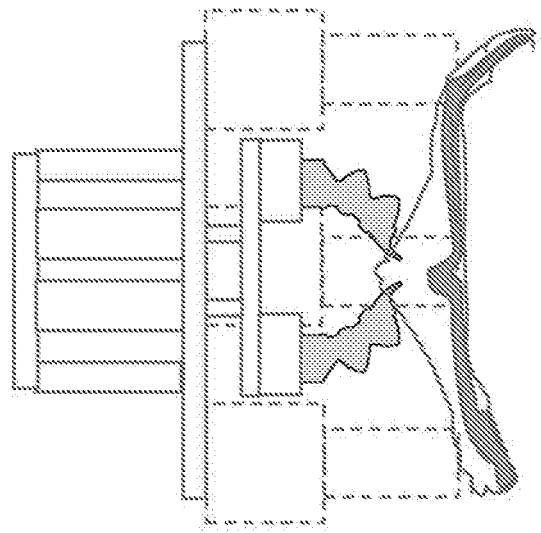
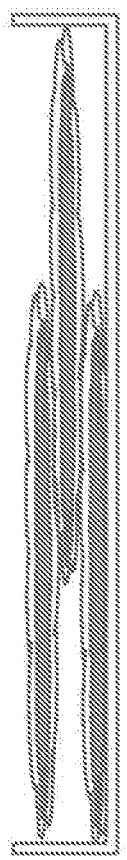
FIG. 10B

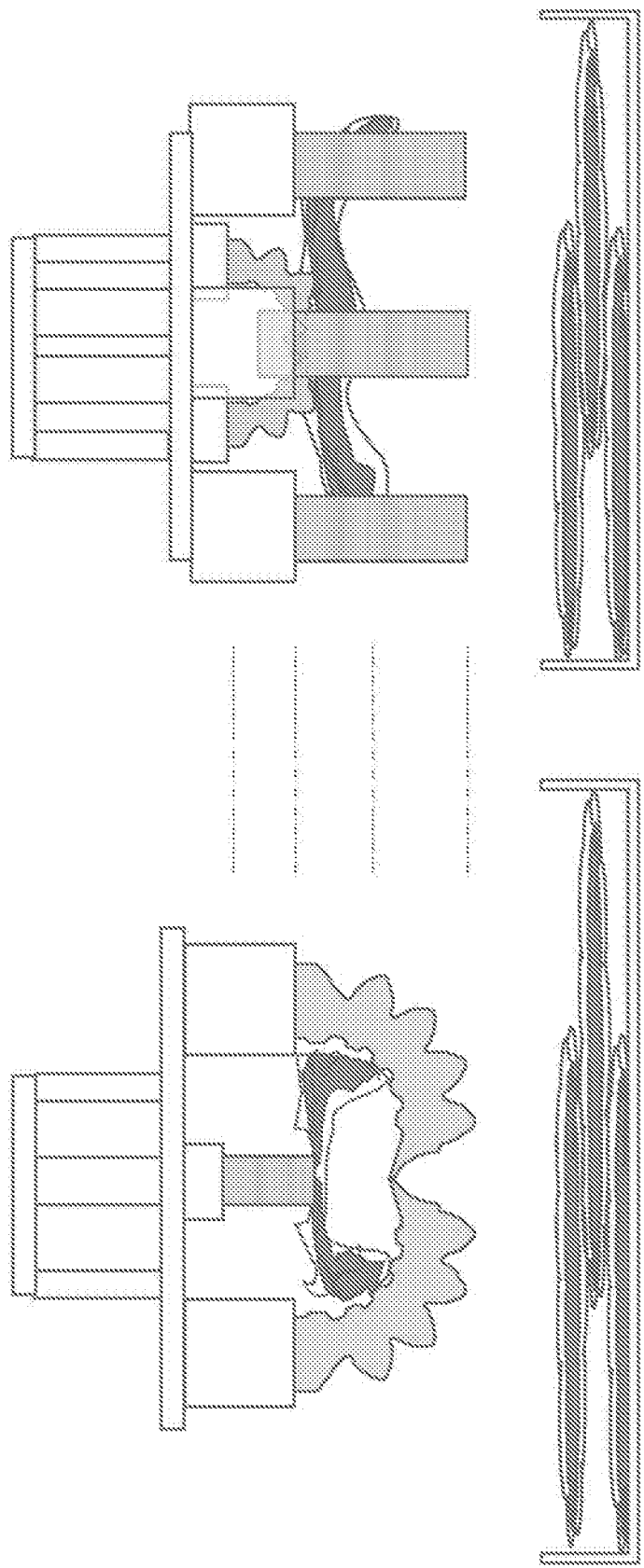

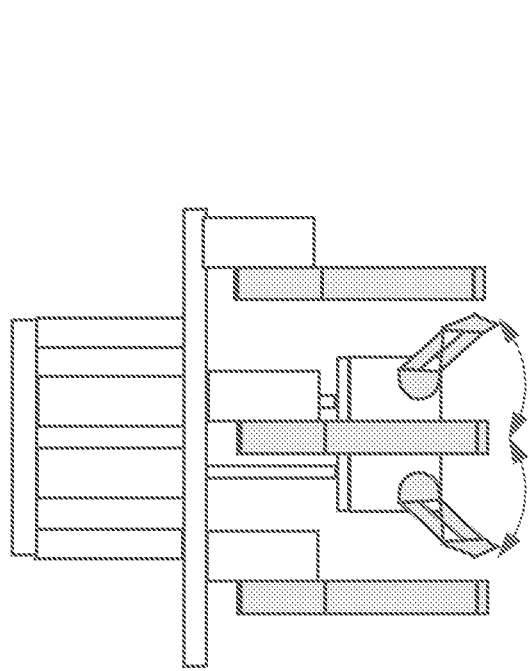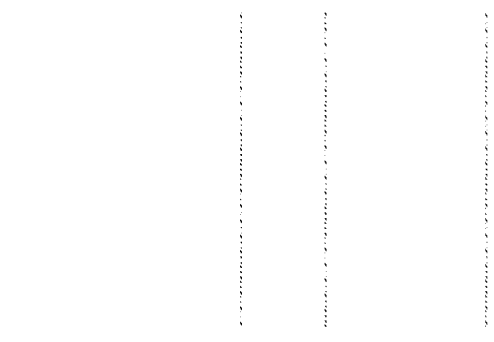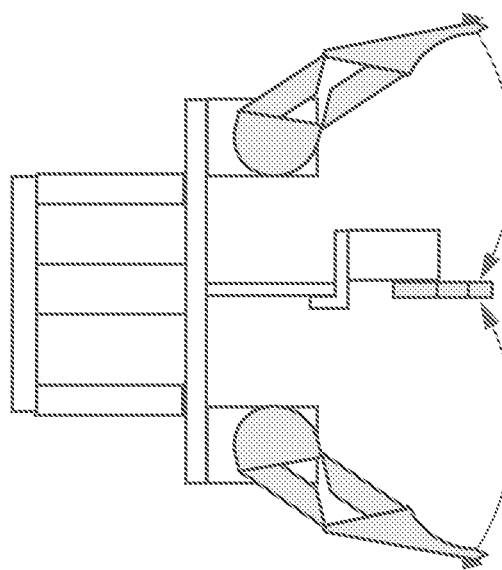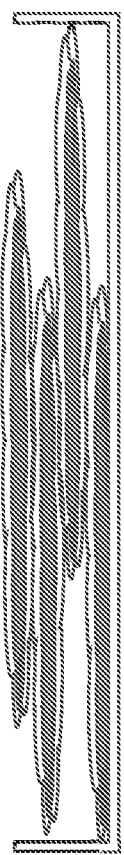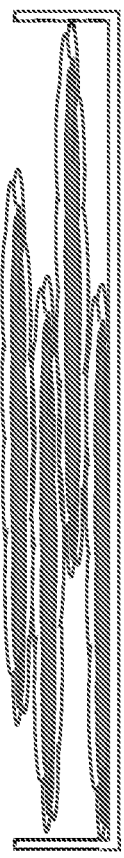
FIG. 15A
FIG. 15B

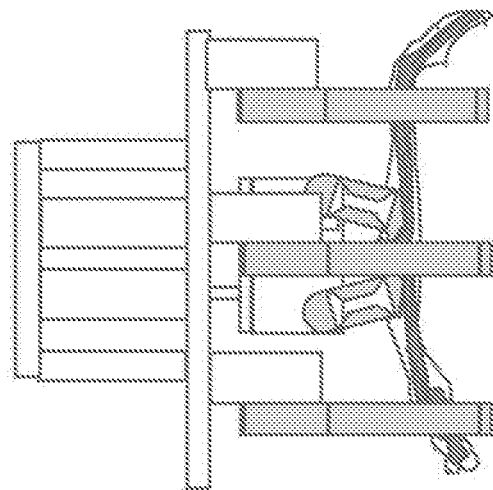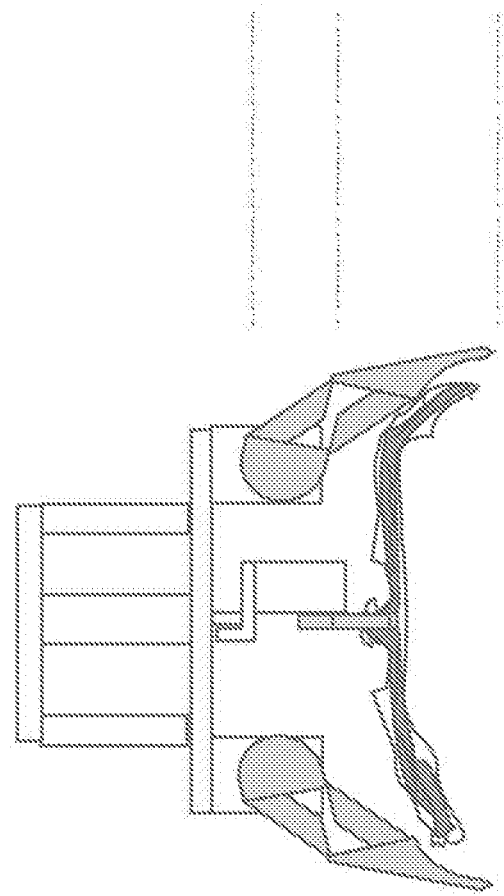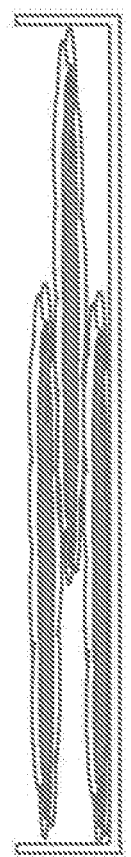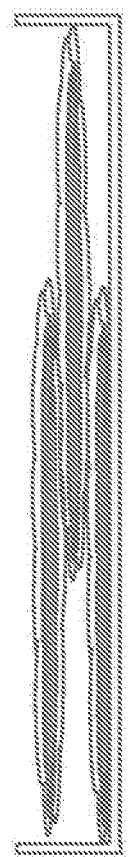
FIG. 19A
FIG. 19B

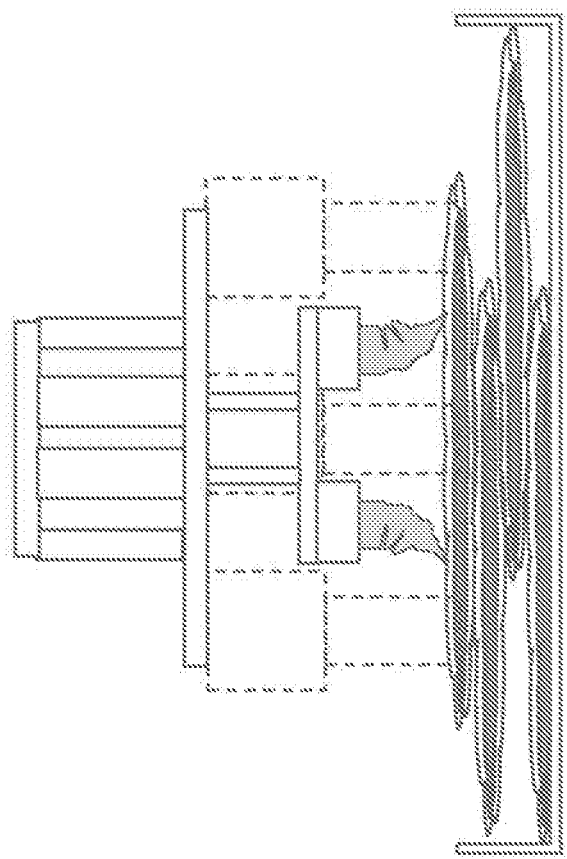
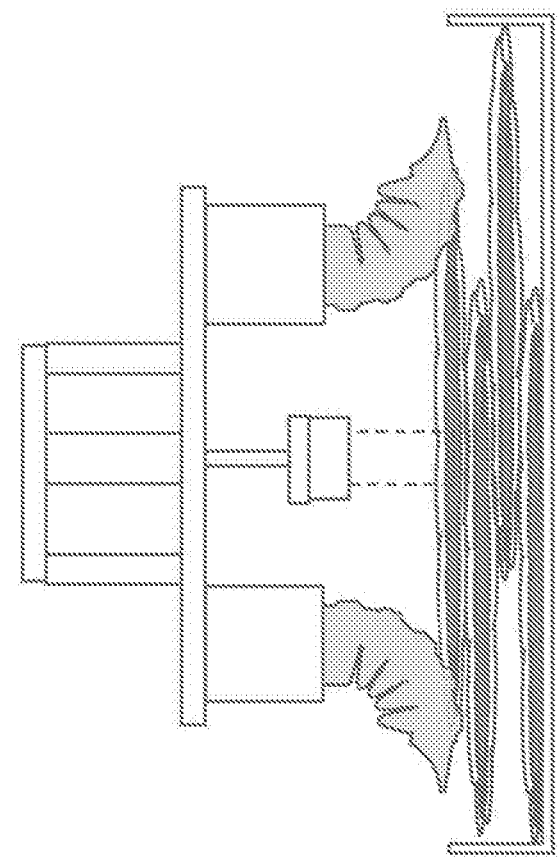

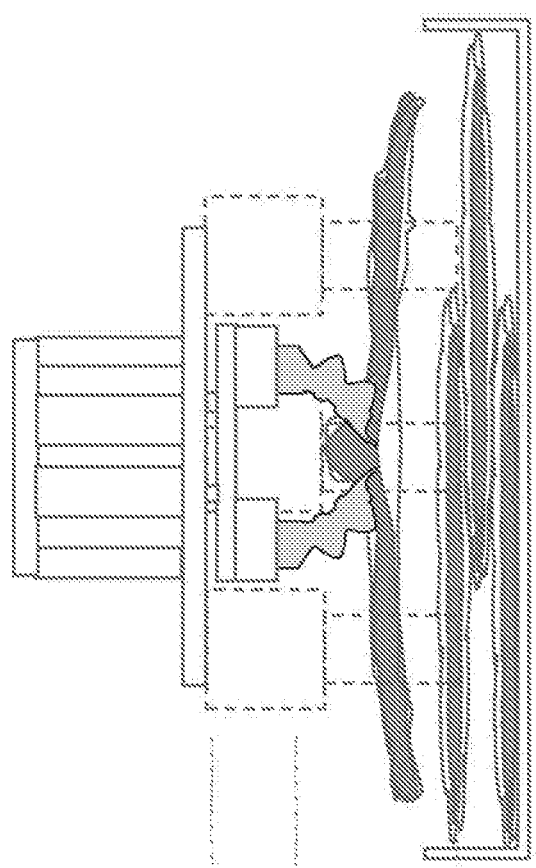
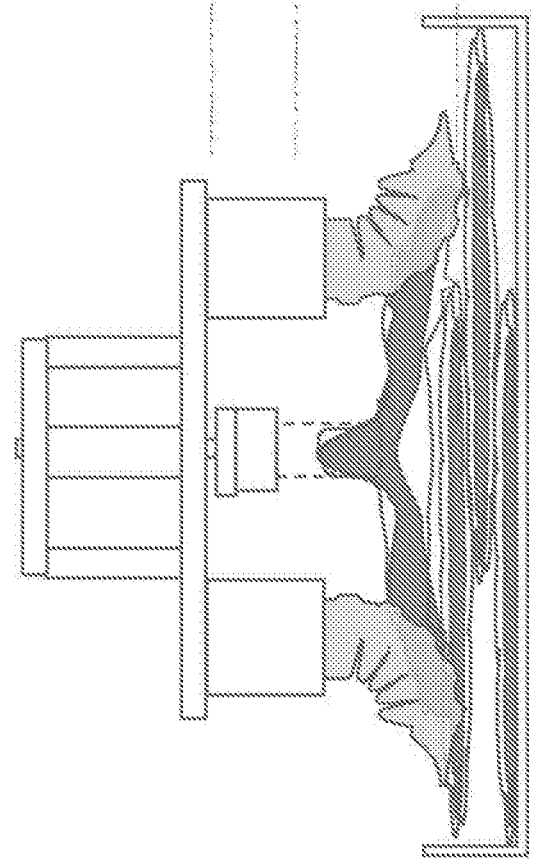
FIG. 23B
FIG. 23A

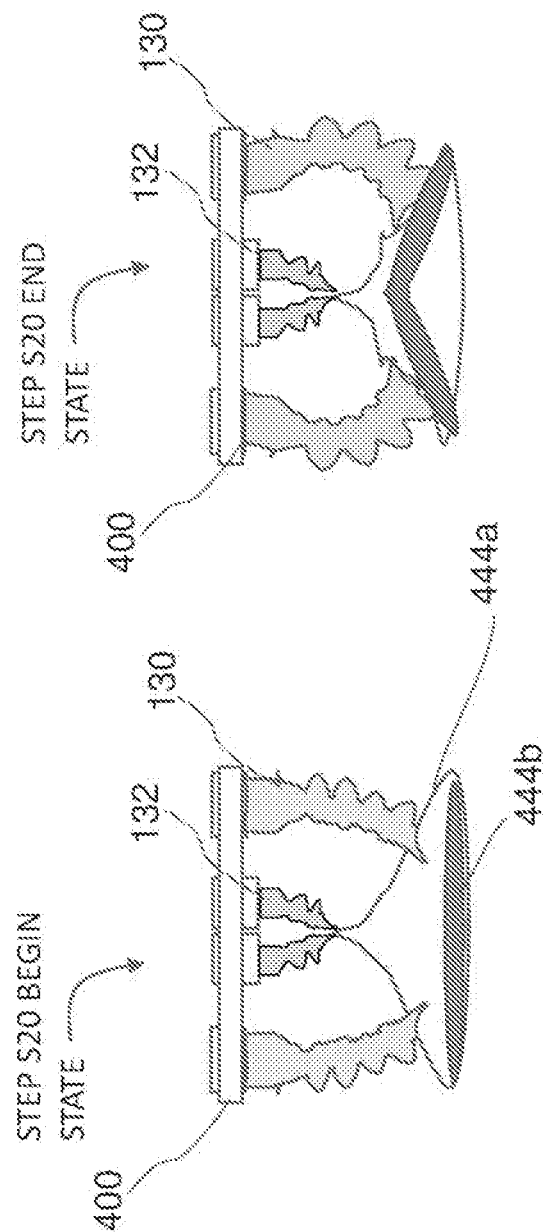

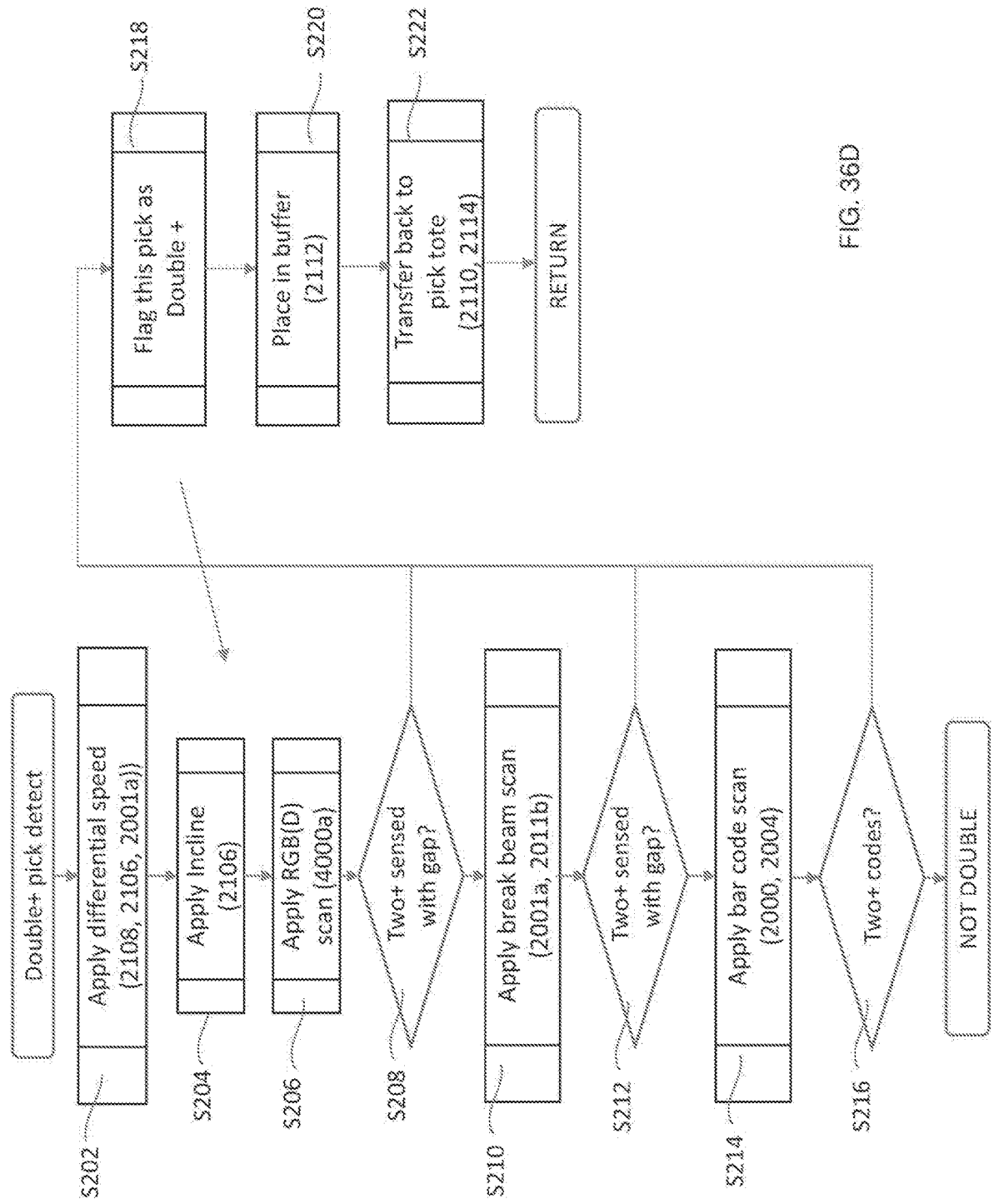

PICKING, PLACING, AND SCANNING BAGGED CLOTHING AND OTHER ARTICLES

RELATED APPLICATIONS

This application relates to U.S. patent application Ser. No. 14/857,649, filed Sep. 17, 2015, Ser. No. 14/944,999 filed on Nov. 18, 2015, Ser. No. 16/210,315 filed on Dec. 5, 2018, Ser. No. 16/037,744 filed on 07-17-2018, 62/841,209 filed on Apr. 30, 2019, 62/945,108 filed on Dec. 6, 2019, 62/945,217 filed on Dec. 8, 2019, and 62/948,798 filed on Dec. 16, 2019. The contents of the aforementioned applications are incorporated herein by reference.

FIELD OF THE DISCLOSURE

The disclosure relates generally to industrial and collaborative robotic gripping solutions, and to novel structures and methods useful in general and pre-bagged and/or fabric item pick-and-place automation.

BACKGROUND

Articles packaged in flat or pouch-like "polybags" (e.g., polymer bags, often polyethylene bags) are difficult for conventional robotics and end-of-arm-tools, including grippers, to pick up successfully. Picking from a source or supply container (a tote bin or box) that contains various types or sizes of folded garments within the polybag, and/or piled polybagged articles within a tote bin, is even more difficult. Multiple soft or hard objects (e.g., boxes, bottles, or other sundries) packaged within a single polybag (this assembly herein considered a bagged article) are similarly difficult. Problems include the fundamental picking of the bagged article or polybag assembly (e.g., polybag with its enclosed product or article), singulating among bagged articles or polybag assemblies to pick only one, and handling the picked polybag assembly in an effective manner, maintaining flatness or other shape characteristic useful for other processing (scanning, delivering to sorters).

For this reason, among others, in garment handling businesses, industrial robotics have not been adopted as widely or rapidly as in manufacturing or logistics for more durable or robust items. Similarly, in non-garment businesses with similarly challenging polybagged items to be picked and placed, adoption has lagged fields with more robust, predictable workpieces.

SUMMARY

According to one aspect of some embodiments of the present invention, in a gripper system for handling a bagged object, the bagged object having an article enclosed within a bag, a pinching gripper may be configured to clamp a pinched fold in the bag. A linear actuator (or other retracting mechanism) may be configured to retract the pinching gripper and clamped pinched fold to form a tented bag above the article. A resilient gripper may include a plurality of resilient members located about the pinching gripper, with the peripheral gripper configured to close the resilient members upon the tented bag.

In this manner, the pinching gripper may pinch a fold in the bag alone or the bag and article together. Once held by the fold, the peripheral gripper encloses upon the bag alone or the bag and article together. If the bagged article is to be moved at a sufficient speed for efficient processing, the pinching gripper and enclosing gripper together provide a secure hold resisting slipping from the gripper system.

Optionally, the resilient gripper is a grasp-type gripper in which each resilient member curls in a closing direction in response to a first direction of actuation. Alternatively, or in addition, the pinching gripper may include opposing clamping elements.

In one example, the pinching gripper, linear actuator, and resilient gripper are independently actuated by respective first through third actuators. In another example, the gripper system includes a presence sensor, and a plurality of pairs of resilient members. Depending upon a signal or result from the presence sensor, a control system may close fewer than all pairs (e.g., a center pair of 3 pairs, 2 outer pairs of 3 pairs, 2 lengthwise pairs of 4 pairs, etc.) or may alternatively close all the pairs. In this manner, the gripper system may vary the gripping speed, force, and configuration for different circumstances (e.g., different sizes, weights, or shapes of bagged article).

According to another aspect of some embodiments of the present invention, gripper system for handling a bagged object or article may include a grasp-type gripper including a plurality of resilient members, the resilient members actuatable by a first actuator to perform a grasping action. A pinching gripper may include opposing clamping elements, the pinching gripper being actuatable by a second actuator to form a tented bag in the bagged object by forming a pinched fold between the clamping elements, clamping the pinched fold, and lifting the pinching gripper. An actuator control system may be operatively connected to the first and second actuators, that sequentially commands the second actuator to form the tented bag and the first actuator to perform the grasping action upon the tented bag.

In one form of this structure, an extension actuator may be configured to retract the pinching gripper together with the pinched fold, and the grasp-type gripper configured to close about the retracted pinched fold. In this case, the grasp type gripper may include a first set of resilient members and a second set of resilient members, and may be actuated in a first mode to close the first set of resilient members, and in a second mode to close both the first set and the second set of resilient members. Optionally, the gripper system may additionally include a presence sensor, wherein the first set of resilient members are closed in response to a first signal from the presence sensor, and both the first set and the second set of resilient members are closed in response to a second signal from the presence sensor. Additionally, or alternatively, the bag may remain substantially tented above the article during the grasping action, and the bag is held by both the pinched fold and the resilient members to resist the bagged object slipping from the gripper system while the gripper system and bagged object are being swung by a manipulator arm.

According to an additional aspect of some embodiments of the present invention, a gripper system for handling a bagged object, may include a multiform gripper tool. The multiform gripper tool may include a pinching gripper configured to form a fold in a bag of the bagged object and to clamp upon the fold, and an actuator configured to lift the pinching gripper together with the clamped fold. A peripheral gripper may include a first set of resilient members arranged about the pinching gripper and configured to close the resilient members about the lifted clamped fold. An actuator array may be connected to selectively actuate one or more of the pinching gripper, actuator, or peripheral gripper of the multiform tool.

Optionally, the actuator array may include a plurality of individual actuators, each connected to a respective one of the pinching gripper, the extension actuator, and the peripheral gripper. Alternatively, or in addition, the peripheral gripper may include a second set of resilient members arranged about the pinching gripper and configured to close about the lifted clamped fold independently of the first set of resilient members, about the retracted clamped fold. Further alternatively, or in addition, the actuator array may be selectively actuated to hold the bagged object by both the pinched fold and the resilient members to resist the bagged object slipping from the first set of resilient members while the first set of resilient members and bagged object are being swung by a manipulator arm. The actuator may be configured to lift the pinched fold to form a tented bag over the bagged object, the peripheral gripper closing the first set of resilient members upon the tented bag.

According to a further aspect of some embodiments of the present invention, a gripper system for handling a bagged object may include a pinching gripper mounted to a linear actuator below a palm, the pinching gripper configured to form a fold in the bagged object below the palm, pinch the formed fold, and to be retracted by the linear actuator toward the palm. A resilient grasper may be mounted to the palm and configured to grasp the bagged object about the pinching gripper and below the retracted formed fold, the grasper having a first set of resilient members separated from one another configured to close toward the pinching gripper. A presence detector may be carried by the gripper base and configured to respond to the successful grasp of a of a bagged object by the resilient grasper below the retracted formed fold. A control circuit in electrical communication with the manipulator and configured to close the pinching gripper, retract the pinching gripper, close the resilient grasper, and in response to occlusion of the presence sensor by a bagged object, control the manipulator to maneuver the bagged object from the picking location to the placing location.

According to another aspect of some embodiments of the present invention, a gripper suitable for picking polybagged articles, may include a gripper carriage and a tenting tool supported by the gripper carriage, the tenting tool capable of pinching a thin article in a folded state between at least two compliant fingers. A perimeter gripper supported by the gripper carriage may be capable of gathering a thin article in a folded state among at least three compliant fingers surrounding the tenting tool.

In the preceding gripper and/or gripper system examples (and in following apparatus or method combinations including or involving gripper systems or the equivalent), the resilient members may be one of inflatable members, cable-driven elastomeric members, or a linkage including at least one of a resilient elastomeric link or a living hinge. In cases where a pinching gripper includes pinching members, the pinching fingers may be less than ½ the length of the resilient members. Each resilient member may curl in a closing direction in response to a first direction of actuation.

In the preceding inflatable or pneumatic gripper and/or finger examples (and in following apparatus or method combinations including or involving pneumatic grippers or fingers or the equivalent), the expanding/contracting bellows side of the members or flexible (e.g., deformable, bendable, elastic, and/or stretchable) elongate bodies may use sinusoidal geometries for the folding/unfolding bellows surfaces.

According to another aspect of some embodiments of the present invention, a bagged object handling robot may include a grasper having a plurality of resilient members, and a presence sensor (e.g., directed at or sensing relative to the payload location, occupied or unoccupied, of the grasper). A control system may be operatively connected to the presence detector and to the grasper, The control system may be configured to monitor the presence sensor for a response to a bagged object within the grasper, and to change the operation of the robot from a lighter object grasping mode in which the grasper closes fewer than all available resilient fingers upon a bagged object to a heavier object grasping mode in which the grasper closes all available resilient members upon a bagged object. The mode selection may depend upon the response of the presence sensor to the bagged object in the lighter object grasping mode.

Optionally, the robot may additionally or alternatively include a pinching gripper configured to clamp a pinched fold in a bag of the bagged object, the grasper closing resilient members about the pinched fold and upon the bagged object. In this case, the pinched fold may be lifted to form a tented or stretched bag over the bagged object, the grasper closing resilient members upon the tented or stretched bag. A retracting actuator may be configured to retract the pinching gripper toward the grasper to lift the pinched fold. Alternatively, or in addition, the bagged object may be held by both the pinched fold and the resilient members to resist the bagged object slipping from the grasper while the grasper and bagged object are being swung by a manipulator arm.

According to another aspect of some embodiments of the present invention, a bagged object picking robot may include a manipulator (e.g., an industrial or collaborative articulated robot, a SCARA robot, or a delta robot) and a palm movable by the manipulator. A linear actuator may be mounted to the palm and configured to extend from and retract toward the palm. A pinching gripper may be mounted to the linear actuator below the palm, the pinching gripper configured to form a fold in the bagged object below the palm, pinch the formed fold, and to be retracted by the linear actuator toward the palm. A resilient grasper may be mounted to the palm and configured to grasp the bagged object about the pinching gripper and below the retracted formed fold, the grasper having a first set of resilient members separated from one another configured to close toward the pinching gripper. A presence detector may be carried by the gripper base and configured to respond to the successful grasp of a of a bagged object by the resilient grasper below the retracted formed fold. A control circuit in electrical communication with the manipulator and configured to close the pinching gripper, may retract the pinching gripper, close the resilient grasper, and in response to occlusion (or other detection phenomenon) of the presence sensor by a bagged object, control the manipulator to maneuver the bagged object from the picking location to the placing location.

According to another aspect of some embodiments of the present invention, an automated robotic system for picking polybagged articles may include a controller controlling a multi-axis robotic arm. A gripper carriage may be secured as an end-of-arm tool to the robotic arm. A tenting tool may be supported by the gripper carriage, the tenting tool capable of pinching a thin article in a folded state between at least two compliant fingers. A perimeter (or peripheral) gripper may be supported by the gripper carriage, the perimeter gripper capable of gathering a thin article (e.g., less than 1 inch, and preferable less than ½ inch, at a pinchable point of the article) in a folded or layered state among at least three compliant fingers surrounding the tenting tool.

In the preceding bagged object handling or picking robot or robot system examples (and in following apparatus and method combinations including or involving bagged object handling or picking robots or the equivalent), the robot may include a depth camera that provides a signal including a location of a peaked portion of the bagged object, wherein the pinched fold is formed via the pinching gripper substantially at the location of the peaked portion.

According to another aspect of some embodiments of the present invention, a method or process may include locating, within a container, a bagged object including an article within a bag. The bag (or the bag and article together) may be pinched with a pinching gripper to form a pinched fold (or folds, or corner). The bag may be lifted or raised by the pinched fold to form a tented bag above the article. A first set of resilient members may be closed upon just the tented bag, or upon both the tented bag and article, to secure the bagged object. The bagged object may be transported (e.g. swung, translated, carried, launched) from the container (e.g., bin, tote, box, tray, or conveyance) to a placing location or drop zone, and placed (e.g., laid, dropped, flung, or launched) at or to the placing location.

In addition or in the alternative, the pinching gripper may be retracted together with the clamped fold toward a base of the resilient members. Further in addition or in the alternative, A second set of resilient members, proximate to but separate from the first set of resilient members, may be closed upon both the tented bag and article to secure the bagged object. Still further additionally or in the alternative, the first set of resilient members may be closed in response to a first signal from a presence sensor, and both the first set and the second set of resilient members may be closed in response to a second signal from the presence sensor.

Still yet further additionally or in the alternative, a presence sensor may be monitored for a response to a bagged object within the grasper, and the operation of the robot may be changed from a lighter object grasping mode in which the grasper closes fewer than all available resilient fingers upon a bagged object to a heavier object grasping mode in which the grasper closes all available resilient members upon a bagged object depending upon the response of the presence sensor to the bagged object in the lighter object grasping mode.

According to another aspect of some embodiments of the present invention, a method or process may include locating a bagged object, the bagged object including a bag enclosing an article, and forming a pinched fold in the bag with a multiform gripper. The pinched fold may be lifted with the multiform gripper to form a tented bag above the article. First resilient members of the multiform gripper may be closed upon the tented bag to secure the bagged object, with the bag remains substantially tented above the article during the closing of the first resilient members. The securing may include holding the bag by the pinched fold and by the resilient members, and may resist the bagged object slipping from the multiform gripper while the multiform gripper and bagged object are being swung by a manipulator arm.

According to a further aspect of some embodiments of the present invention, a method for handling bagged objects within containers may include identifying, via a height scanner, a peaked portion of a bagged object within one of the containers, the bagged object including an article within a bag. A pinched fold may be formed and/or pinched in the bag, via a pinching gripper, substantially at the location of the peaked portion. The bag may be tented, via the pinching gripper, above the article by lifting the pinched fold. The tented bag and article may be grasped together, via a grasping gripper, by closing resilient members upon the tented bag while the pinched fold remains pinched by the pinching gripper. The bagged object may be transported, via a manipulator, from the container to a placing location and placed. The bagged object so placed (including after further conveyance or transport) may be scanned via a standoff (e.g., non-contact, typically operable at a distance of 1 or more feet) bar code scanner. A portion of scanned bagged objects (e.g., unsuccessfully scanned ones) may be recirculated from the placing location to one of the containers (or the same container, bin, tote, box, tray, or conveyance) from which the bagged objects are handled.

According to a still further aspect of some embodiments of the present invention, a method for handling bagged objects in containers may include performing a pick and place cycle completing in a first cycle time, each pick and place cycle including picking a bagged object from a pile in a container and placing the bagged object in a drop zone, in which the drop zone is occupied with the bagged object for a first interval but is unoccupied for a second interval. A scanning cycle may be performed, completing in a second cycle time, each scanning cycle conveying the bagged object from the drop zone through a scan station and flagging the bagged object as one of a recognized or an unrecognized article. A recirculation cycle may be performed completing in a third cycle time, each recirculation cycle conveying the bagged object, if flagged as an unrecognized article, back to the drop zone. The second cycle time and the third cycle time may complete together in less time than the second interval of the first cycle time, so that the bagged object flagged as an unrecognized article may be recirculated and rescanned during a subsequent pick and place cycle, in the second interval of the first cycle time, in which the drop zone is unoccupied.

Optionally, the conveying of the recirculation cycle may include holding the bagged object in a buffer station for a third interval longer than the first cycle time, so that so that a bagged object flagged as an unrecognized article may be held in the buffer zone and rescanned during any subsequent pick and place cycle in which the drop zone is unoccupied. Alternatively, or in addition, the conveying of the recirculation cycle may include holding the bagged object in a plurality of buffer stations, so that a plurality of bagged objects flagged as unrecognized articles may be held in the plurality of buffer stations and each rescanned during a selected subsequent pick and place cycle in which the drop zone is unoccupied.

According to a still yet further aspect of some embodiments of the present invention, a method for handling bagged objects in containers may include performing a pick and place cycle, completing in a first cycle time, each pick and place cycle including picking a capture from bagged objects in a pile and placing the capture in a drop zone, in which the drop zone is occupied with the capture for a first interval but is unoccupied for a second interval. A scanning cycle may be performed completing in a second cycle time, each scanning cycle conveying the capture from the drop zone through a scan station and flagging the capture as one of a singulated bagged object or a unsingulated plurality of bagged objects. A recirculation cycle may be performed completing in a third cycle time, each recirculation cycle conveying the capture, if flagged as an unsingulated plurality of bagged objects, back to the pile. The second cycle time and the third cycle time may complete together in less time than the second interval of the first cycle time, so that the capture flagged as an unsingulated plurality of bagged objects may be repicked and rescanned during a subsequent pick and place cycle, in the second interval of the first cycle time, in which the drop zone is unoccupied.

According to an additional aspect of some embodiments of the present invention, a method for handling bagged objects in containers may include performing a pick and place cycle including gripping a bagged object at a pick station, swinging a robotic manipulator arm bearing the bagged object, placing the bagged object in a drop zone, and swinging the robotic manipulator arm back to the pick station. The drop zone may be occupied with the bagged object for a first interval of the pick and place cycle but unoccupied for a second interval of the pick and place cycle. A scanning and recirculation cycle may be performed, each scanning and recirculation cycle conveying the bagged object from the drop zone through a scan station and conveying unrecognized bagged objects back to the drop zone. The scanning and recirculation cycle may complete in less time than the second interval of the pick and place cycle, so that each unrecognized bagged object may be recirculated and rescanned during a subsequent pick and place cycle in which the drop zone is unoccupied but in which the robotic manipulator arm and the multiform gripper are at least in part occupied.

According to another additional aspect of some embodiments of the present invention, a method for handling bagged objects in containers may include attempting to scan the first bagged object, and swinging the first bagged object with the robot manipulator arm from a tote toward a drop zone. The first bagged object may be delivered to the drop zone, and the robot manipulator arm swung back toward the tote. The bagged object may be conveyed through a code scanning station. A second bagged object delivered by a robotic manipulator arm may be received, and the bagged object may be scanned as it is conveyed through the code scanning station. Unsuccessfully scanned bagged objects may be manipulated to present different poses to the code scanning station.

According to still another additional aspect of some embodiments of the present invention, a method for handling bagged objects in containers may include receiving a bagged object delivered by a robotic gripper to a drop zone of a conveyor, and conveying the bagged object through a code scanning station. The bagged object may be scanned as it is conveyed through the code scanning station. Unsuccessfully scanned bagged objects may be manipulated present different poses to the code scanning station. The manipulating may include includes recirculating a portion of scanned bagged objects from the placing location to one of the containers from which the bagged objects are handled. Alternatively or in addition, the manipulating may include rearranging or changing the pose of the bagged object at the placing location.

According to still yet another additional aspect of some embodiments of the present invention, a method for picking polybagged articles may include targeting the polybagged article, and placing a multistage gripper adjacent the polybagged article. A tenting tool of the multistage gripper may be touched or contacted to the polybagged article. A portion of the polybagged article may be tented, and the polybagged article suspended from the tenting tool. The polybagged article may be gathered with a perimeter gripper, and lifted with at least one of the tenting tool and the perimeter gripper (e.g. with one, the other, or both, in some cases depending on the secureness of the hold of the tenting tool or the perimeter gripper).

According to a further additional aspect of some embodiments of the present invention, a method for picking polybagged articles may include targeting the polybagged article and placing a multistage gripper adjacent the polybagged article. A tenting tool of the multistage gripper may be contacted or touched to the polybagged article. The tenting tool may be pressed or forced into a portion of the polybagged article, and the polybagged article gathered with a perimeter gripper. The polybagged article may be lifted with at least one of the tenting tool and the perimeter gripper.

According to an aspect of some embodiments of the present invention, a method for picking polybagged articles may include targeting the polybagged article, and placing a multistage gripper adjacent the polybagged article. A tenting tool of the multistage gripper may be contacted, touched to, or moved abutting to the polybagged article. In a first mode, the polybagged article may be suspended from the tenting tool. In a second mode, the tenting tool may be pressed or forced to, into, or toward the polybagged article, the polybagged article may be gathered with a perimeter gripper, and the polybagged article may be lifted with at least one of the tenting tool and the perimeter gripper.

According to another aspect of some embodiments of the present invention, a method for handling bagged objects from a supply may include identifying a peaked portion among a plurality of bagged objects, each bagged object including an article within a bag, as well as forming and pinching a pinched fold substantially at the location of the peaked portion. A grasp may be formed about the pinched fold while the pinched fold remains pinched. Any bagged objects (e.g., most often one, less often two, and rarely three or more) within the grasp may be transported to a drop zone. The bagged object or objects transported to the drop zone may be transported from the drop zone. The bagged object or objects may be separated (if two or more) by tugging a leading bagged object with a faster conveyance while a trailing bagged object lags restrained by a slower conveyance. The occurrence of more than one bagged object conveyed from the drop zone may be detected, and in such case, the bagged objects may be conveyed back or recirculated to the supply from which the bagged objects are handled (or, e.g., to a jackpot or temporary holding bin which is later returned to the supply).

In the preceding bagged object handling method or process examples (and in following apparatus and method combinations including or involving bagged object handling or the equivalent), each resilient member may be closed in a closing direction in response to a first direction of actuation. Alternatively, or in addition, the bagged object may be held by both the pinched fold and the resilient members to resist the bagged object slipping from the resilient members while the resilient members and bagged object are being swung by a manipulator arm. Further alternatively or in addition, a depth camera (such as an RGBD camera, LIDAR, stereo perception sensor, or other vision-based point cloud generator) may be monitored for a signal including a location of a peaked portion of the bagged object, and the pinched fold may be formed via the pinching gripper substantially at the location of the peaked portion.

In the preceding bagged object handling method or process examples (and in following apparatus and method combinations including or involving bagged object handling or the equivalent), a bagged object so placed at a placing location may be manipulated such that different surfaces of the bagged object are made available for scanning by a standoff bar code scanner, and the manipulated bagged object may be rescanned.

BRIEF DESCRIPTION OF THE DRAWINGS

FIG. 1A is a schematic side view of a first example of multistage soft robotic gripper with an inner tool in an extended position.

FIG. 1B is a schematic side view of the multistage soft robotic gripper of FIG. 1A with the inner tool in a retracted position.

FIG. 2C is a side view of a third exemplary multistage soft robotic gripper, showing a range of motion of cable-actuated fingers in open, neutral, and closed positions.

FIGS. 6A and 6B show schematic side views (front side and left/right side) of an exemplary multiform gripper in an align-and-approach step of an exemplary picking process (e.g., step S02 of FIGS. 4A-5B).

FIGS. 7A and 7B show alternate schematic side views of an exemplary multiform gripper in a contact depth checking step of a picking process (e.g., step S08 of FIGS. 4A-5B).

FIGS. 8A and 8B show alternate schematic side views of an exemplary multiform gripper in a pinch fold step or pick outer bag step of a picking process (e.g., step S10 of FIGS. 4A-5B).

FIGS. 10A and 10B show alternate schematic side views of an exemplary multiform gripper in a raise gripper carriage and/or tenting of a bag step of a picking process (e.g., steps S16 and/or S18 of FIGS. 4A-5B).

FIGS. 11A and 11B show alternate schematic side views of an exemplary multiform gripper in an actuate perimeter fingers step of a picking process, in which all of the perimeter finger pairs are actuated (e.g., step S20 of FIGS. 4A-5B).

FIGS. 15A and 15B show schematic side views (front side and left/right side) of a second exemplary multiform gripper in an align-and-approach step of an exemplary picking process (e.g., step S02 of FIGS. 4A-5B).

FIGS. 19A and 19B show alternate schematic side views of a second exemplary multiform gripper in a raise gripper carriage and/or tenting of a bag step of a picking process (e.g., step S18 of FIGS. 4A-5B).

FIGS. 21A and 21B show alternate schematic side views of the first exemplary multiform gripper in a initial compress bagged article step of a picking process in which the inner tool and outer tool are kept open while the inner and outer tool may press on the stack and the inner tool is passively retracted against a pressure (spring or pneumatic) bias (e.g., step S09 of FIGS. 4B-5B).

FIGS. 23A and 23B show alternate schematic side views of the first exemplary multiform gripper in a retract inner tool and fold step of a picking process (e.g., step S12 of FIGS. 4B-5B).

FIG. 32A-32H show schematic side views of a variant of the first exemplary multiform gripper in which the inner tool is not retractable, in successive steps of a picking process.

FIGS. 36D and 36E are flow charts showing process steps and/or acts for a double pick (or more than double pick) detection process.

DETAILED DESCRIPTION OF THE PREFERRED EMBODIMENTS

Soft Robotic Grippers

It should be noted that descriptive text appearing in any accompanying drawings are incorporated herein by reference in its entirety as it would be understood by one of skill in the art.

Soft or inflatable fingers or grippers may move in a variety of ways. For example, inflatable fingers may bend, or may twist, as in the example of the soft tentacle ("actuator") described in U.S. patent application Ser. No. 14/480,106, entitled "Flexible Robotic Actuators" and filed on Sep. 8, 2014. In another example, soft or inflatable fingers may be linear actuators, as described in U.S. patent application Ser. No. 14/801,961, entitled "Soft Actuators and Soft Actuating Devices" and filed on Jul. 17, 2015. Still further, soft or inflatable fingers may be formed of sheet materials, as in U.S. patent application Ser. No. 14/329,506, entitled "Flexible Robotic Actuators" and filed on Jul. 11, 2014. In yet another example, soft or inflatable fingers may be made up of composites with embedded fiber structures to form complex shapes, as in U.S. patent application Ser. No. 14/467,758, entitled "Apparatus, System, and Method for Providing Fabric Elastomer Composites as Pneumatic Actuators" and filed on Aug. 25, 2014.

Concentric Gripper Structure and Operation

FIG. 1A is a schematic side view of a multistage soft robotic gripper with an inner tool or tenting tool 402 in an extended position, and FIG. 1B shows the inner tool or tenting tool 402 in a retracted position. As discussed herein, the active or passive retraction of the tenting tool is an optional capability and structure (in certain cases, the multistage gripper need not have, or need not use with every type of article to be picked, any retracting capability).

As shown in FIGS. 1A and 1B, the concentric or multistage soft robotic gripper 1000 may be arranged with two (or more) independently moving/actuated and/or independently or sequentially opening/closing finger sets (e.g., concentric, or parallel, or interleaved). Shown in FIGS. 1A and 1B are an overall gripper carriage 400 for the entire EOAT (which is moved in 4 or more degrees of freedom as a whole by, e.g., a robot arm), the carriage 400 carrying an (e.g., outer) perimeter gripper 404 and an (e.g., inner) tenting tool 402. With this structure, different ordered operations can be carried out to complete a pick for different polybagged articles. The articles within polybags may be flat or bulky, t-shirt or towel or overcoat, with tight or loose polybags.

Figure 1C:
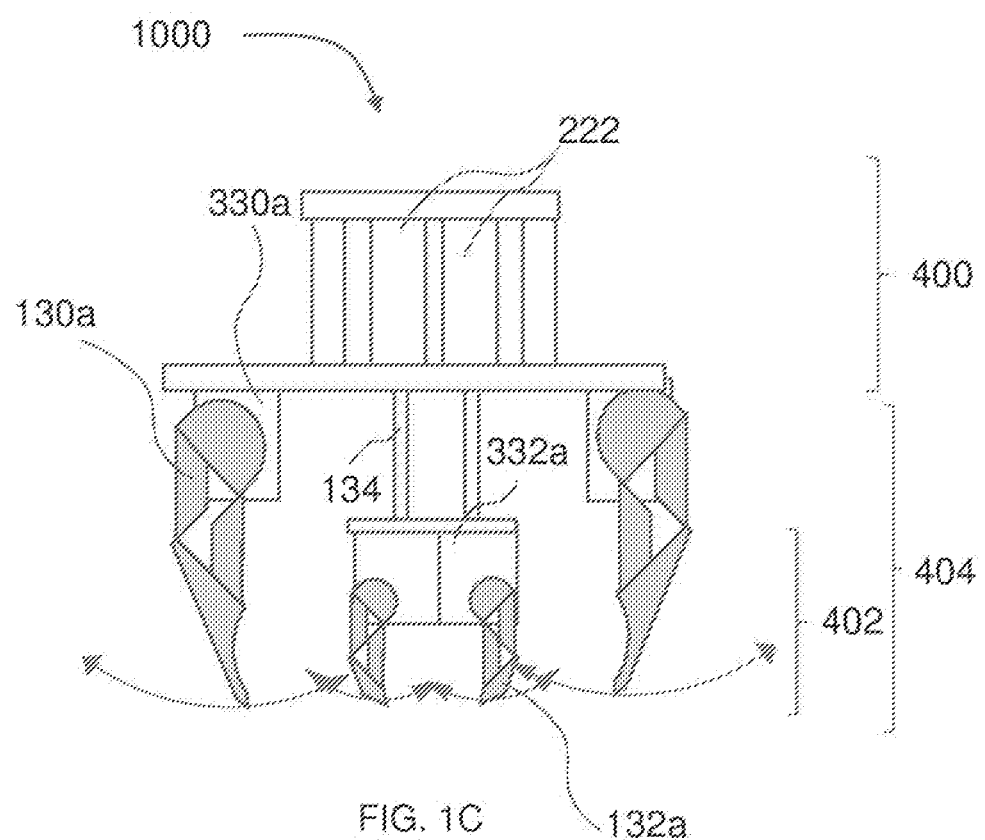
FIG. 1C is a schematic side view of a second example of multistage soft robotic gripper with an inner tool in an extended position.

As shown in FIGS. 1A, 1B and 1C (and similarly for components appearing in subsequent Figures having substantially the same appearance, whether or not numerically referenced specifically, e.g., FIGS. 2A-2D), the multistage gripper 1000 may include the gripper carriage 400. The gripper carriage 400 may transport the perimeter gripper 404 and the tenting tool 402 together.

The tenting tool 402 may include a plurality of opposed soft robotic or compliant robotic fingers 132, optionally two fingers 132 in a pinching orientation. In an embodiment, e.g., FIG. 2D, the tenting tool 402 may include a vacuum or suction cup gripper (e.g., with a tenting function, but in many cases without a pinching function). Linear actuators or cylinders 222 (optionally fluid power actuators, e.g., air cylinders) may be provided to extend the tenting tool 402 together with its fingers, over the stroke of extension arm(s) 134, 134a. A linear actuator herein is any actuator that generates linear motion, including direct electric linear actuators as ell as other electrical, other mechanical (e.g., rack and pinion with motor, screw, ball screw) and hydraulic structures. The linear actuators 222 may also be biased to float the tenting tool 402 with some resistance, including spring bias and/or damping, such that when the entire carriage 400 is pressed into an article to be picked, the tenting tool 402 passively retracts (and may be subsequently actively retracted by all or a portion of the remainder of its stroke of the extension arm(s) 134, 134a).

The perimeter gripper 404 may be directly mounted to the gripper carriage 400, including a plurality of opposed soft robotic or compliant robotic fingers 130. The fingers 130 may be individually or in groups mounted upon intervening actuators (e.g., linear actuators for changing the pitch from finger to finger 130, or angular actuators for changing an angular orientation of one or more fingers 130 from the shown positions).

Each of the sets of fingers 130 (perimeter gripper) and fingers 132 (tenting tool) are optionally separately actuated (e.g., in groups having separate open, closed, and optionally idle positions), and further, optionally individually actuated (e.g., again with different positions), or actuated in opposing pairs. For example, the perimeter gripper 400 fingers 130 may be actuated by a first air and/or vacuum circuit 330, and the tenting tool 402 fingers 132 may be actuated by an independent, second air and/or vacuum circuit 332. If electrically actuated, these independent actuators may be by a first electrical actuator 330a and second electrical actuator 332a.

In the case of an inflatable soft robotic configuration, the outer or perimeter gripper 400 fingers 130 may include more "accordion" or bellows chamber segments than the inner gripper or tenting tool 402 fingers 132, reflecting that perimeter gripper 404 often acts as a bunching, collecting, clenching or grasping outer tool, while the tenting tool 402 often acts as a pinching, drawing, tacking, or pressing inner tool. For example, the outer tool 404 may have 4-9 (e.g., 5) accordion segments in each finger 130, arranged in a circle-like (e.g., circle, oval, facing arcs, polygonal) configuration about or around the inner tool's fingers 132, which may have 1-3 (e.g., 2) accordion segments in each finger 132, as well as or alternatively a narrower width of the fingers 132 in comparison to the outer fingers 130.

In operation, the actuators 202, 330, 330a, 332, 332a may be controlled to actuate in a two or three (or more) stage sequence to first fix (e.g., pinch and/or press) the target object (e.g., polybagged article) with only the inner finger pair 132, optionally move the inner pair 132 and/or carriage 400 or EOAT upward from the target object, and then optionally grip the drawn up portion of the target object with the outer fingers 130. Two or three or more independent air/vacuum circuits may operate the actuators 202, 330/330a, and 332/332a.

The fingers 130, 132, if inflatable soft robotic fingers (as shown in FIGS. 1A and 1B) may be actuated by compressed (or vacuum) air (e.g., in which case they may benefit from equalization among fingers under the same air actuation and inherent compliance/adaptation), another compressed fluid, or electrically (e.g., by providing a micro-compressor and vacuum generator). If the fingers 130, 132 are cable-actuated soft robotic fingers (e.g., as in FIG. 2C), they may be actuated electrically (by tightening and loosening internal cables, wires, or "tendons" via step motor, servo motor, or other electric motor and accompanying relative or absolute position feedback). If the fingers 130, 132 are motor-actuated compliant fingers (as shown in, e.g., FIGS. 1C, 2B, 15-20, and/or 26-30), they may be actuated electrically (by a step motor, servo motor, or other electric motor and accompanying position feedback).

Figure 2B:
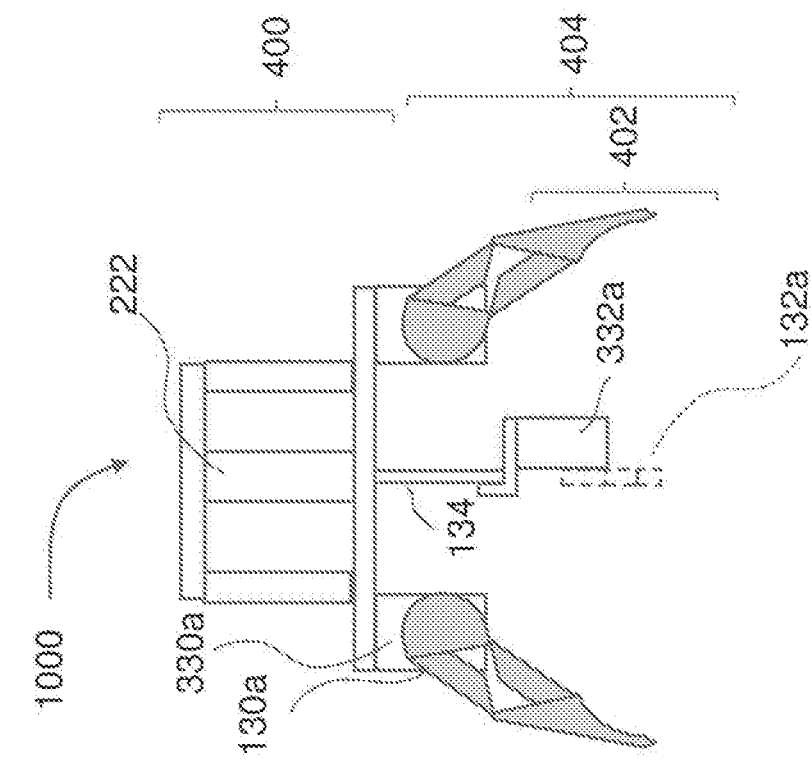
FIG. 2B is an alternate side view of a variant of the second exemplary multistage soft robotic gripper with a inner tool in an extended position, showing a range of motion of resilient linkage fingers without the effect of curling in response to a payload.
Figure 2A:
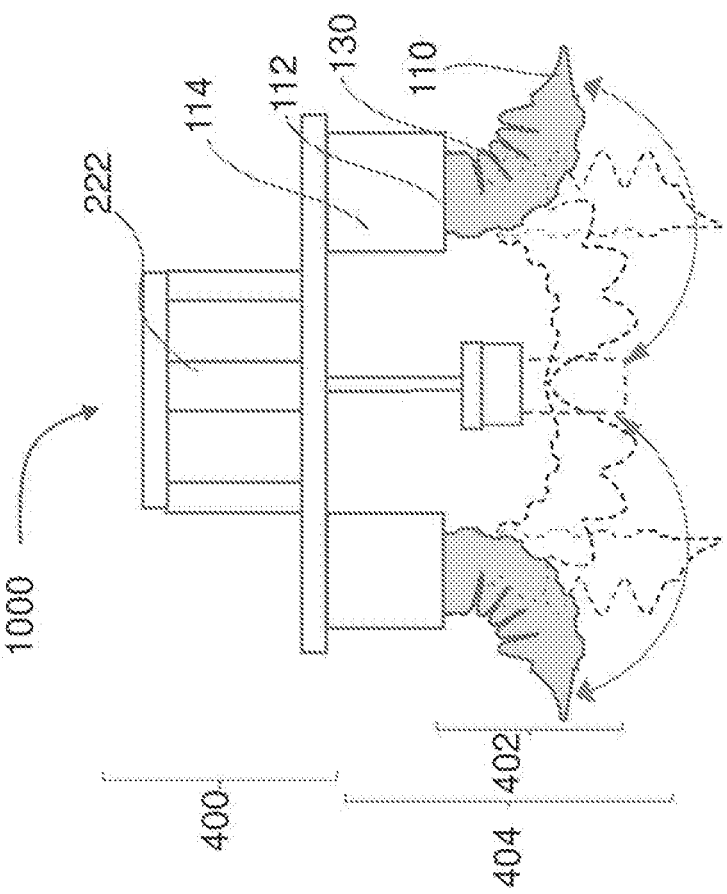
FIG. 2A is an alternate side view of a variant of the first exemplary multistage soft robotic gripper with a inner tool in an extended position, showing a range of motion of inflatable fingers in negative pressure (open), neutral or ambient pressure, and positive pressure (closed) positions.

FIG. 1C shows an alternative structure for a compliant robotic gripper 1001, with a similar operation and in some ways, analogous structure. Structural and operational disclosure and description herein, as well as claims, may be considered by one of skill in the art to apply in common to a soft robotic gripper and a compliant robotic gripper, e.g., as shown in FIGS. 1C and 2B, 15-20, and/or 26-30. An example of an analogous operational step between soft and compliant fingers is shown in FIGS. 2A, 2B, reflecting step S02 of FIG. 3, and as shown in FIGS. 6A-6B (soft, inflate/vacuum) and 15A-15B (compliant, four-bar). As one example, a compliant robotic finger 130a or 132a, as shown in FIGS. 1C and 2B, 15-20, and/or 26-30, may be formed as a four-bar linkage of elastomer links connected by elastomer flexure pivots (e.g., the pivots having a limited range and spring-scaling resistance to pivoting). The stiffness/compliance of any or all the links may be predetermined using a greater or lesser cross-sectional area of any of the 4 links, material selection of any of the 4 links, or reinforcement of any of the 4 links. As shown, using "fixed/frame", "crank", "coupler", and "follower/lever" terminology, the entire finger-as-a-linkage may be rotated for actuation about the fixed/frame link (shown as a substantially semi-circular fixed/frame link). The links may be connected to one another at each pivot by elastomer flexures or segments that, absent a threshold force greater than the weight of the fingers, tend to hold the entire finger linkage in a default position.

When the resilient four-bar finger 130a, 132a is rotated to contact an article, it applies a contact force, and each elastomer link may deform compliantly or elastically (made of rubber or other elastomer), but the elastomer flexures will tend to deform first. Pressure/resistance from the article upon the coupling link (e.g., tip of the finger) causes the crank and follower links to track along their determinate paths, with increasing force and increasing resistance (as well as different linkage poses) as the contact pressure increases. The links may be selected of lengths and thicknesses, including extensions from the coupler link to, e.g., enact a grasping motion as the linkage tracks through its path(s) (as with fingers 130a) or enact a pinching motion as the linkage tracks through its path(s) (as with fingers 132a). Hard-stops may be programmed using internal thicknesses and relief, e.g., as discussed in U.S. Patent Publication US20180117773A1, incorporated herein by reference in its entirety. In contrast to soft robotic fingers, compliant four-bar fingers may not rely upon the self-leveling properties of a compressible air reservoir shared among fingers and other air chambers for, e.g., compliance, shape adaptation and the like; and scaling the number of fingers and shared actuation and control of groups of fingers becomes more complex (with multiple motors, transmissions, linkages, and/or under-actuation schemes rather than common air sources and interconnected air tubes, manifold, or plenum). In addition, the compliant fingers do not provide the form-following, shape-matching grasp of soft robotic fingers.

Figure 1D:
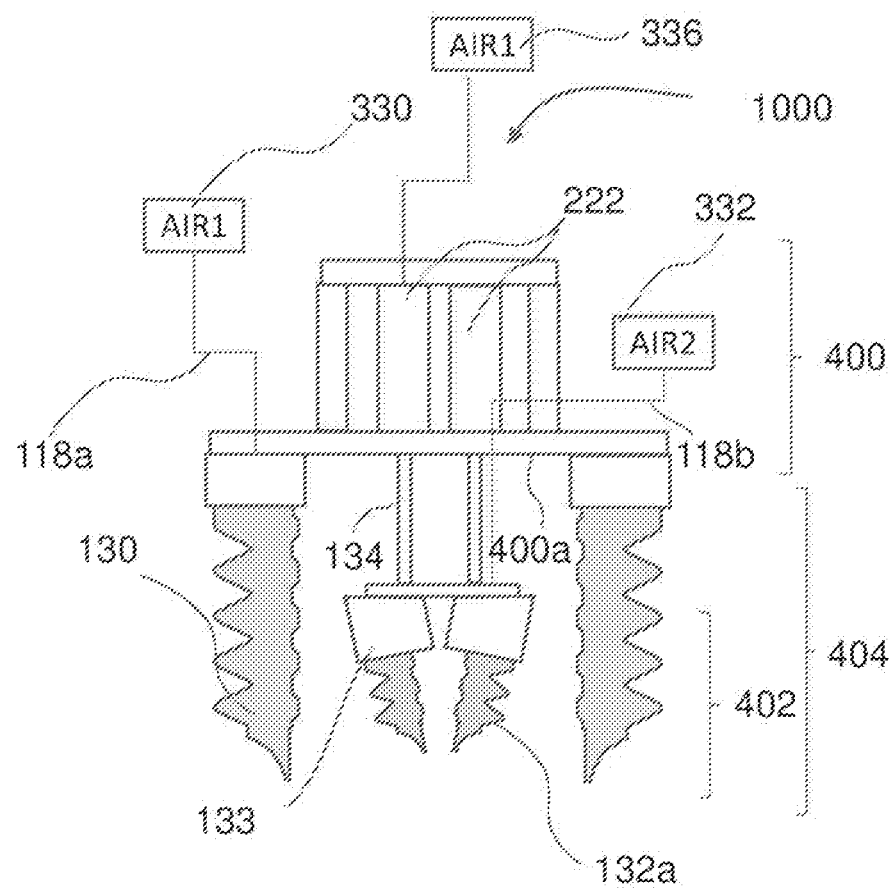
FIG. 1D is a schematic side view of a second variant of the first exemplary multistage soft robotic gripper with an inner tool in an extended position, inflatable pinching fingers of the inner tool being angled toward one another.

FIG. 1D shows a structural variation of FIG. 1A, in which the base mounts 133 and the bases/bezels 133 of the fingers 132a are inclined toward each other by a small angle, e.g., 3-20 degrees each, e.g., 7-10 degrees each. Accordingly, in their neutral position, neither inflated nor under vacuum, the central air channels are also inclined with respect to one another, as are the clamping surfaces. This arrangement significantly increases the pinching force or clamping force of the soft robotic actuators 132a, e.g., and/or the amount of external force required for a held article to slip out.

As shown in FIG. 1D, a gripper system 1000 for handling a bagged object 444 includes a pinching gripper 402 including opposing pneumatic fingers 132a angled toward one another in an unactuated state, the pinching gripper being actuated by a first actuator 332 to form a pinched fold in the bagged object 444 between the pneumatic fingers 132a. Angled blocks 133 may be used to angle the fingers 132a. A retraction mechanism 222, 134 is actuatable by a second actuator 336 to retract the pneumatic fingers 132a, the pinched fold, and the bagged object 444. A grasp-type gripper 404 formed from resilient members 130 and is actuatable by a third actuator 330 to grasp the resilient members 130 about the retracted pneumatic fingers 132a, pinched fold, and bagged object 444.

Figure 31B:
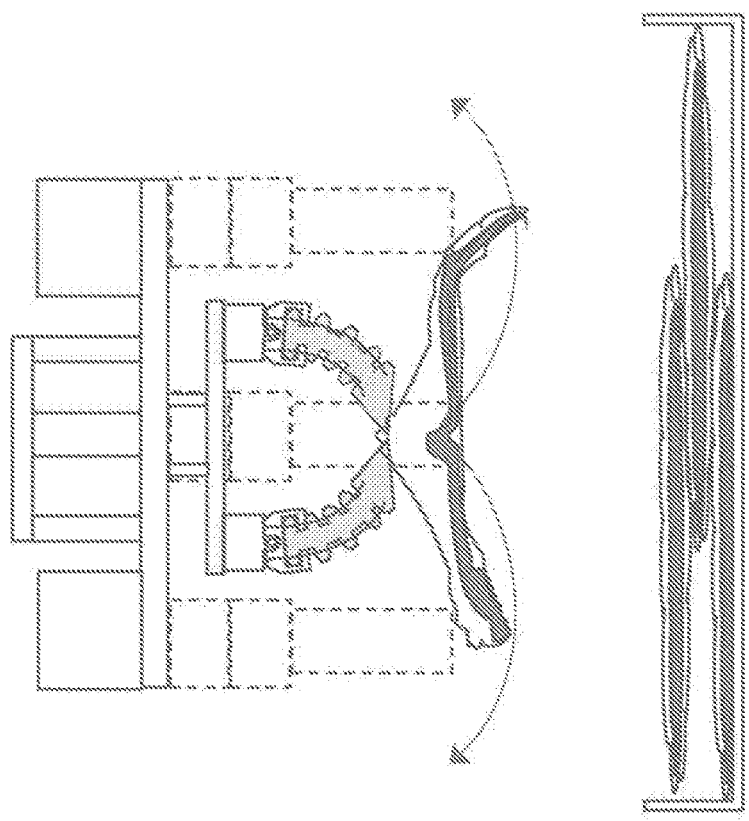
FIGS. 31A and 31B show alternate schematic side views of the third exemplary multiform gripper in a retract inner tool and fold step of a picking process (e.g., step S12 of FIGS. 4B-5B).
Figure 31A:
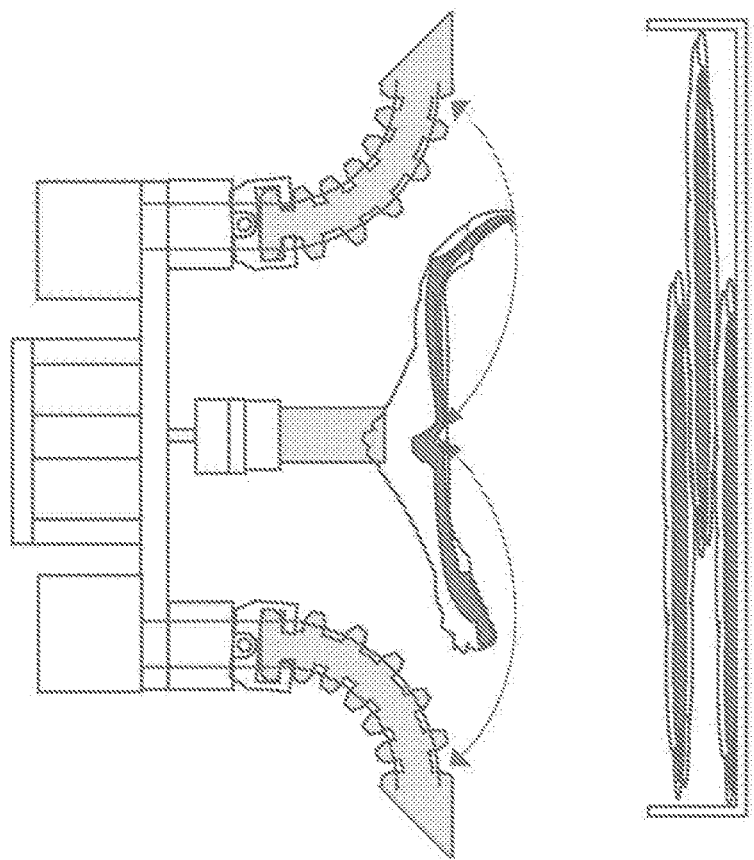

FIG. 2C shows another alternative structure for a compliant robotic gripper 1001, with a similar operation and in some ways, analogous structure. Structural and operational disclosure and description herein, as well as claims, may be considered by one of skill in the art to apply in common to a soft robotic gripper and a compliant robotic gripper. As one example, a compliant robotic finger 130b, 132b, as shown in FIGS. 2C, 31A, and 31B may be formed as a substantially solid ridged elastomer finger with spaced ridges (e.g., the elastomer finger having a limited range as the spaced ridges approach each other during bending), with retractable tendons or cables 331, 333 extending through the ridges to the distal end of the elastomer fingers. The stiffness/compliance of the elastomer fingers may be predetermined using a greater or lesser durometer or spring constant of the elastomer, or a greater or lesser cross-sectional area of the elastomer fingers or ridges. The elastomer finger tends to hold itself in the position in which it was formed or molded, and so can have a "straight" position if molded this way, or curved (and then pulled straight against the bias of the elastomer).

When the resilient ridged finger 130b, 132b is curled to contact an article, it applies a contact force, and the resilient ridged finger 130b, 132b may deform compliantly or elastically Otherwise, the operation may be as discussed in Hard-stops may be programmed using internal thicknesses and relief, e.g., as discussed in U.S. Patent Publication US20190126497 A1, incorporated herein by reference in its entirety. In contrast to inflatable robotic fingers, solid elastomer ridged cable-driven fingers may not rely upon the self-leveling properties of a compressible air reservoir shared among fingers and other air chambers for, e.g., compliance, shape adaptation and the like; and again, scaling the number of fingers and shared actuation and control of groups of fingers becomes more complex (with multiple motors, transmissions, linkages, and/or under-actuation schemes rather than common air sources and interconnected air tubes, manifold, or plenum). In addition, the solid elastomer ridged cable-driven fingers do not provide the form-following, shape-matching grasp of inflatable robotic fingers.

Figure 2D:
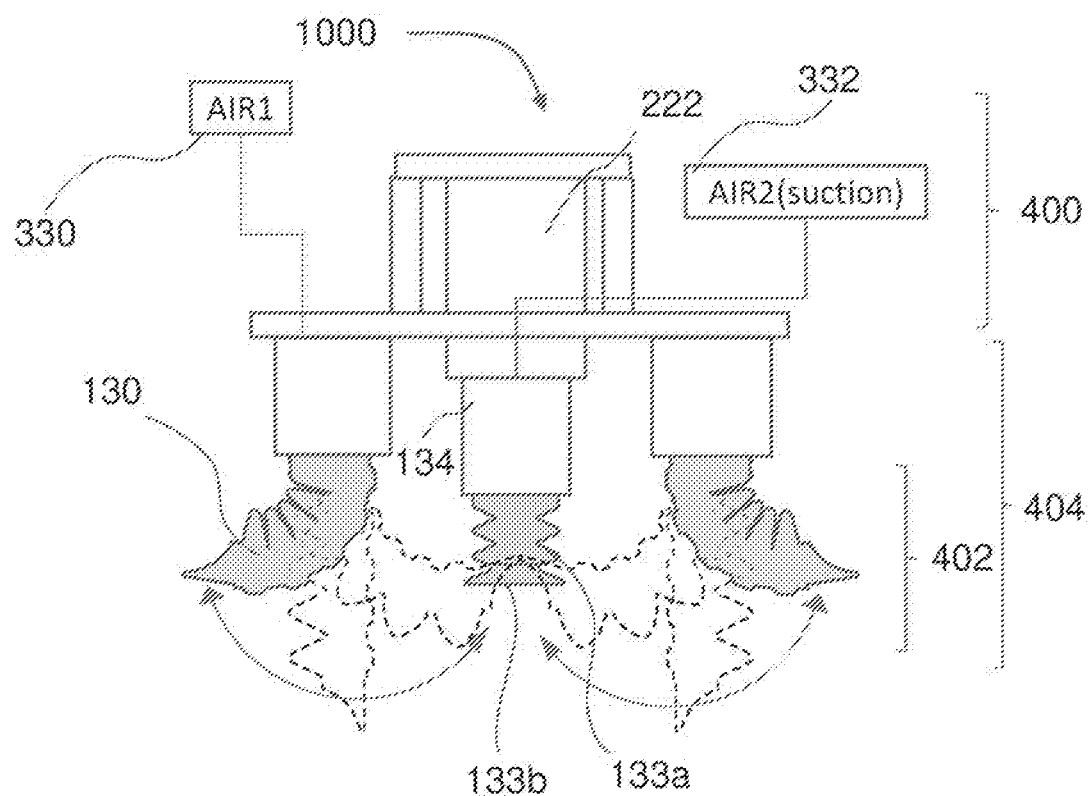
FIG. 2D is a side view of a fourth exemplary multistage soft robotic gripper having a suction or vacuum cup actuator as an inner tool, showing a range of motion of inflatable fingers in open, neutral, and closed positions.

FIG. 2D shows another alternative structure for a compliant robotic gripper 1001. In this case, the inner pinching fingers 132 are replaced with a retractable astrictive effector, e.g., a vacuum cup, having a bellows portion of stiffer, higher durometer 133a and a cup portion of more resilient, lower durometer 133b. Structural and operational disclosure and description herein, as well as claims, may be considered by one of skill in the art to apply in common to a soft robotic gripper and a compliant robotic gripper. Although the astrictive effector, e.g., vacuum cup does not "pinch" a web, polymer film, or cloth, and description herein discussing pinching or clamping does not describe the operation of the vacuum cup, the process steps herein may be substantially similarly ordered, the vacuum cup singulating or lifting a bagged article (although not necessarily as effectively or reliably as a pinching tool). The vacuum cup may be a modular vacuum cup system, e.g., such as the PiGrip system, or may alternatively be a vacuum-operated unitary gripper, as disclosed in U.S. Patent Publication No. US20190263002, herein incorporated by reference in its entirety.

Figure 2E:
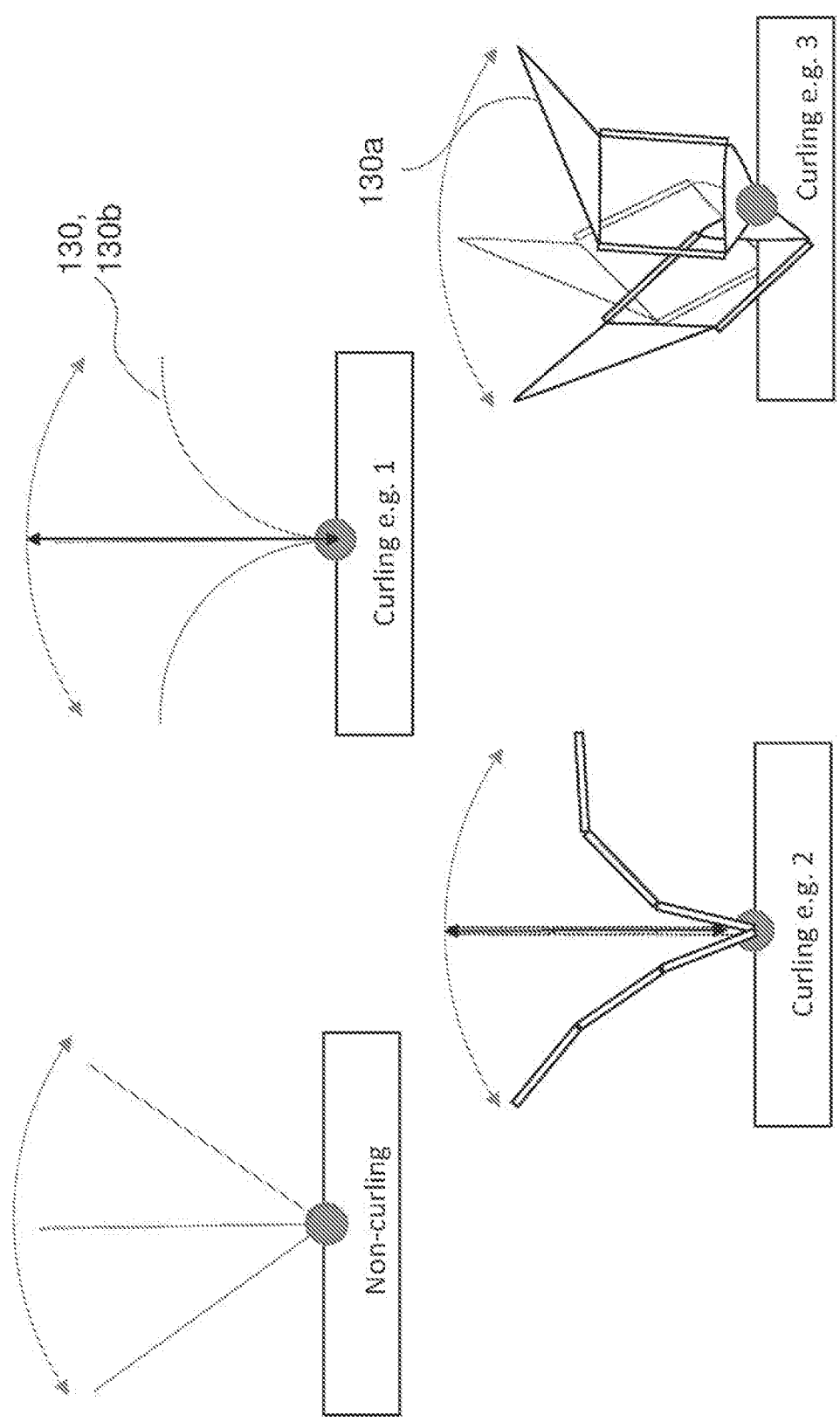
FIG. 2E is a set of schematic views demonstrating curling fingers or variably curving fingers as discussed herein with reference to the gripper structures of FIGS. 2A-2D.

FIG. 2E is a set of schematic views demonstrating curling fingers or variably curving fingers as discussed herein with reference to the gripper structures of FIGS. 2A-2D. As shown in a member or resilient member 130, 130a, 130b may considered to curl or variably curve if a distance between the base and the distal end changes as the member swings under actuation, e.g., the tip or distal end traces part of a spiral or spiral-like path (the path of a the distal end in a plane moving around a central point at the base of the member continuously or regularly approaches the central point). As illustrated in the several examples, a swinging or pivoting rigid member does not curl or variably curve. A segmented finger, soft robotic finger 130, 130b, or resilient linkage finger 130a may curl or variably curve. curling grippers 130, 130a, 130b curl in the manner of a finger or tentacle (and may swing, for example, if supported by a pivoting base, not shown). Each of the examples of FIG. 2A (an inflatable soft robotic gripper), 2B (a resilient link, living hinge based four-bar linkage gripper), and 2C (a cable or tendon operated soft robotic gripper) are curling grippers with curling fingers 130, 130a, 130b.

Grippers as EOAT Upon a Robot Arm

As shown in FIGS. 1A-2E, a robotic gripper 1000, 1001 as discussed herein may include one or more soft robotic members 100 (representative of soft and/or compliant fingers 130, 132, 130a, 132a, 130b, 132b discussed herein), which may take organic prehensile roles of finger, arm, tail, or trunk, depending on the length and actuation approach. The present disclosure tends to use "finger" to describe the members, but any bendable soft robotic member may be used in place of a finger. In the case of inflating and/or deflating soft robotic members, two or more members may extend from a hub and the hub may include a manifold for distributing fluid (gas or liquid) to the gripper members and/or a plenum for stabilizing fluid pressure to the manifold and/or gripper members. The members may be arranged like a hand, such that the soft robotic members act, when curled, as digits facing, a "palm" against which objects are held by the members; and/or the members may also be arranged like an cephalopod, such that the soft robotic members act as arms surrounding an additional central hub actuator or sub-effector (suction, gripping, or the like).

Figure 2F:
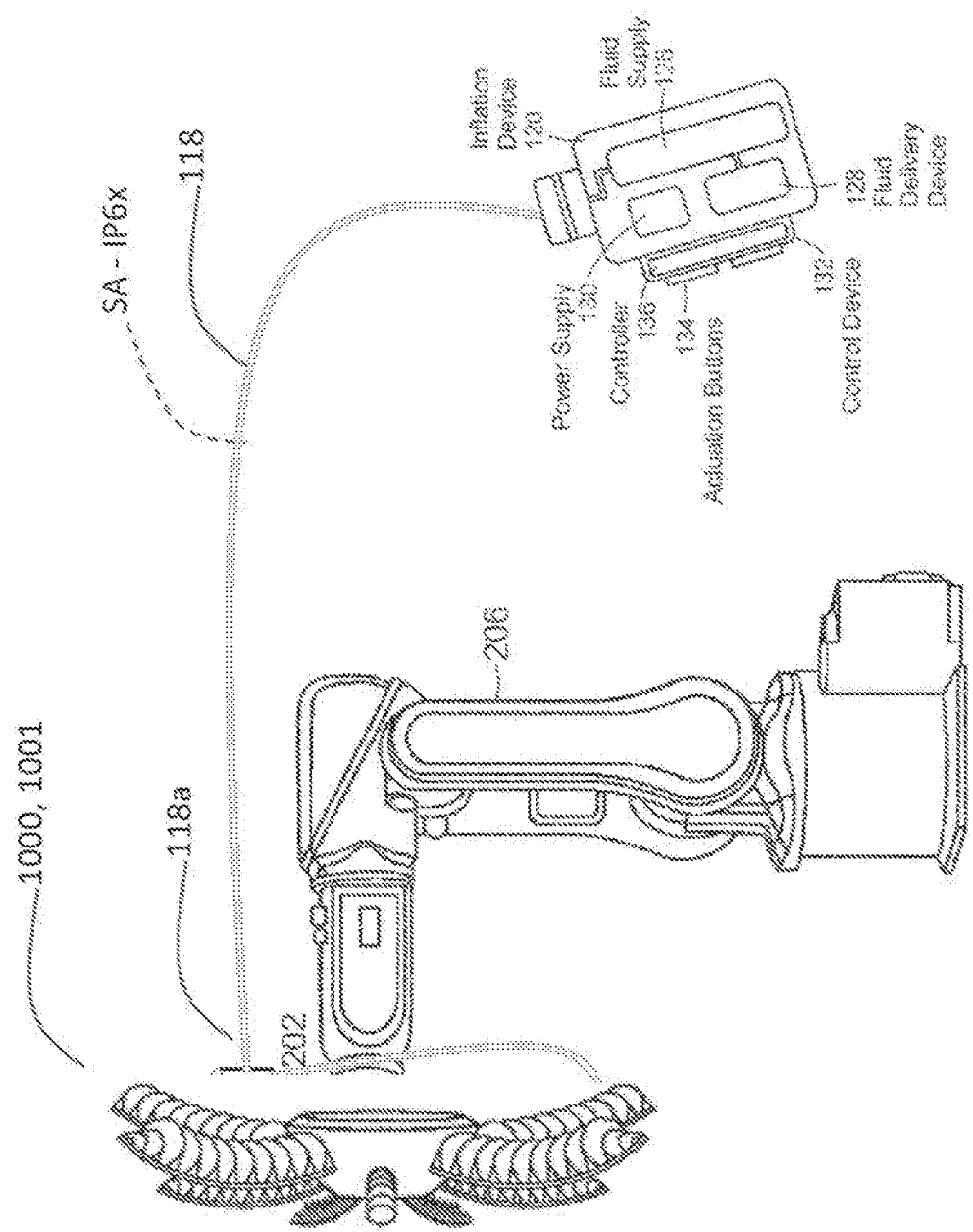
FIG. 2F is a schematic view of a multistage gripper secured to an industrial or collaborative robot arm in order to enable the combined manipulator-EOAT system to pick and place objects of interest.

As shown in FIGS. 2A and 2F, a member or finger 130 may extend from a proximal end 112 to a distal end 110. The proximal end 112 may connect to a finger mount or interface 114. The finger mount 114 may be made of a hygienic or food contact material, such as polyethylene, polypropylene, polycarbonate, polyetheretherketone, acrylonitrile-butadiene-styrene ("ABS"), or acetal homopolymer. The finger mount 114 may be releasably coupled to one or both of the finger 100 and/or the flexible tubing 118 (shown in FIG. 2E), e.g., via a pneumatic coupling. The finger mount 114 houses and directs air to and from the finger 100 via a port in the finger 100. Different finger mounts 114 may have different sizes, numbers, or configurations of finger 100.

As shown in FIGS. 2A and 2F, an inflatable finger 1 may be inflated with an inflation fluid, pneumatic or other, from an inflation device or controller 120 through flexible tubing 118 (representing 118*a* or 118*b*). Where pneumatic inflation/deflation is discussed herein, except where constraints particular to pneumatic operation are inherent or expressly discussed, other fluids may be used. The finger mount 114 may include or may be attached to a valve for allowing air to enter the finger 130 but preventing air from exiting the finger 130 (unless the valve is opened). The flexible tubing 118, 118*a*, 118*b* may also or alternatively attach to an inflator valve at the inflation device 120 or controller for regulating the supply of air and/or vacuum at the location of the inflation device.

As shown in FIG. 2F, the inflation device or controller 120 may include a fluid supply 126, which may be a reservoir for storing compressed air, liquefied or compressed carbon dioxide, liquefied or compressed nitrogen or saline, or may be a vent for supplying ambient air to the flexible tubing 118. The inflation device 120 may further includes fluid delivery device 128, such as a pump or compressor, for supplying inflation fluid from the fluid supply 126 to the actuator 100 through the flexible tubing 118. The fluid delivery device 128 may be capable of supplying fluid to the actuator 100 or withdrawing the fluid from the actuator 100. The fluid delivery device 128 may be powered by electricity.

As shown in FIG. 2F, an assembled effector 1000, 1001 may be secured to an industrial or collaborative robot (e.g., robotic arm) 206 via a mounting flange in order to enable the arm 206 to pick and place objects of interest. The mounting flange may be configured to mate with a corresponding flange on the robotic arm 206 to secure the end effector system robotic arm 206. An adapter may be used to interface between the mounting flange 204 and different manufacturers' robot arm 206 mounts. A pneumatic passage may be provided through the mounting flange to allow an inflation fluid to pass from the robotic arm 206 through the mounting flange and into the actuator fingers 130, 132.

FIG. 2F depicts a particular example in which an end effector is deployed on a robotic arm 206, but in some embodiments the fingers 130, 132 may be deployed on a gantry or other mechanism.

The fingers 130, 132 or grippers in this array may be driven in that the position of a finger 130, 132 or a gripper can be changed via the action of a machine. For example, the fingers 130, 132 may be driven via a motor that drives a screw or belt that is attached to the fingers 130, 132, or by a pneumatically-actuated piston that is attached to the finger 130, 132 or gripper.

Operation

The operation of the gripper discussed herein is optionally multi-mode: two, three, or more modes, with the mode selected based on a criteria (such as measured size, a trigger event, a failure with a prior attempt).

In one basic polybagged article routine (suitable, in some cases, for smaller bagged clothing articles), the polybag is relatively loose, and the enclosed article relatively thin (e.g., less than 6 thicknesses of folded cotton fabric and pliant). The inner tool 402 first pinches the outer polybag 444*a*, and the pinched bag assembly 444(*p*) is lifted as a whole, with the polybag 444*a* tenting over the inner article. The outer tool 404 closes, and crumples one or both of the outer polybag 444*a* and the enclosed article 444*b*, while grasping, grabbing, capturing, enclosing or enveloping the crumpled portion. That is, the closing of the outer tool 404 may secure purchase on mostly the outer polybag 444*a*; also upon the enclosed article 444*b*; or mostly on the enclosed article 444*b*. Elements of this pick include pinching the outer polybag 444*a* with the inner tool 402, lifting the assembly 444(*p*) to be picked, and clenching or cradling the assembly 444(*p*), e.g., as shown in FIGS. 11A-11B.

Figure 3A:
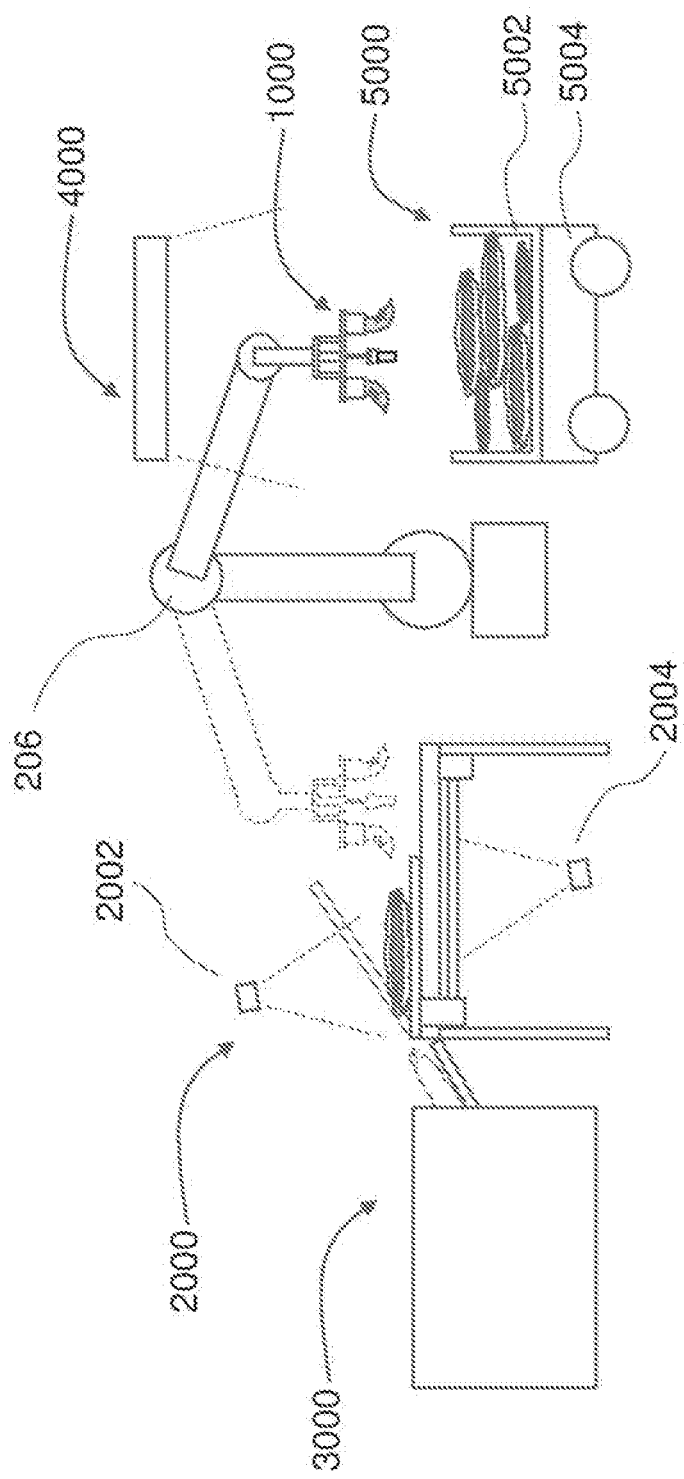
FIG. 3A is a schematic view of a manipulator-EOAT system integrated with a multi-side image/model capture and/or code scanning system and a destination conveyance system.
Figure 4A:
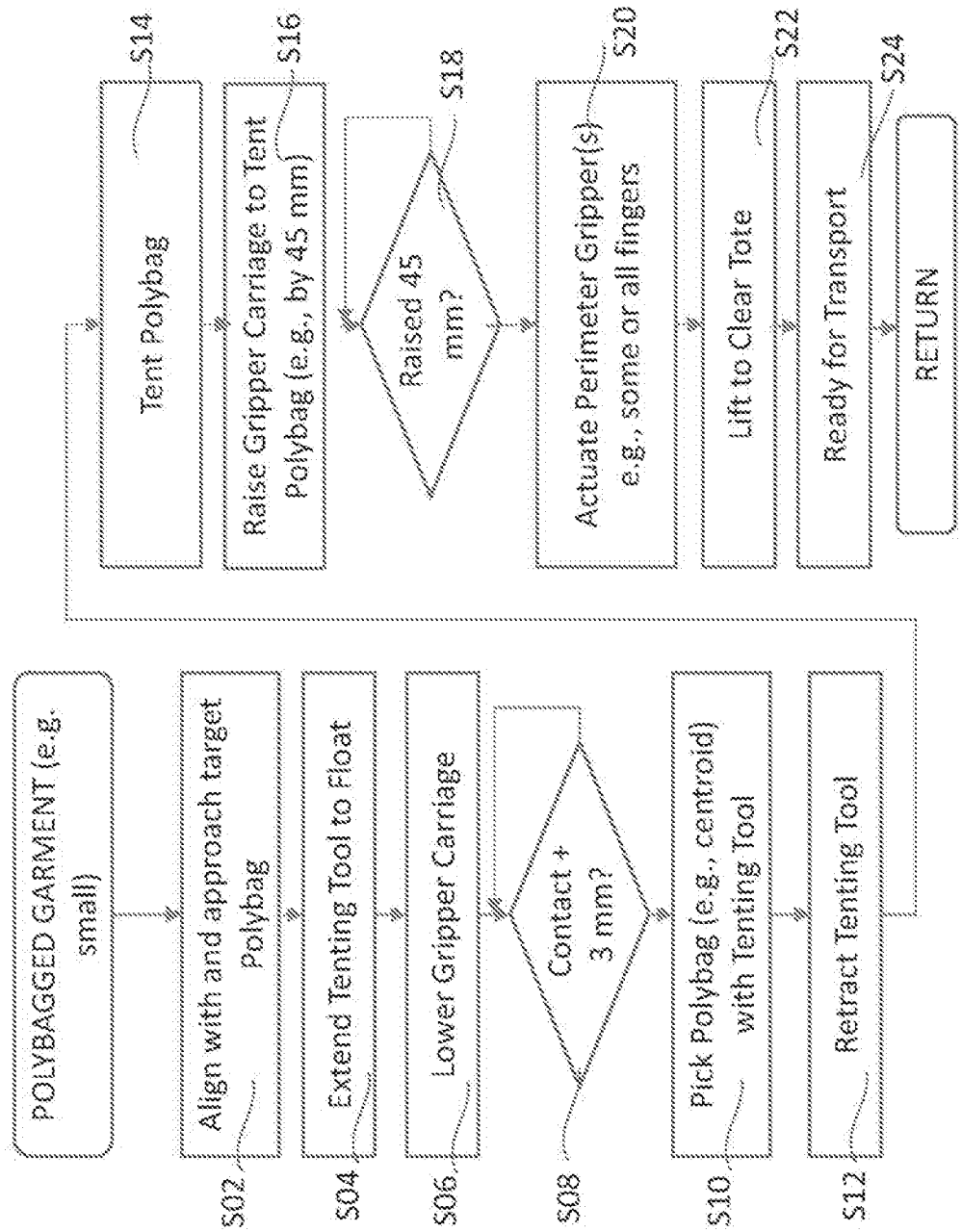
FIG. 4A is a flow chart showing steps and/or acts in a first exemplary process of picking a bagged article or polybagged garment using a system such as that in FIG. 2E or 3A.

As shown in FIGS. 2A-2D (with different forms of multistage gripper), in schematic form in FIG. 3A, and in the flowchart in FIG. 4A, in step S02, the robot arm 206, using pre-programmed or manual operation or a targeting vision system 4000 is configured to align the gripper 1000 carriage 400 with the target, e.g., polybagged article 444 (e.g., vertically or from above, e.g., the polybagged article 444 residing in a stack or even alone within a tote bin or box 5002).

This state, step S02, is schematically shown in a front view with a soft robotic, inflatable fingers 130, 132 in FIG. 6A, and in a side view with soft robotic, inflatable fingers 130, 132 in FIG. 6B. An exemplary range of motion of the fingers 130, 132 is shown with dashed lines. In the front view of FIG. 6A, the tenting tool 402 is generally sideways to the page, and is shown in dashed lines for simplicity. In the side view of FIG. 6B, in contrast, the perimeter gripper 400 is generally sideways to the page, and is shown in dashed lines for simplicity. Accordingly, in this configuration, the fingers 130 of the perimeter gripper 400 actuate or curl in a plane substantially perpendicular to a plane of actuation or curling of the fingers 132 of the tenting tool, which generally permits the pitch or width of the grasp of the perimeter gripper 400 to be smaller, e.g., the fingers 132 facing each other at a closer distance.

Similarly, step S02 is schematically shown in a front view with compliant fingers 130*a*, 132*a* in FIG. 15A, and in a side view with compliant fingers 130*a*, 132*a* in FIG. 15B, with an exemplary range of motion of the fingers 130*a*, 132*a* shown with arced, double-ended arrows. Again, some parts in the views are shown in dashed lines for simplicity. In FIG. 6B, three different air supplies are shown—AIR1, for operating an inboard pair of the peripheral fingers 130-I, AIR2, for operating the singulating tool or pinching tool 132, and AIR3, for operating two outboard pairs of the peripheral fingers 130-O. In this manner, in Step S20, for example, the controller may actuate the perimeter gripper in at least two primary ways—just the inboard pair 130-I, or both the inboard pair 130-I and the two outboard pairs 130-O. These air supplies are preferably also vacuum supplies, and the plurality of air supplies AIR 1-3 may be individual air supplies, but may also be valved, switched, and/or routed from one shared air supply, compressor, air line, or the like.

In step S04, the tenting tool 402 is actuated or released to extend from the carriage 400 by the controller 120 via the linear actuator or cylinder 222. Sensors, such as limit switches, may be connected to the controller 120 to provide feedback that the tenting tool 402 is at its intended extension. In step S06, the robot arm 206 lowers the entire gripper carriage 400 at an appropriate rate. In step S08, the controller 120 or other controlling computer or circuit determines whether the gripper carriage 400 has sufficiently contacted the article to be picked, e.g., using a limit switch on the extension arms 134, 134a, vision systems, strain gauges, or other sensing. Accordingly, in step S04, the tenting tool 402 is extended to float below the carriage 400, to a position at or below the position shown in FIGS. 7A and 7B (Step S08). In step S06, the gripper carriage is lowered to the target polybag.

Figure 16B:
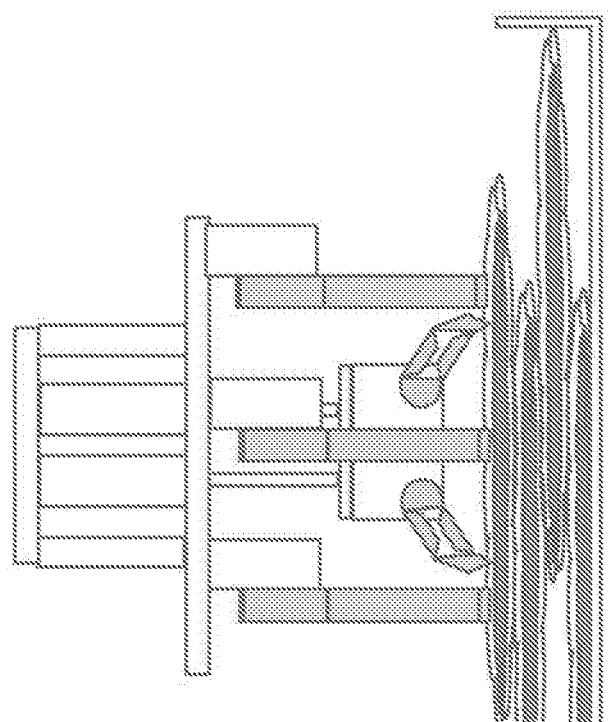
FIGS. 16A and 16B show alternate schematic side views of the second exemplary multiform gripper in a contact depth checking step of a picking process (e.g., step S08 of FIGS. 4A-5B).
Figure 16A:
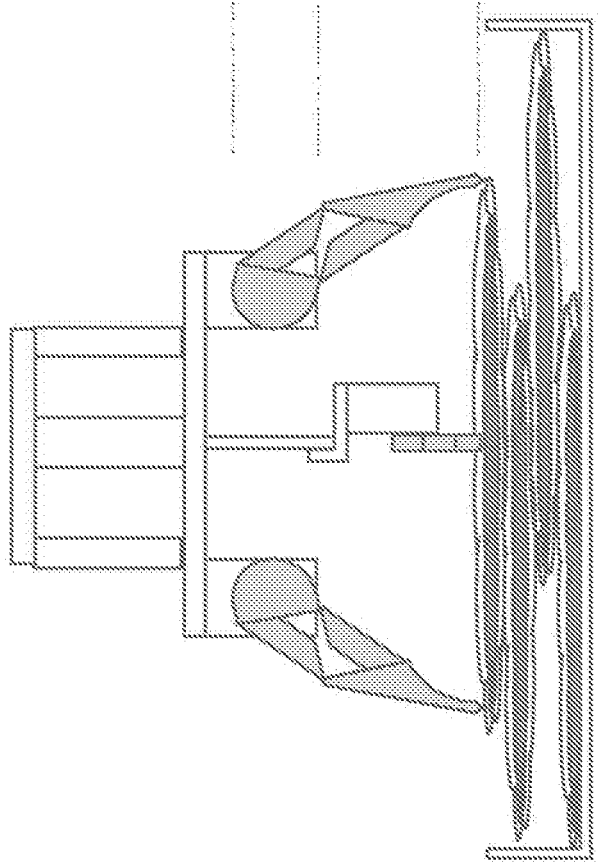

Step S08 is schematically shown in a front view with soft robotic fingers 130, 132 in FIG. 7A and with compliant fingers 130a, 132a in FIG. 16A; and is schematically shown in a side view with soft robotic fingers 130, 132 in FIG. 7B and with compliant fingers 130a, 132a in FIG. 16B. As shown in FIGS. 7A and 7B, via steps S06 and S08 in combination, the tenting tool 402 contacts the target polybagged article and as the entire carriage continues to move, the open tenting tool 402, floating, is passively pushed up by, e.g., 3 mm.

In step S10, the fingers 132 (or 132a) are actuated to close and pinch the polybagged article, often pinching just the polybag, and in other cases pinching both the polybag and the contained article. In the case of a non-pinching implementation, e.g., astrictive, in most cases only the polybag would be secured. It is an advantage of the pinching strategy that certain articles, e.g., thinner material, can be pinched within the polybag 444a. In such a case, the hold may be secure enough to slew quickly without the peripheral fingers 130, or as the peripheral fingers 130 are being closed or closing. For example, if the article 444b within the polybag 444a is captured in the pinch clamp as well as the polybag, step S20 of the process may be skipped.

Figure 17A:
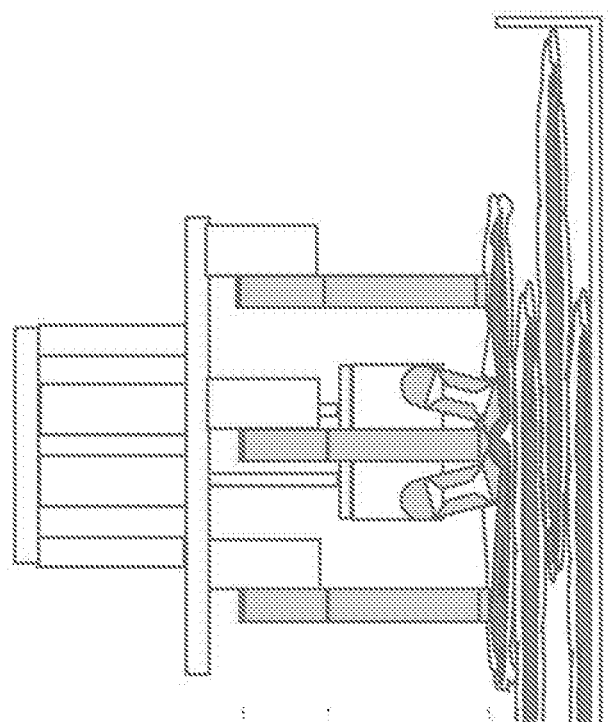
FIGS. 17A and 17B show alternate schematic side views of a second exemplary multiform gripper in a pinch fold step or pick outer bag step of a picking process (e.g., step S10 of FIGS. 4A-5B).
Figure 17B:
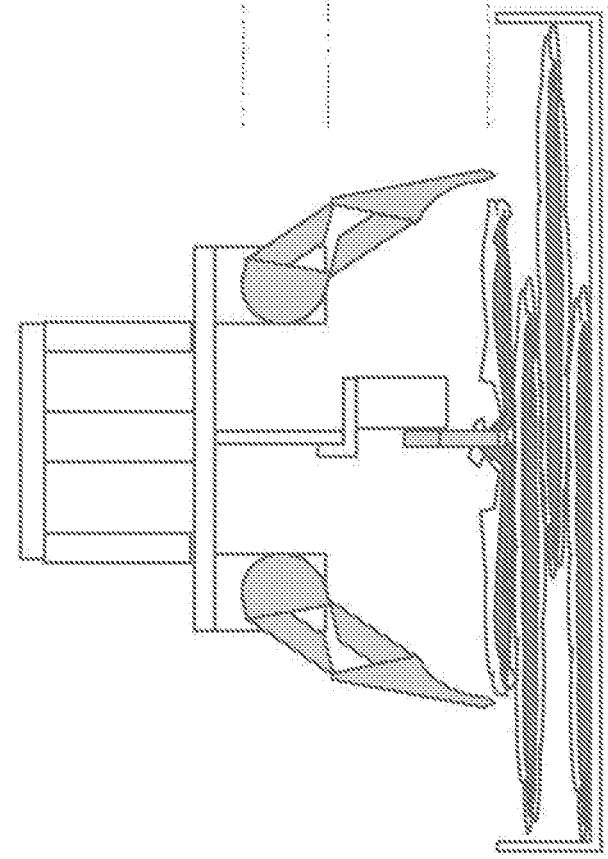

Step S10 is schematically shown in a front view with soft robotic fingers 130, 132 in FIG. 8A and with compliant fingers 130a, 132a in FIG. 17A; and is schematically shown in a side view with soft robotic fingers 130, 132 in FIG. 8B and with compliant fingers 130a, 132a in FIG. 17B.

Figure 9B:
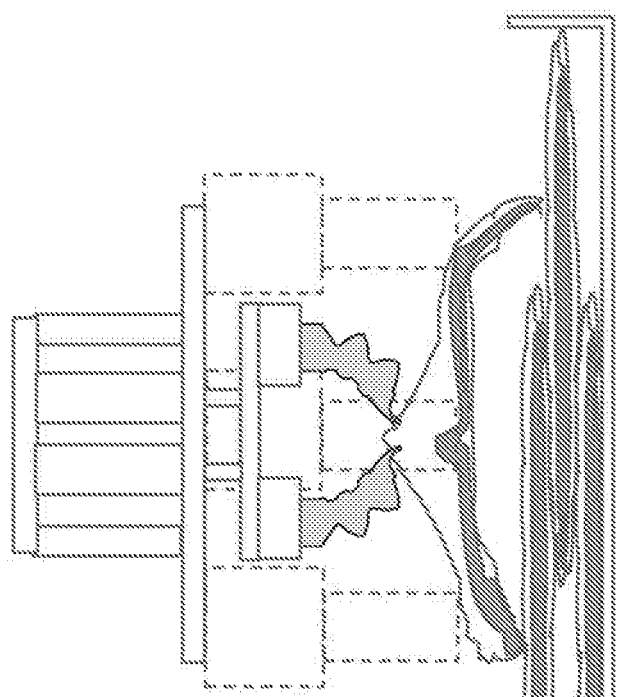
FIGS. 9A and 9B show alternate schematic side views of an exemplary multiform gripper in a retract inner tool and/or tenting of a bag step of a picking process (e.g., steps S12 and/or S14 of FIGS. 4A-5B).
Figure 9A:
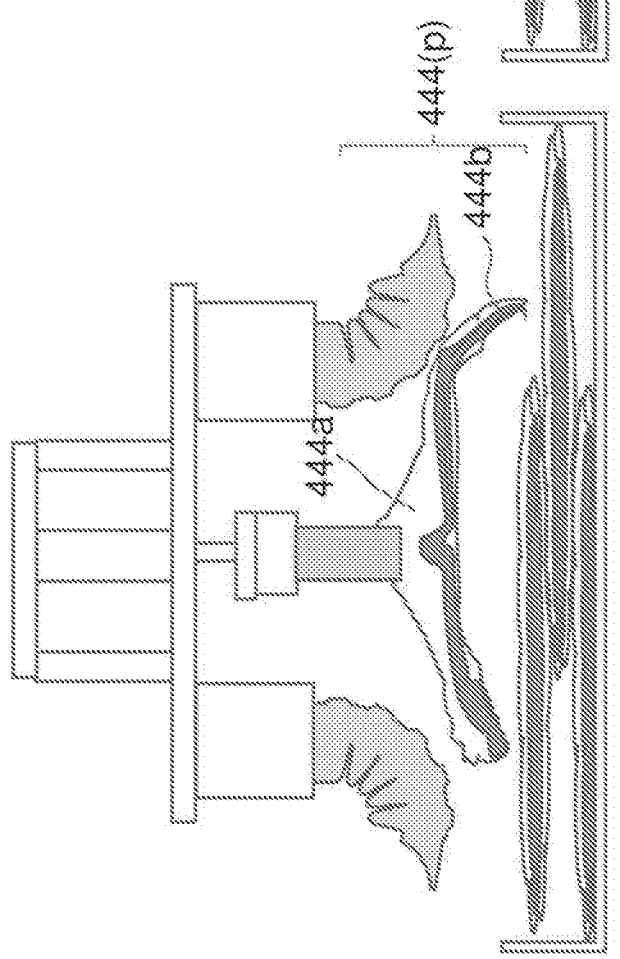

As shown in FIGS. 9A, 9B, in step S12 and step S14, the actuator or cylinder 222 is retracted over the stroke of the extension arm 134, 134a (optionally by only a portion of the stroke, and optionally by a variable amount determined by the controller 120 based on feedback or sensing) to tent or drape (e.g., make a tented film or fabric shape) the polybagged article 444, e.g., suspending it. In some cases, only the polybag 444a tents, in other cases, both the polybag 444a and the contained article 444b follow a tented shape (e.g., when the contained article 444b is also pinched, or when contact or static charge tends to have the article 444b follow the polybag 444a).

Figure 18B:
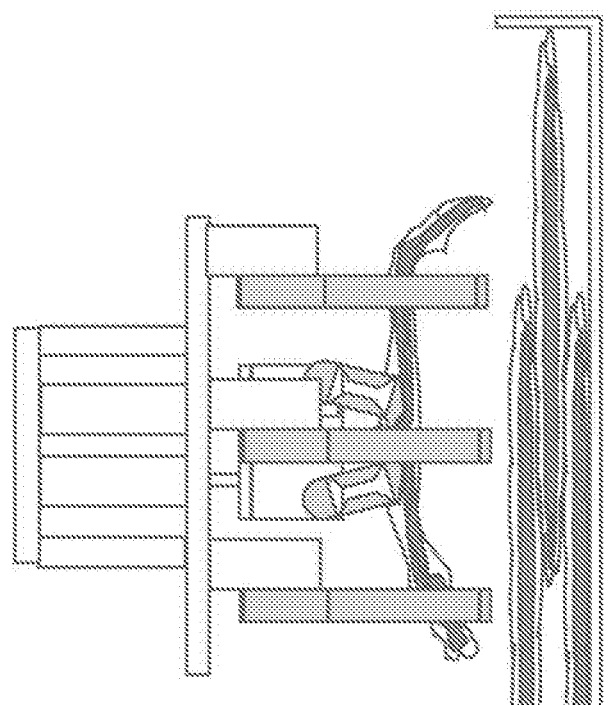
FIGS. 18A and 18B show alternate schematic side views of a second exemplary multiform gripper in a retract inner tool and/or tenting of a bag step of a picking process (e.g., steps S12 and/or S14 of FIGS. 4A-5B).
Figure 18A:
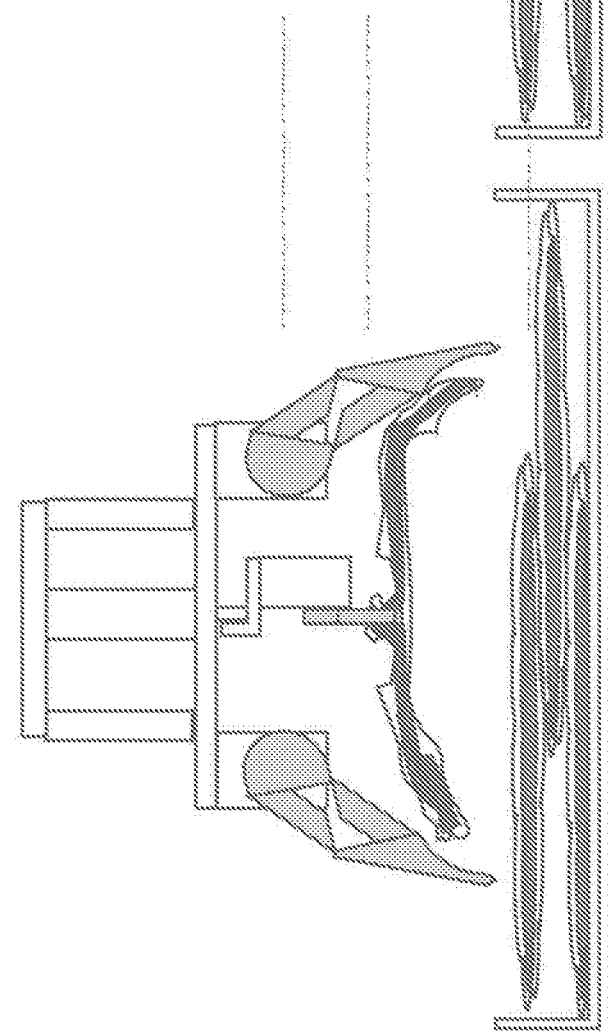

Steps S12-S14 are schematically shown in a front view with soft robotic fingers 130, 132 in FIG. 9A and with compliant fingers 130a, 132a in FIG. 18A; and are schematically shown in a side view with soft robotic fingers 130, 132 in FIG. 9B and with compliant fingers 130a, 132a in FIG. 18B. Moreover, FIGS. 9A and 9B show a circumstance in which the polybag is pinched alone and tends to tent more than the contained article, and FIGS. 18A an 18B show a circumstance in which the polybag and contained article may be pinched together and/or tend to tent together.

In steps S16-S18, the entire EOAT or gripper carriage 400 together with the pinched article are lifted by the robotic arm 206, by in this case about 30-60 mm, preferably 45 mm, to continue tenting or initiate tenting (e.g., in case the retraction did not suspend or tent the article), to suspend the polybagged article 444, and to provide space under the polybagged article 444 for the fingers 130, 130a to capture or grab the tented and/or suspended article.

Steps S16-S18 are schematically shown in a front view with soft robotic fingers 130, 132 in FIG. 10A and with compliant fingers 130a, 132a in FIG. 19A; and are schematically shown in a side view with soft robotic fingers 130, 132 in FIG. 10B and with compliant fingers 130a, 132a in FIG. 19B.

In step S20, the controller 120, via the actuator 330, actuates the perimeter gripper 404 and its fingers 130 to capture the suspended article 444, generally capturing and grasping the sides and/or bottom of the suspended polybagged article 444 in a cupping, cradling, or crumpling motion, and in some cases in a secondary pinching motion (e.g., depending on the size, thickness, stiffness, or weight of the article 444).

Figure 20B:
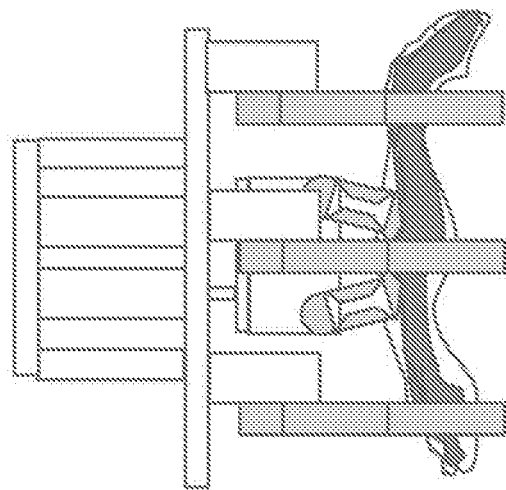
FIGS. 20A and 20B show alternate schematic side views of a second exemplary multiform gripper in an actuate perimeter fingers step of a picking process, in which all of the perimeter finger pairs are actuated (e.g., step S20 of FIGS. 4A-5B).
Figure 20A:
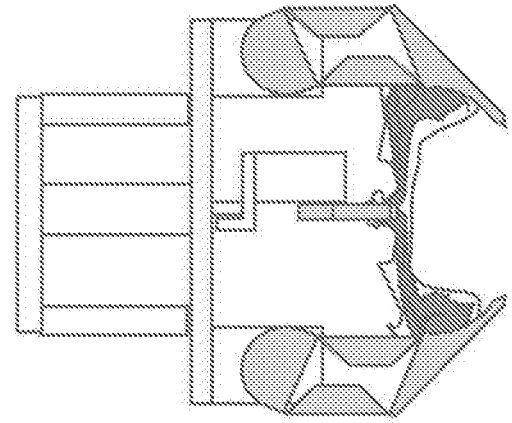

Step S20 is schematically shown in a front view with soft robotic fingers 130, 132 in FIG. 11A and with compliant fingers 130a, 132a in FIG. 20A; and are schematically shown in a side view with soft robotic fingers 130, 132 in FIG. 11B and with compliant fingers 130a, 132a in FIG. 20B.

Figure 11D:
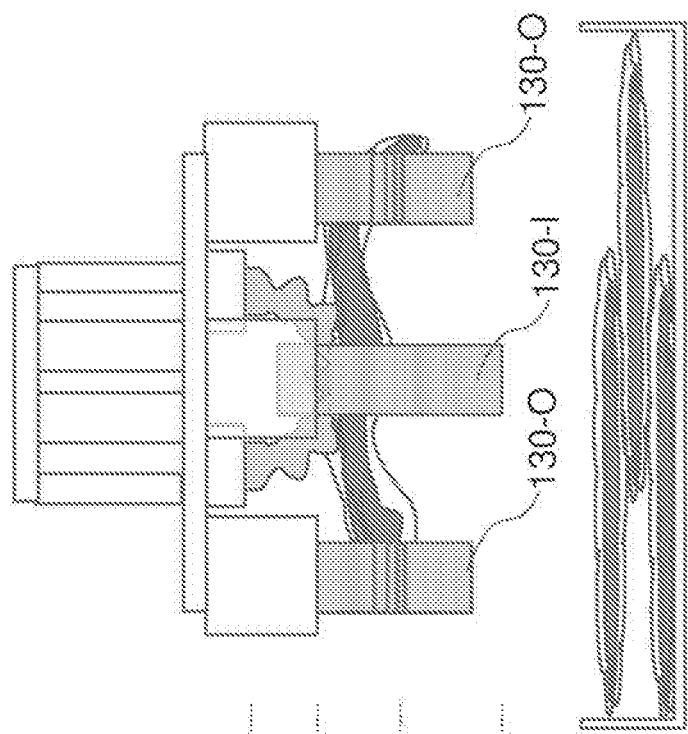
FIGS. 11C and 11D show alternate schematic side views of an exemplary multiform gripper in an alternative actuate perimeter fingers step of a picking process, in which some, or fewer than all, or the middle pair, of the finger pairs are actuated (e.g., step S20 of FIGS. 4A-5B).
Figure 11C:
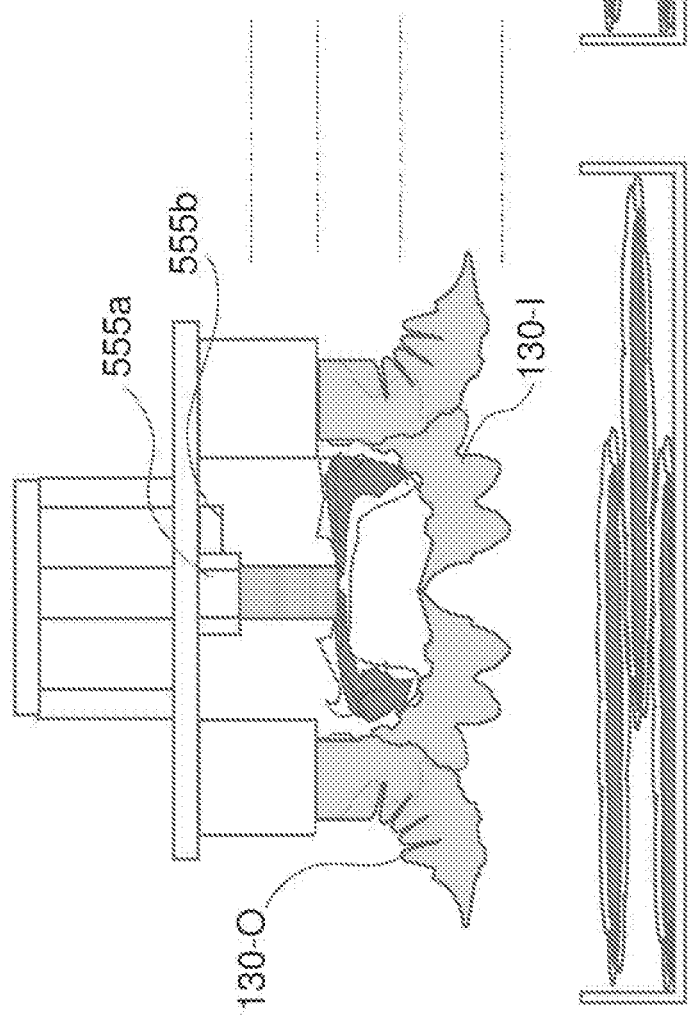

An alternate Step S20 is schematically shown in a front view with soft robotic fingers 130, 132 in FIG. 11C, 11D, and would be analogous carried out with compliant fingers. In the alternate Step S20, on a first time through the process of FIG. 4A, as shown in FIGS. 11C and 11D, only the inboard pair of fingers 132-i is closed to cup, cradle, or crumple the lifted article 444. The primary advantage of this is speed—if the controller 120 uses a substantially fixed or limited type fluid supply 126, e.g., fixed or limited in volume, pressure, or the like, then closing only the two fingers 132-I may be faster than closing all six fingers 132-I and 132-O because the internal volume of the two fingers is substantially only ⅓ of that of all six fingers. Subsequently, if a presence detector for the captured article 444 (e.g., a weight sensor, or an occupancy sensor) detects that the two-finger grasp dropped the article 444, the next time through the process of FIG. 4A, all six fingers (as in FIGS. 11A, 11B) may be closed.

In step S22, the controller 120, via the robot arm 206, lifts the entire assembly with captured article by a sufficient amount to clear any container 5002 (e.g., tote), and the article 444 is ready to be swung or articulated for further processing in step S24, e.g., subsequently is swung or articulated to place or locate the captured article 444, and/or releasing or dropping the captured article 444.

In a second polybagged article routine (e.g., for a larger polybagged clothing article), the polybag 444a is relatively tight, and the enclosed article 444b relatively thick (e.g., less than 10 thicknesses of folded fleece fabric and rebounding or elastic when bent). The inner tool 402 and outer tool 404 may push together into the assembly 444 as a whole, with passive, reflexive, or driven retraction of the inner tool 402. The inner tool 402 may close, and the entire tool 1000 may be retracted a small amount (1-10 mm), both of these steps being optional. The outer tool 404 closes, and crumples both the outer polybag 444*a* and the enclosed article 444*b*, while pinching, grasping, grabbing, capturing, enclosing or enveloping the crumpled portion. That is, the closing of the outer tool 130 tends to secure purchase on upon the combination of outer polybag 444*a* and enclosed article 444*b*; or mostly on the enclosed article. Elements of this pick include measuring an amount of bending (back) with passive, reflexive, or driven retraction of the inner tool 402, resiliently bending back the outer tool 404 in a retracted, open position by pushing the outer tool 404 by a predetermined bending amount into the assembly 444 to be picked, and clenching the assembly 444 starting from the bent-back position.

Figure 4B:
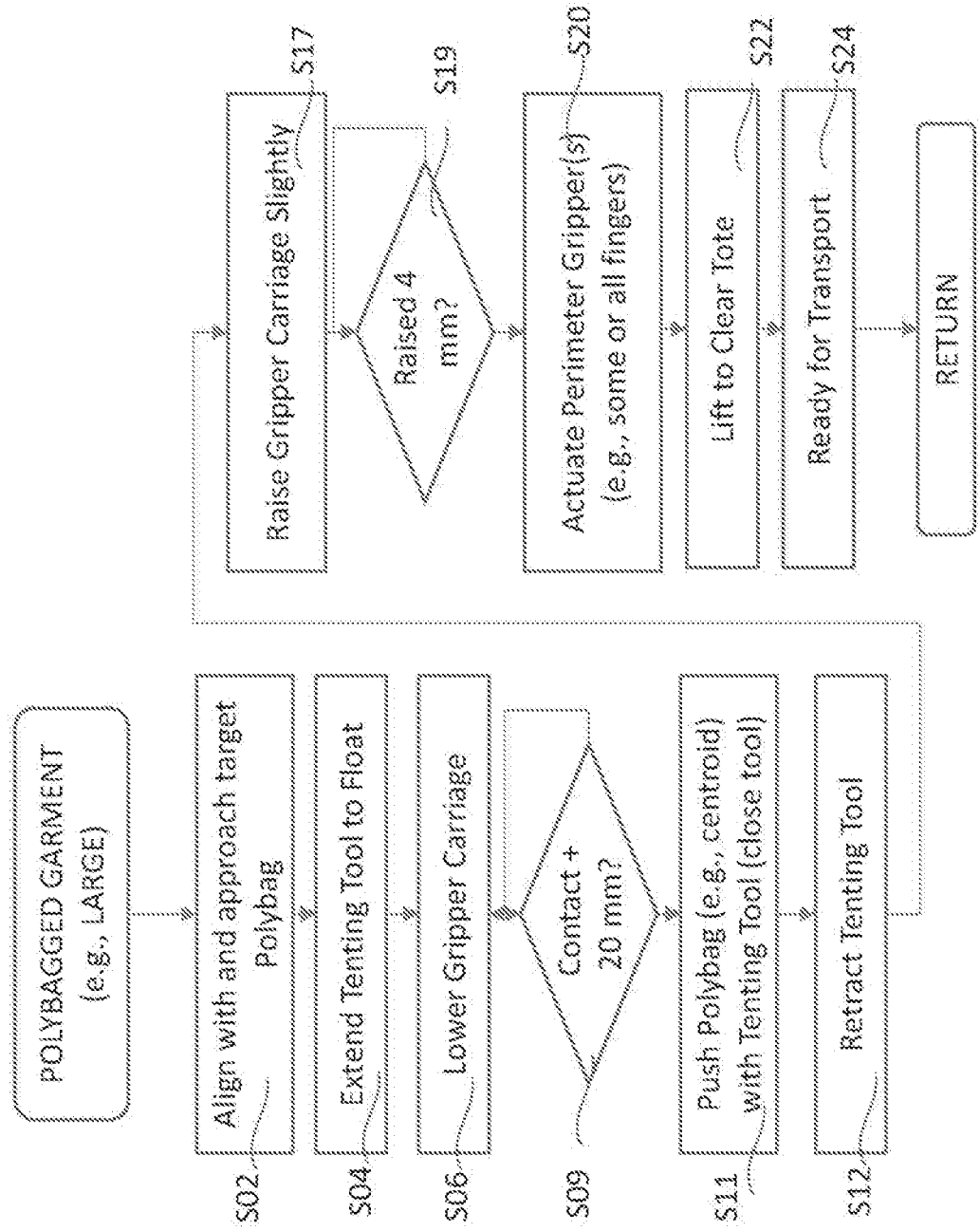
FIG. 4B is a flow chart showing steps and/or acts in a second exemplary process of picking a bagged article or polybagged garment using a system such as that in FIG. 2E or 3A.

FIG. 4B shows one example of this second routine. Similar steps to the routine of FIG. 4A are similarly numbered.

In contrast to FIG. 4A, in step S09 of FIG. 4B, the gripper carriage 400 is lowered by an amount more than light contact or touching, but to press into the polybagged article 444 (e.g., upon a stack of such articles and/or alone in a tote). Optionally, the floating tenting tool 402 retracts against bias provided by the actuator or cylinder 222, along the extension arm 134, 134*a*, providing some pressing force. If the amount that the tenting tool 402 is pressed into the polybagged article 444 (e.g., here 20 mm) causes the tenting tool 402 to retract by an amount that leaves the perimeter gripper 404 and its fingers 130, 130*a* the most extended portion of the tool 1000/1001, the perimeter gripper 404 fingers 130, 130*a* will also press into the polybagged article 444 (this is an optional step). Optionally, the tenting tool 402 is closed to attempt to pinch the article 444. However, this is optional and in some cases the tenting tool 402 may be left open. It may nonetheless remain a tenting tool 402 in latent function, as it may be used to tent the next target in any multi-mode operation servicing a variety of incoming target articles 444.

Figure 26A:
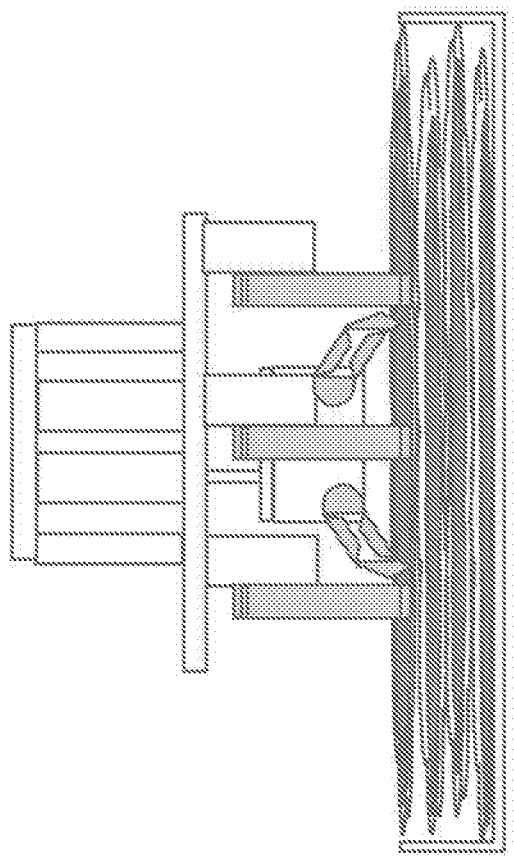
FIGS. 26A and 26B show alternate schematic side views of the second exemplary multiform gripper in a initial compress bagged article step of a picking process in which the inner tool and outer tool are kept open while the inner and outer tools tool may press on the stack and the inner tool is passively retracted against a pressure (spring or pneumatic) bias (e.g., step S09 of FIGS. 4B-5B).
Figure 26B:
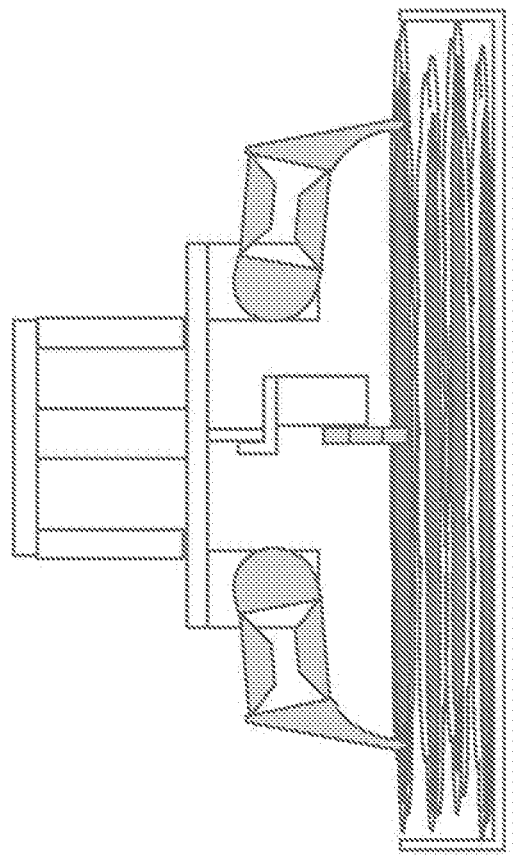

Step S09 is schematically shown in a front view with soft robotic fingers 130, 132 in FIG. 21A and with compliant fingers 130*a*, 132*a* in FIG. 26A; and are schematically shown in a side view with soft robotic fingers 130, 132 in FIG. 21B and with compliant fingers 130*a*, 132*a* in FIG. 26B.

In contrast to FIG. 4A, in step S11 of FIG. 4B, if the tenting tool 402 fingers 132, 132*a* are closed, pinching will tend to pinch a larger amount of the article 444*b* within the polybag 444*a*, and less often just the polybag 444*a*.

Figure 22B:
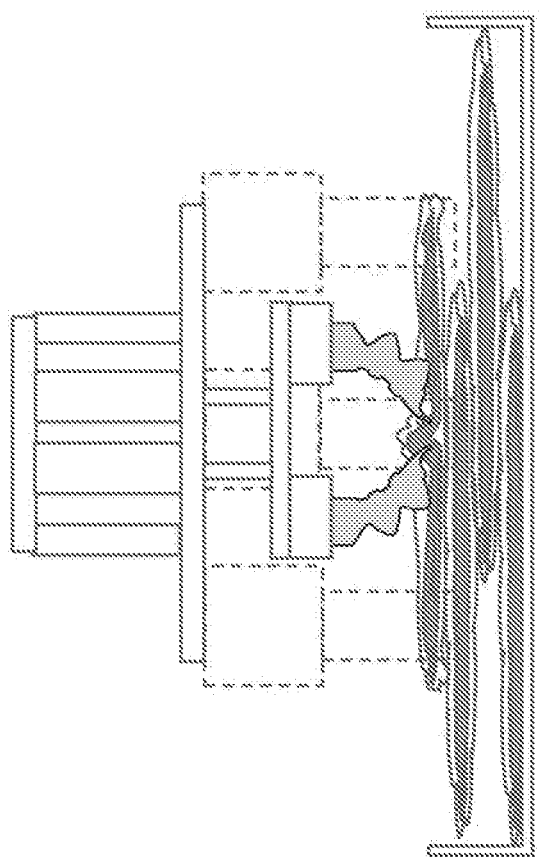
FIGS. 22A and 22B show alternate schematic side views of the first exemplary multiform gripper in a pinch compressed bagged article step of a picking process (e.g., step S11 of FIGS. 4B-5B).
Figure 22A:
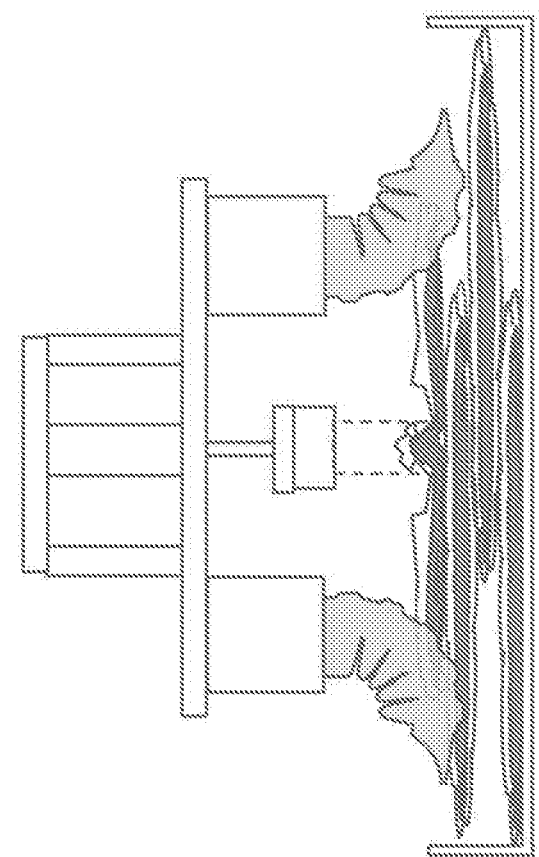
Figure 27B:
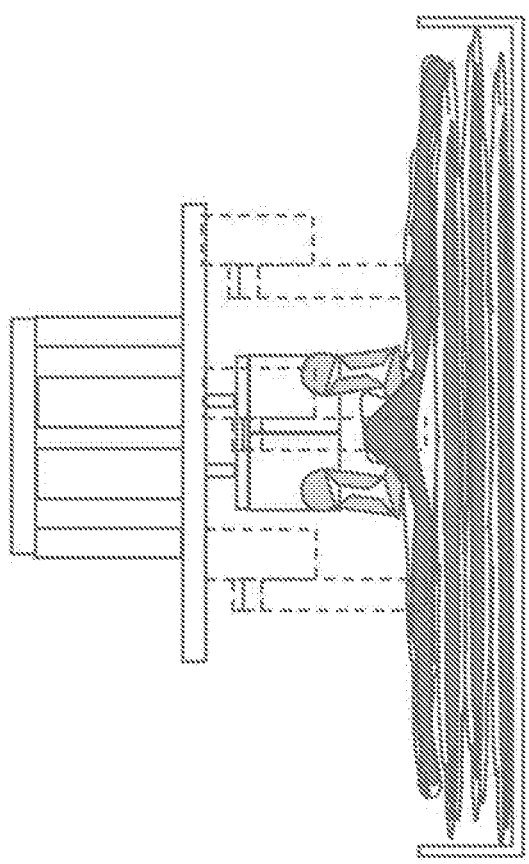
FIGS. 27A and 27B show alternate schematic side views of the second exemplary multiform gripper in a pinch compressed bagged article step of a picking process (e.g., step S11 of FIGS. 4B-5B).
Figure 27A:
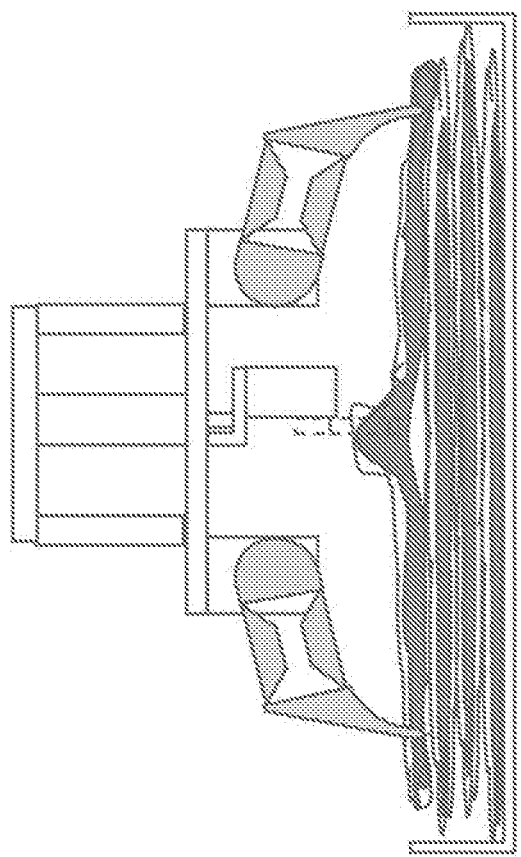

Step S11, with the optional closing of fingers 132, 132*a*, is schematically shown in a front view with soft robotic fingers 130, 132 in FIG. 22A and with compliant fingers 130*a*, 132*a* in FIG. 27A; and are schematically shown in a side view with soft robotic fingers 130, 132 in FIG. 22B and with compliant fingers 130*a*, 132*a* in FIG. 27B.

In contrast to FIG. 4A, in step S12 of FIG. 4B, the retraction of the tenting tool 402 will tend to be by a lesser amount (e.g., less than half of the stroke of the extension arm 134, 134*a*), as the tenting tool 402 will tend to have been passively retracted under the pressing of the carriage 400 into the article by the robot arm 206.

Figure 28B:
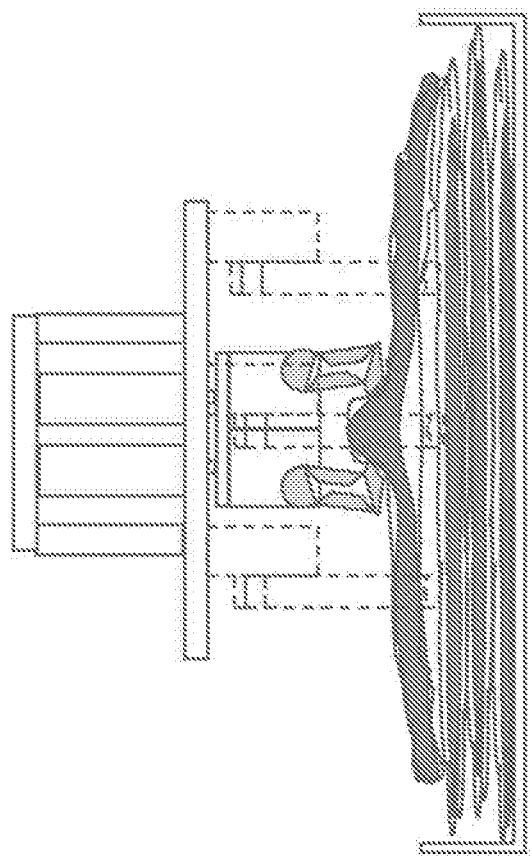
FIGS. 28A and 28B show alternate schematic side views of the second exemplary multiform gripper in a retract inner tool and fold step of a picking process (e.g., step S12 of FIGS. 4B-5B).
Figure 28A:
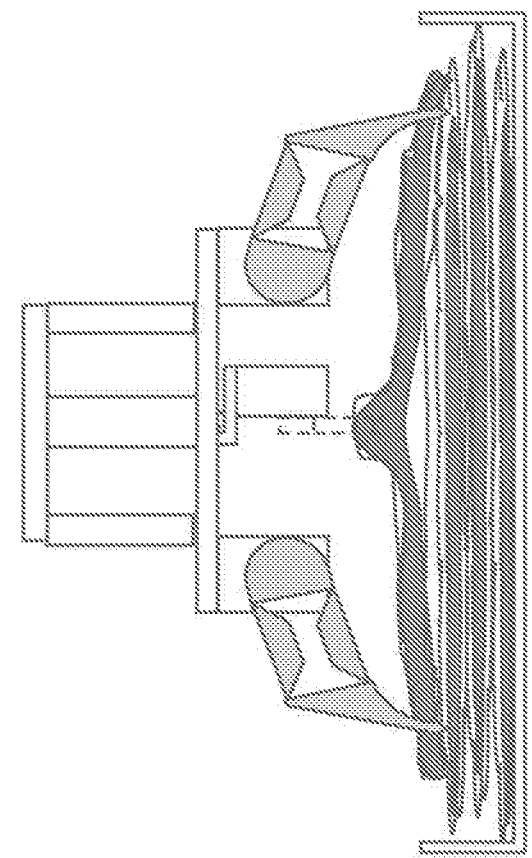

Step S12, with the optional closing of fingers 132, 132*a*, is schematically shown in a front view with soft robotic fingers 130, 132 in FIG. 23A and with compliant fingers 130*a*, 132*a* in FIG. 28A; and are schematically shown in a side view with soft robotic fingers 130, 132 in FIG. 23B and with compliant fingers 130*a*, 132*a* in FIG. 28B. In addition, step S12 is shown with ridged solid elastomer fingers, cable operated, in FIG. 31A in front view and 31B in side view.

In contrast to FIG. 4A, in step S17-S19 of FIG. 4B, the gripper carriage is only lifted by a slight amount e.g., in this case, 0-15 mm (preferably 4 mm). Clearance for the fingers 130 underneath the barely or lightly suspended article 444 is not created, or created to a lesser degree than in steps S16-S19 of FIG. 3.

Figure 24B:
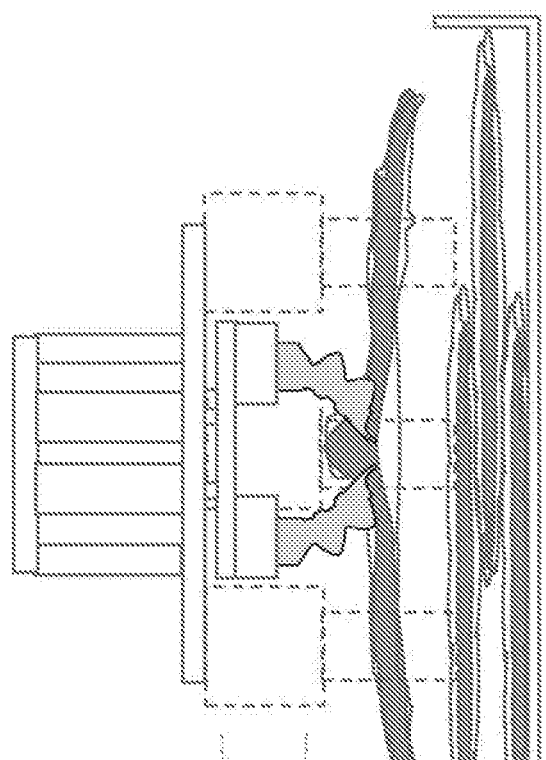
FIGS. 24A and 24B show alternate schematic side views of the first exemplary multiform gripper in a slightly lift gripper carriage step of a picking process (e.g., step S19 of FIGS. 4B-5B).
Figure 24A:
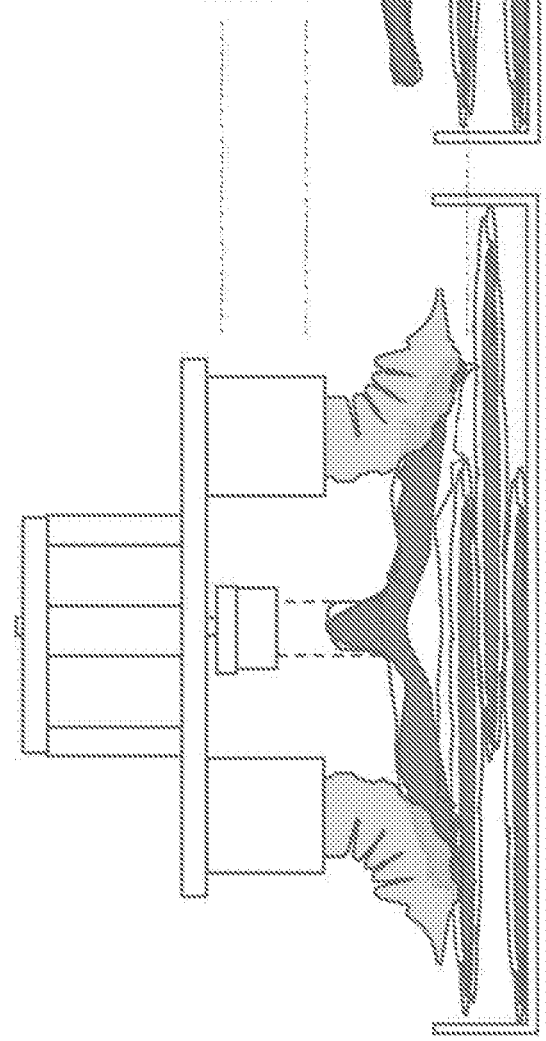
Figure 29B:
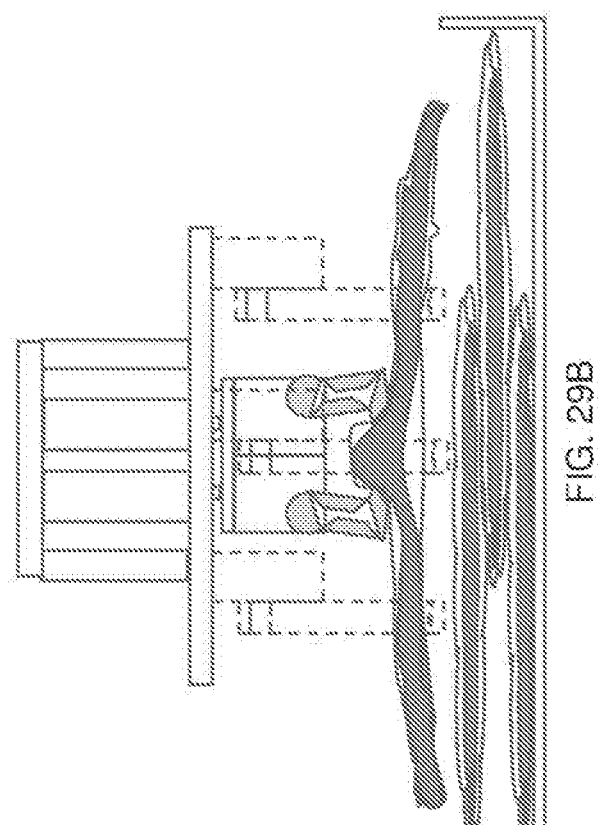
FIGS. 29A and 29B show alternate schematic side views of the second exemplary multiform gripper in a slightly lift gripper carriage step of a picking process (e.g., step S19 of FIGS. 4B-5B).
Figure 29A:
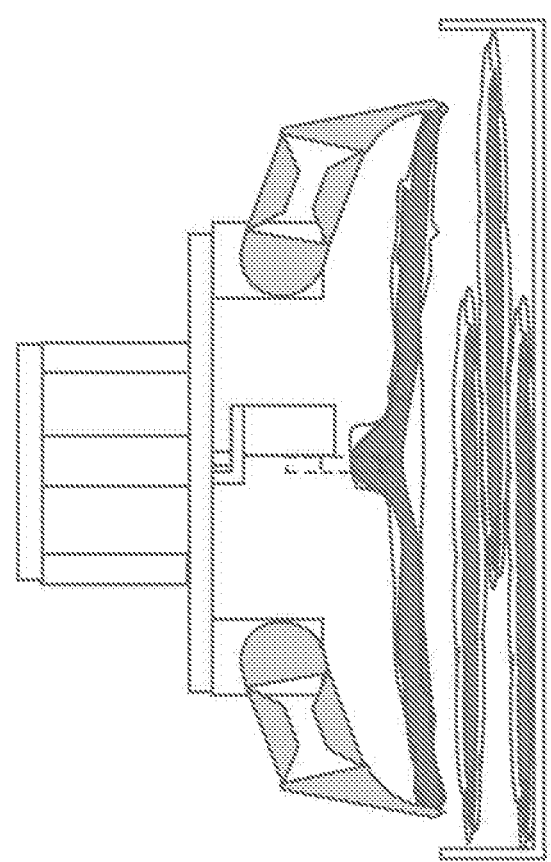

Steps S17-S19 of FIG. 4B are schematically shown in a front view with soft robotic fingers 130, 132 in FIG. 24A and with compliant fingers 130*a*, 132*a* in FIG. 29A; and are schematically shown in a side view with soft robotic fingers 130, 132 in FIG. 24B and with compliant fingers 130*a*, 132*a* in FIG. 29B.

In contrast to FIG. 4A, in step S20 of FIG. 4B, the continued lower position and lesser clearance of the gripper carriage 400 will tend to have the fingers 130, 130*a* of the perimeter gripper 404 crumple both the outer polybag 444*a* and the enclosed article 444*b*, while grasping, grabbing, capturing, enclosing or enveloping the crumpled portion. For example, the action of the perimeter fingers 130, 130*a* may be to crunch the polybagged article 444 side-to-side, in an alternative to or in addition to cradling the article 444 from underneath (i.e., cradling may still take place).

Figure 25B:
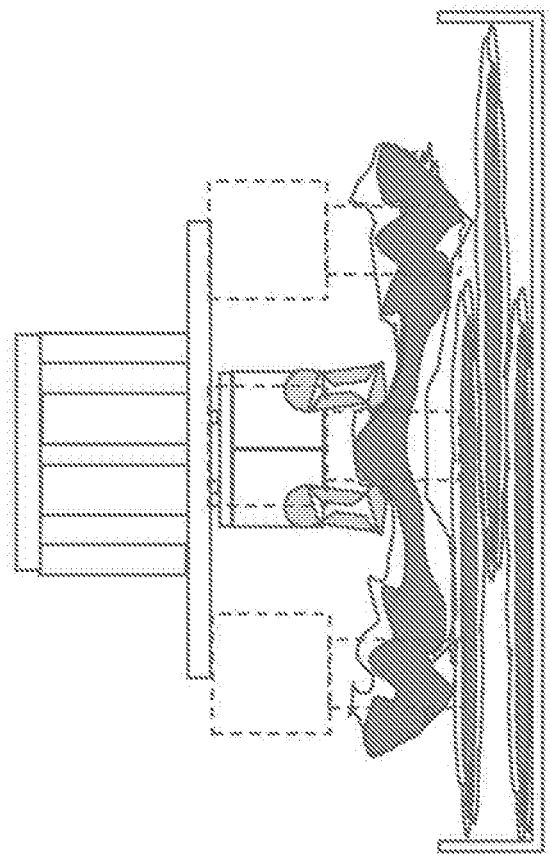
FIGS. 25A and 25B show alternate schematic side views of the first exemplary multiform gripper in an actuate perimeter gripper and/or crumple bagged assembly and/or cradle bagged assembly step of a picking process (e.g., step S20 of FIGS. 4B-5B).
Figure 25A:
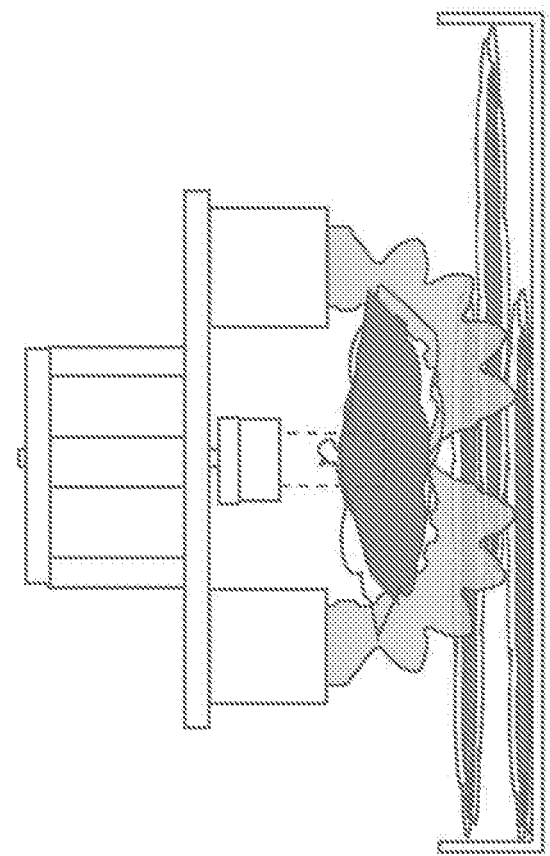
Figure 30B:
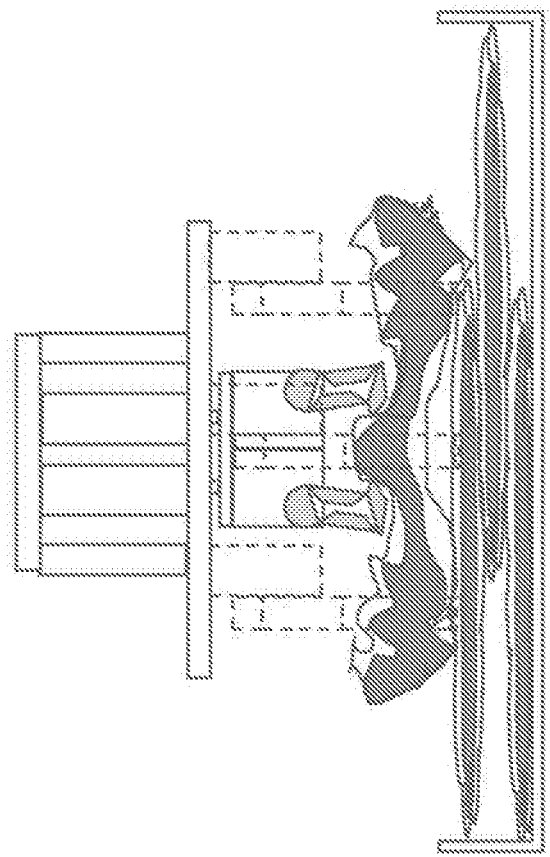
FIGS. 30A and 30B show alternate schematic side views of the second exemplary multiform gripper in an actuate perimeter gripper and/or crumple bagged assembly and/or cradle bagged assembly step of a picking process (e.g., step S20 of FIGS. 4B-5B).
Figure 30A:
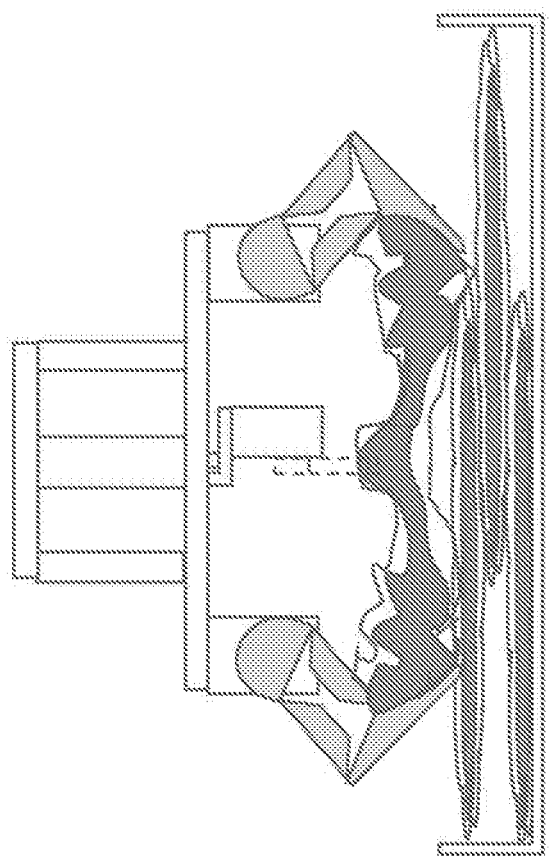

Steps S20 of FIG. 4B is schematically shown in a front view with soft robotic fingers 130, 132 in FIG. 25A and with compliant fingers 130*a*, 132*a* in FIG. 30A; and schematically shown in a side view with soft robotic fingers 130, 132 in FIG. 25B and with compliant fingers 130*a*, 132*a* in FIG. 30B. In operation, the soft robotic fingers 130, 132 may take on a far more deformed and compliant shape than is shown, as they are inflated and adapting with compressible air, fitting between the article 444 and the environment to clench the article 444. It should also be noted that the fingers 130 (e.g., six different fingers) will tend to deform individually differently depending on the portion, shape, local resistance of the article 444 they are handling, but overall forces will be equalized by a common air reservoir. Soft robotic grippers operated by compressed fluid (e.g., air and/or vacuum) are compliant and elastomeric, but the 4-bar compliant gripper discussed herein does not have many of the structural or functional attributes of soft robotic grippers. "Compliant" as used herein may apply to both compliant and soft robotic fingers or grippers, while "soft robotic" will tend to apply only soft robotic fingers or grippers (unless otherwise apparent by context).

In a third polybagged article routine (e.g., in an alternative mode for smaller polybagged clothing articles 444), the polybag 444*a* is again relatively loose, and the enclosed article 444*b* relatively thin and particularly light. The inner tool 402 first pinches the outer polybag 444*a*, and the pinched bag assembly 444 is lifted as a whole, with the polybag 444*a* tenting over the inner article 444*b*. The outer tool 404 is kept open. That is, the pinching of the inner tool 402 secures purchase on mostly, or usually, the outer polybag 444*a*. Elements of this pick include pinching the outer polybag 444*a* with the inner tool 402, lifting the assembly 444 to be picked, evaluating the weight of the pick, and holding the outer tool 404 in a retracted, open position.

Figure 5A:
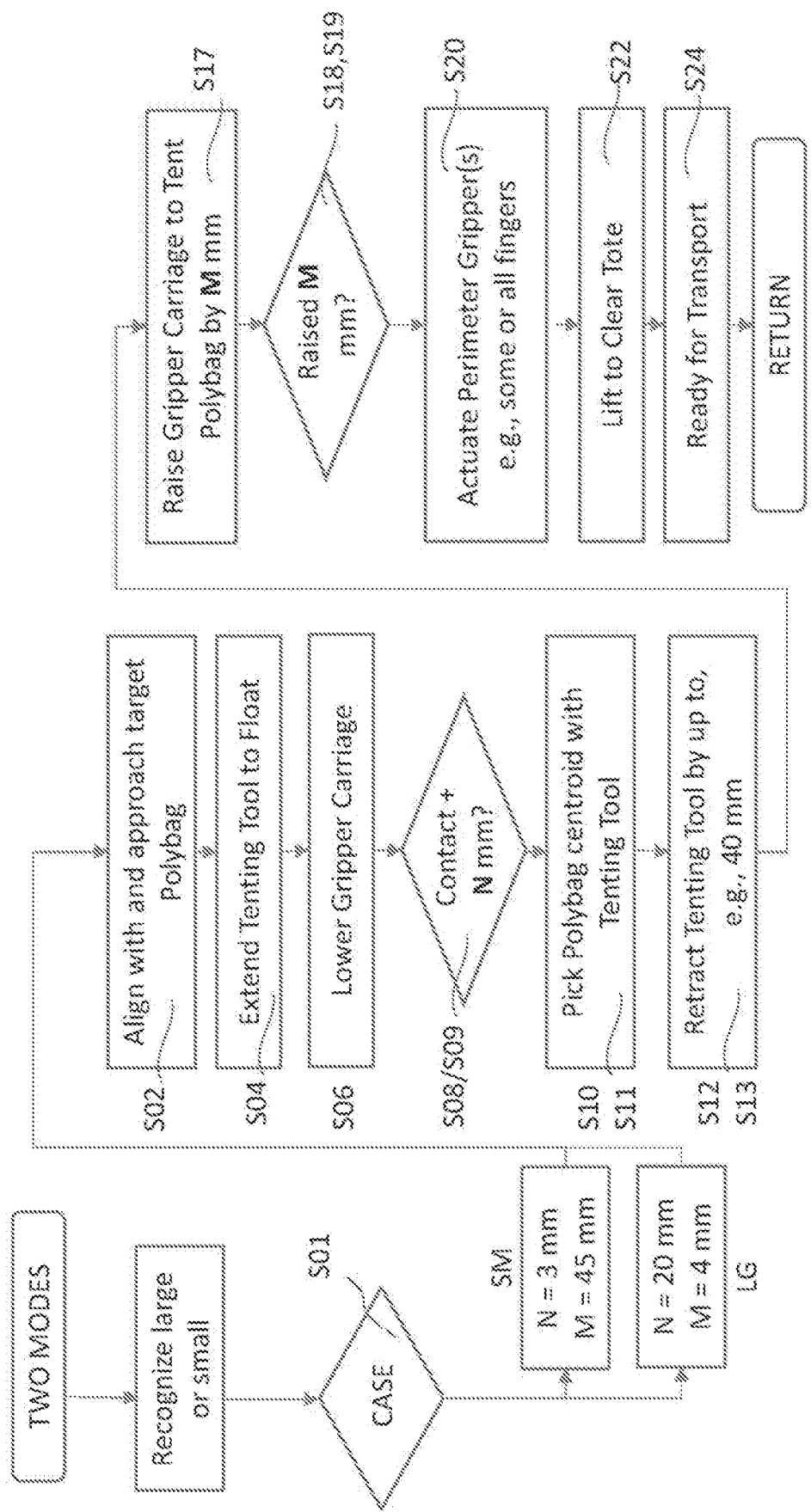
FIG. 5A is a flow chart showing steps and/or acts in a first exemplary process of multimode picking of a bagged article or polybagged garment using a multiform gripper system such as that in FIG. 2E or 3A.
Figure 5B:
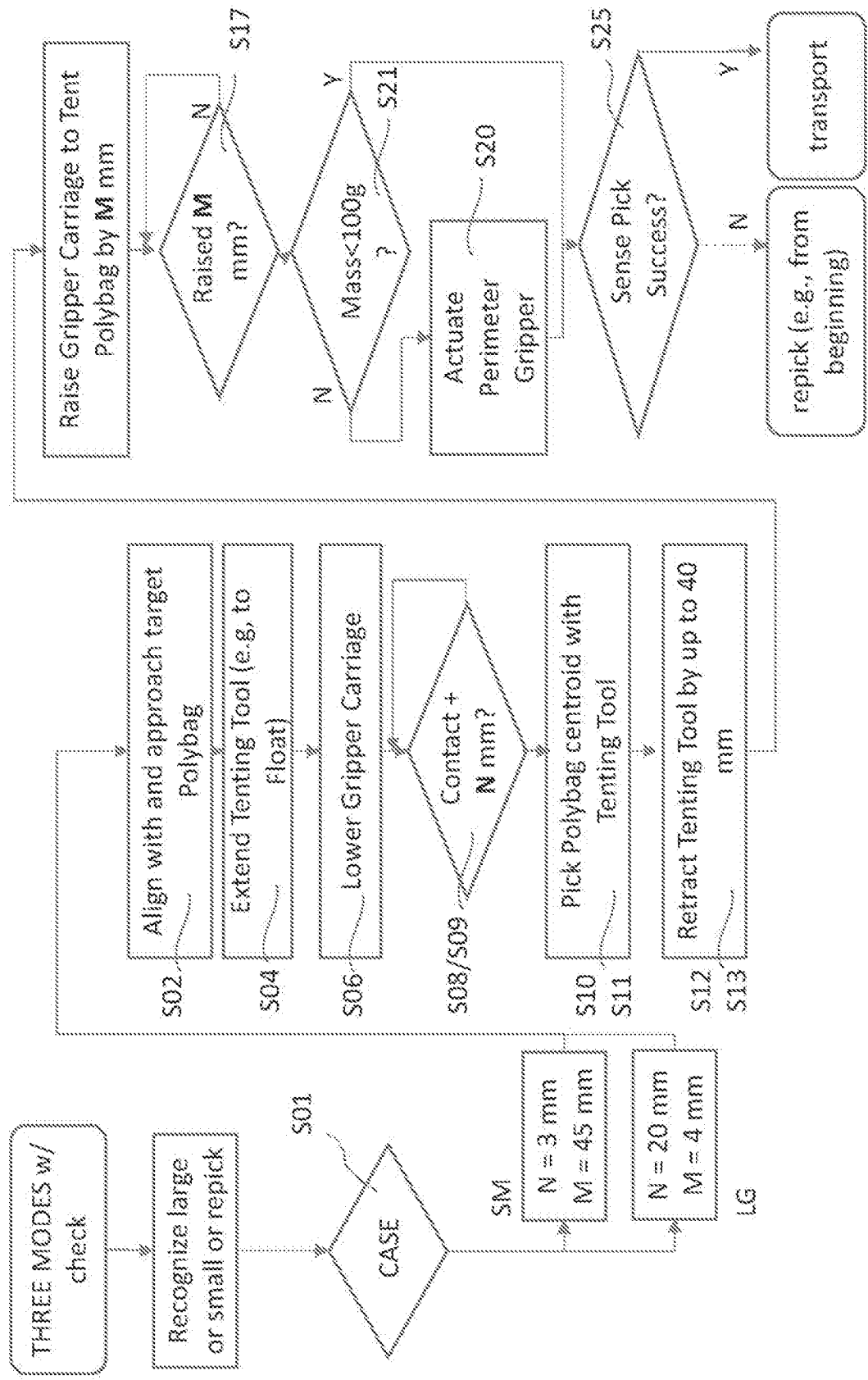
FIG. 5B is a flow chart showing steps and/or acts in a second exemplary process of multimode picking of a bagged article or polybagged garment using a multiform gripper system such as that in FIG. 2E or 3A.

In a multi-modal approach, as shown in FIGS. 5A and 5B, the first and second routines may be combined as modes.

In the multi-modal approaches, as shown in FIGS. 5A and 5B, the first, second and third routines may be combined as modes. As noted, despite some control operations being determined by actuation values along a continuum, the behavior of the inflatable or compliant gripper 402, 404 itself unexpectedly depends on not just the actuation values, but also the article 444 itself and the environment. The soft fingers provide synergy across many different pickable article 444 configurations. In the first mode, drawn out or lower values of actuation may tend to lead to a pinch and capture operation of the soft fingers, while compressed or higher values of actuation may tend to lead to a press and crumple operation of the soft fingers. In the third mode, gravity and/or the inherent drape of the lower weight articles may tend to lead to a pinch and drop operation of the soft fingers being a better option than the pinch and capture operation.

Concentric Finger Grippers, e.g., of Different Sizes

FIGS. 12A-12D are perspective views illustrating a grasper using a hub assembly and soft actuators 30-N of different lengths configured to substantially enclose an object 1301.

Figure 12A:
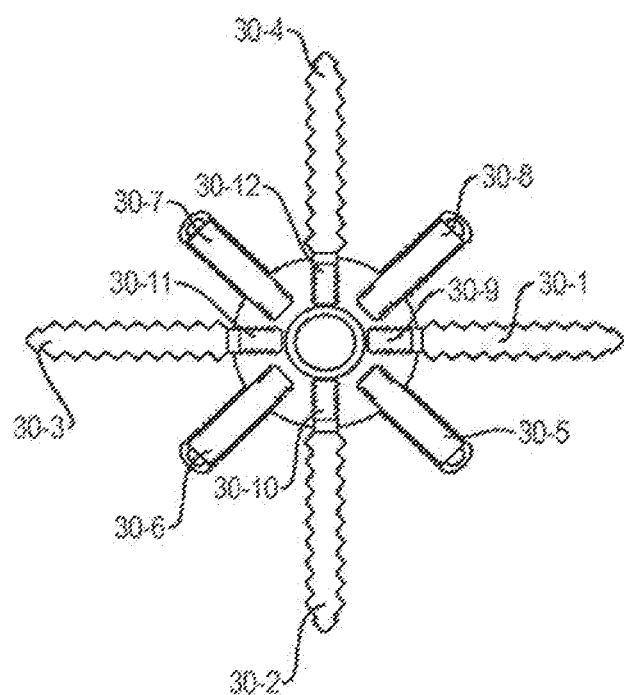
FIGS. 12A-12D are perspective views illustrating a grasper using the hub assembly of FIG. 1 and soft actuators of different lengths configured to substantially enclose an object (in FIGS. 14A-14D, a coffee cup.
Figure 12B:
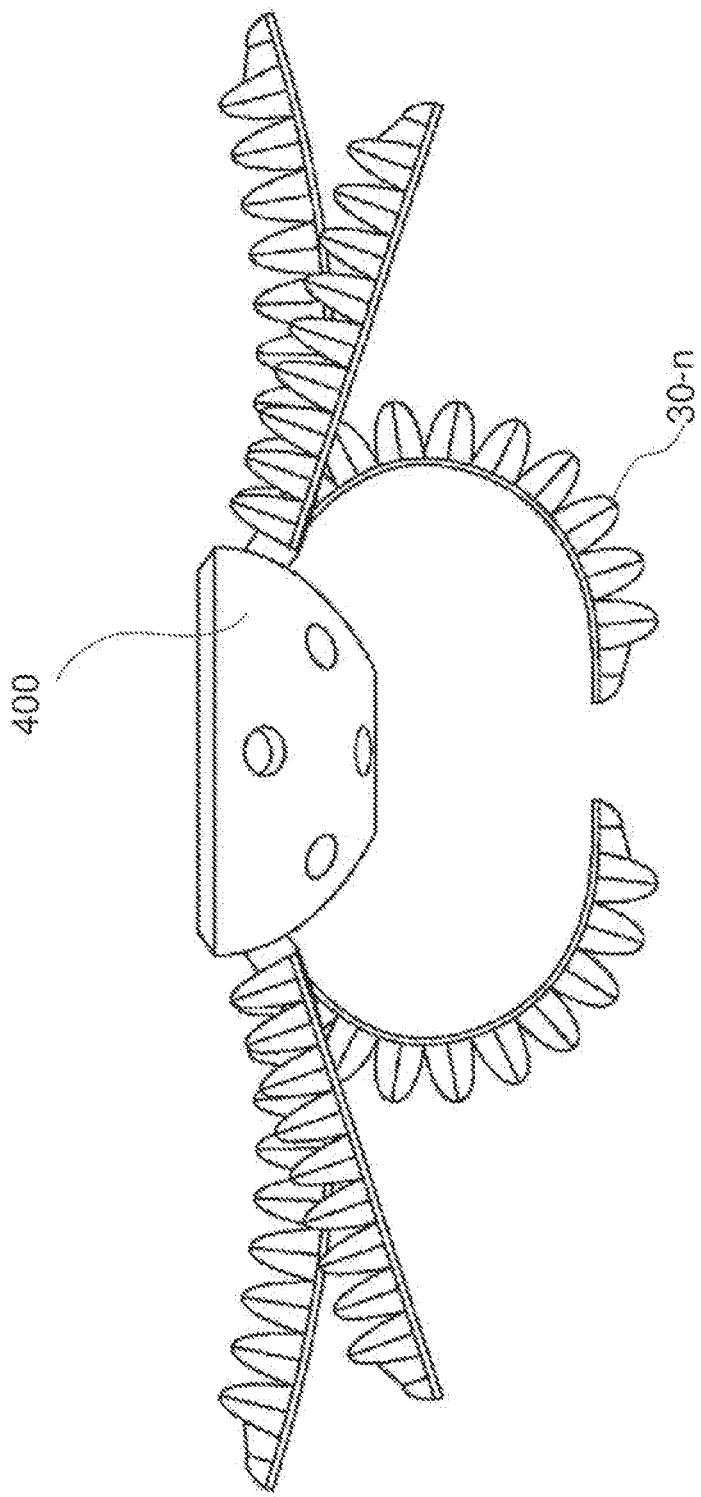
Figure 12C:
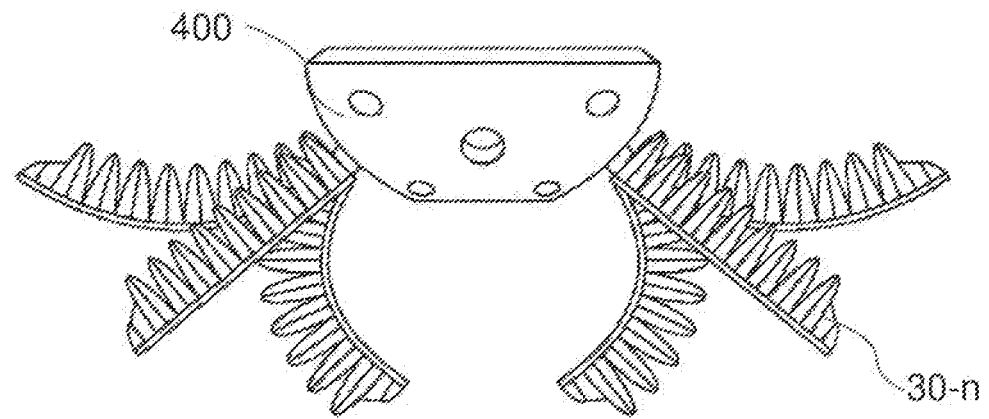
Figure 12D:
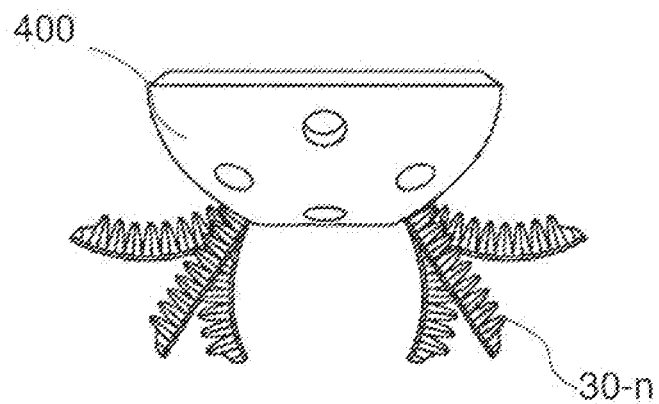

FIGS. 12A-12D depicts an example of a tool side assembly 20 and attached soft actuators 30. In some examples, a tool side assembly 20 may be provided with the soft actuators depicted in this example (e.g., soft actuators of varying sizes) to enable the soft actuators to fully encapsulate and object. For example, FIG. 12A illustrates the tool side assembly 20 and the soft actuators 30 from various angles and perspectives. As depicted, there are a variety of different sized soft actuators 30. In particular, the soft actuators 30 depicted have various lengths. FIGS. 12B-12D illustrate the tool side assembly 20 and each of the different sized the soft actuator 30 and their corresponding range of motion. In particular, FIG. 12B illustrates the longest of the soft actuators 30 and their corresponding range of motion (e.g., deflated to fully inflated). FIG. 12C illustrates the middle length soft actuators 30 and their corresponding range of motion (e.g., deflated to fully inflated). FIG. 12D illustrates the shortest of the soft actuators 30 and their corresponding range of motion (e.g., deflated to fully inflated).

Figure 13:
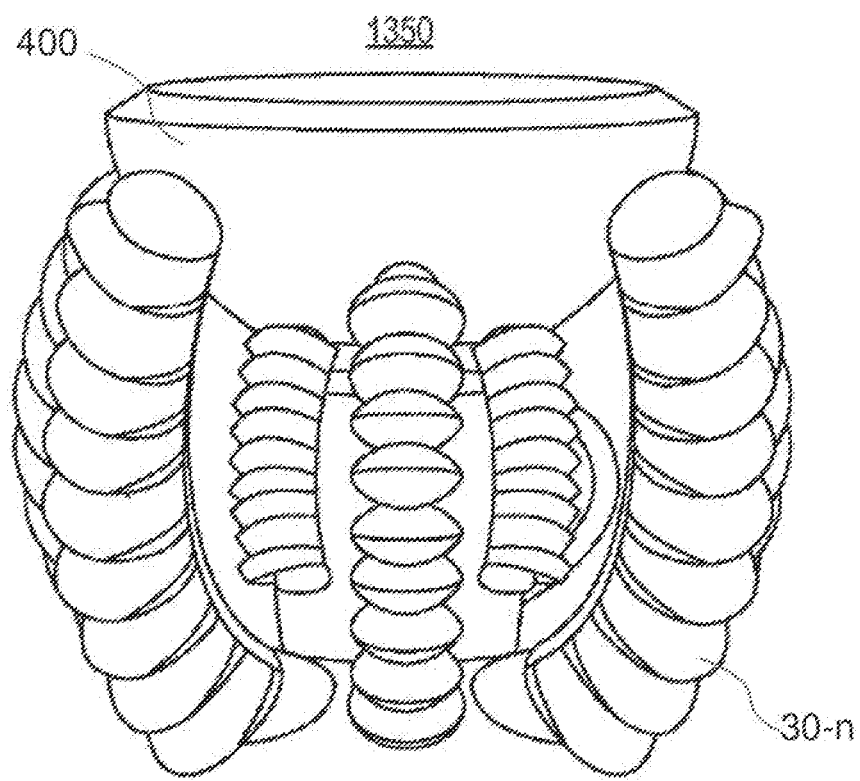
FIG. 13 is a schematic views of a final step in a method of using the grasper of FIGS. 12A-12D.
Figure 14A:
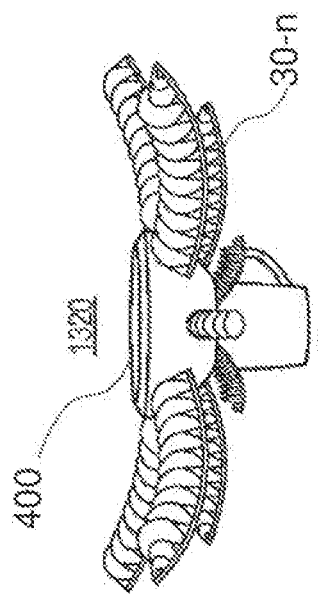
FIGS. 14A-14D are schematic views of steps preceding FIG. 13 in a method of using the grasper of FIGS. 12A-12D.
Figure 14B:
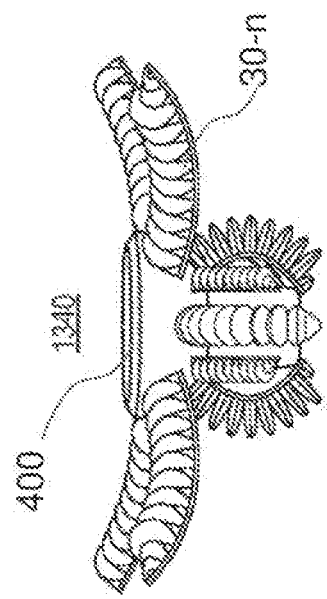
Figure 14C:
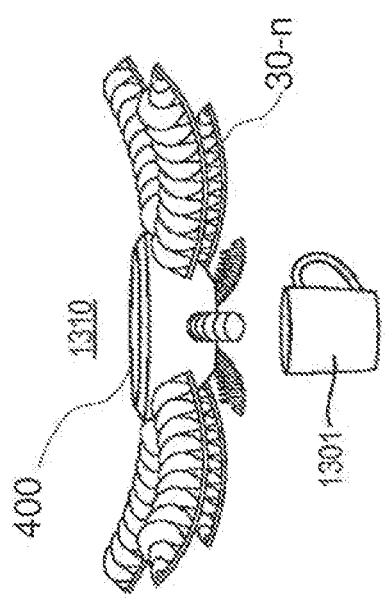
Figure 14D:
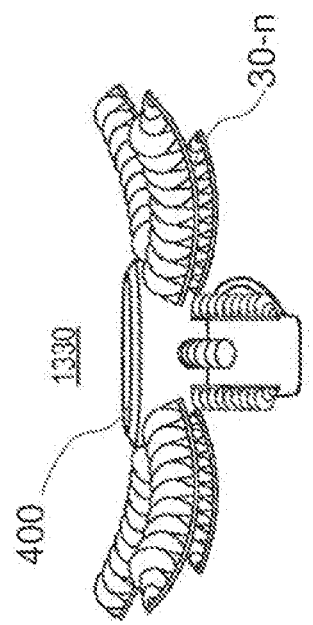

FIG. 13 illustrates a final step in a method of fully encapsulating an object using an example tool side apparatus and soft actuators. In particular, at 1310, the tool side assembly and soft actuators are arranged above an object 1301 to be encapsulated (e.g., a mug, or the like). As 1320, the tool side assembly and the soft actuators are lowered or positioned just above the object. At 1330, the shortest soft actuators 30 are inflated to hold the object in place. At 1340, the middle length soft actuators are inflated to more fully surround the object 1301. As 1350, the longest soft actuators are inflated to substantially encapsulate the object 1301.

It should be noted that alternative expressions of the embodiments and alternative enabling structures and process steps are disclosed in FIGS. 32-35. As with the remaining expressions in this disclosure, none of these expressions are required, each is optional. For example, FIGS. 32-35 disclose an alternative process in which the tenting tool is not independently moved, but tenting is generally achieved by raising the entire gripper carriage 400.

FIGS. 32-35 are each side schematic views. FIGS. 32A-32H depict states of the process of FIGS. 4A-5B. FIG. 32A depicts a garment within a polybag (e.g., a polybag-garment) before a picking operation. FIG. 32B depicts the lowering and approach of the EOAT (multiform gripper) corresponding to step S02. The multiform gripper approaches the polybag-garment with all fingers peeled back, at full open. FIG. 32C depicts the pinching of the polybag, generally corresponding to parts of steps S08 and/or S09. The multiform gripper stops with contact of the inner fingers on the polybag, and then just the inner fingers are closed. FIG. 32D depicts the tenting of the polybag garment by lifting the carriage (in this example), generally corresponding to parts of steps S12 through S19. In this example, the carriage moves by substantially 1-2 inches of upward travel, the multiform gripper being moved upward from the polybag-garment by substantially 1-2" (25 mm-50 mm) to stretch or form a tent in the polybag up from the resting position.

Figure 32A:
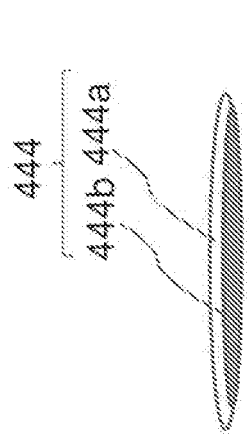
Figure 32B:
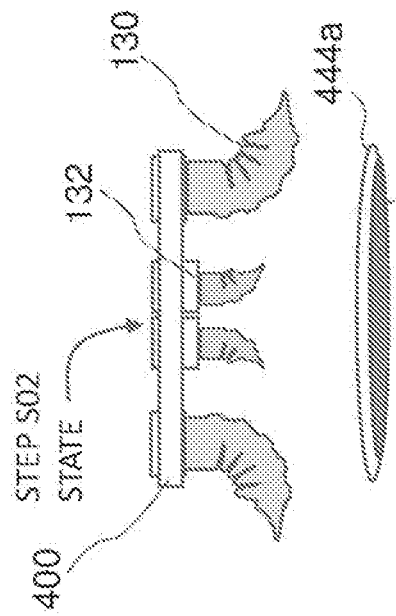
Figure 32C:
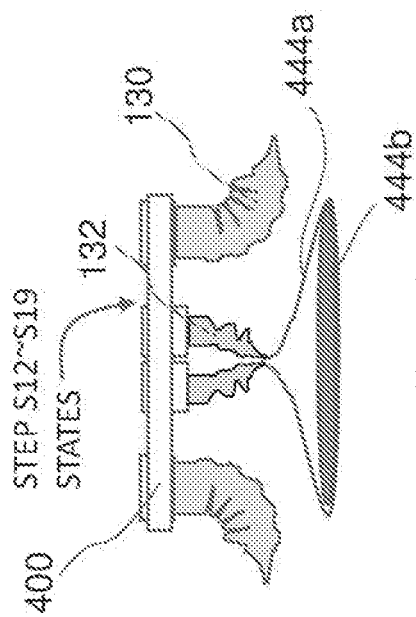
Figure 32D:
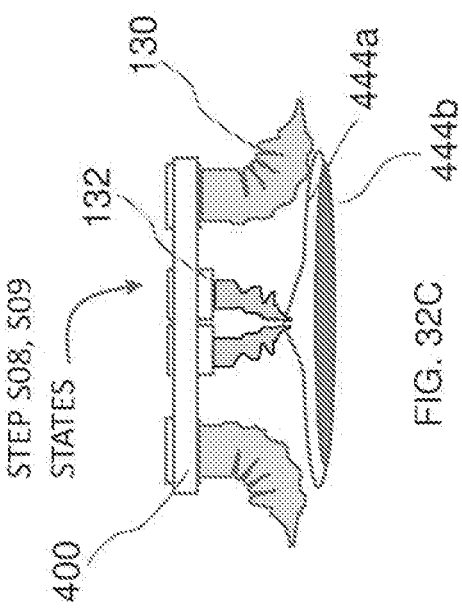
Figure 32F:
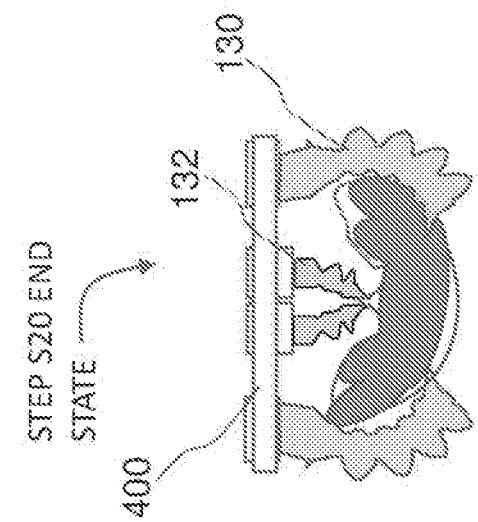
Figure 32E:
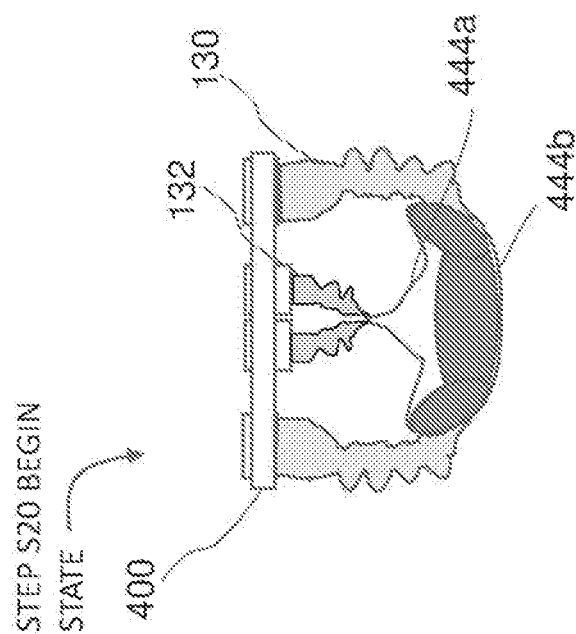

FIG. 32E and FIG. 32F depict one possible next set of states under the process, and FIG. 32G and FIG. 32H depict an alternative possible next set of states under the process. Additionally, these steps of the process may result in a combination of these states. An advantage of the resilient multiform grippers disclosed herein is that the gripper does not have to form a certain configuration in order to successfully pick a soft item—a variety of forms are possible, and the grippers compensate for any positional or pose uncertainty by the combination of adaptive (shape changing) and conformal (shape following) gripping that is characteristic of soft robotic and resilient grippers.

In FIGS. 32E and 32F, the states depicted generally correspond to a securing operation with a larger or heavier garment (although these states may occur with any size or weight garment), the mechanism of securing is bunching or crumpling the garment within the polybag or forming a grippable ball. FIG. 32E substantially corresponds to a beginning portion of step S20, and FIG. 32F substantially corresponds to an ending portion of step S20. In FIG. 32E, the outer fingers of the multiform gripper are closed (the carriage height and gripper height being stationary) while still holding the inner fingers closed on the polybag. In FIG. 32F, as the outer fingers continue to close, the polybag-garment bunches up into a grippable ball.

In FIGS. 32G and 32H, the states depicted generally correspond to a securing operation with a smaller or lighter garment (although these states may occur with any size or weight garment), the mechanism of securing is grasping a cone or tent shape of polybag, in some cases stretching the polybag locally. FIG. 32G substantially corresponds to a beginning portion of step S20, and FIG. 32H substantially corresponds to an ending portion of step S20. In FIG. 32G, the outer fingers are closed on the polybag around the small lifted "cone" or tent of polybag material, again still held by the inner finger pair. In FIG. 32F, as the outer fingers continue to close, the polybag-garment is pulled up into a "cone" or tent shape, tensioned by the inner finger pair.

Closing the outer fingers in the "bunching" securing approach of FIG. 32E-32F versus the "tenting" securing approach of FIGS. 32G-32H may use the same actuation force profile (e.g., pneumatic, rotational, or cable tension) and rely upon the adaptive-conforming characteristics of the resilient gripper to complete either securing process (or a combination of them). Alternatively, each may use a different actuation force profile optimized for, or responsive to, the type of securing approach. Sensors such as force sensors and vision sensors may be used to detect which securing approach is occurring or likely to occur. Following either securing approach, substantially corresponding to step S22, the multiform gripper (EOAT) may be lifted, moving the polybag-garment with all fingers closed upon it (or, even if not all, a combination of inner and outer fingers). In one alternative grip mode, for example using 6 outer fingers in 3 pairs, only the inner finger pair is used for gripping small objects, and only the outer finger pairs are used for gripping larger objects.

Figure 33A:
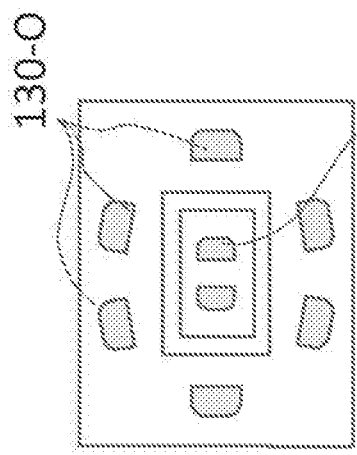
FIGS. 33A-33D show bottom views of alternate configurations for finger arrangements for inner and outer fingers/grippers.

FIGS. 33A-33D show bottom views of alternate configurations for finger arrangements for inner and outer fingers/grippers. In FIG. 33A, 2 inner fingers oppose one another in a pinching configuration and have, e.g., 2 accordion sections that are each expandable (under positive pressure versus ambient) and compressible (under negative pressure versus ambient) each have a fractional width with respect to the larger outer fingers. The outer fingers, having e.g., 5 accordion sections, are arranged in 3 pairs opposing one another, one pair facing one another along a longitudinal direction the same as the inner pair, and two pairs angled with respect to one another and arranged along directions perpendicular to the longitudinal direction.

Figure 33B:
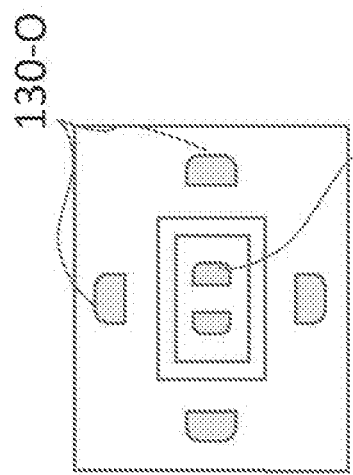
Figure 33C:
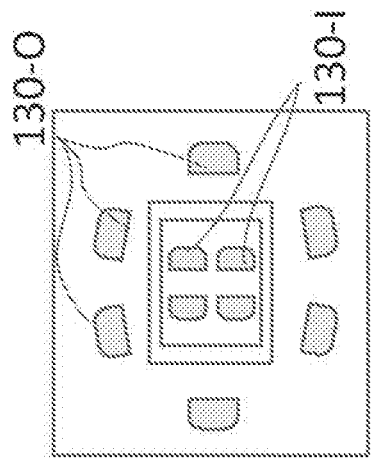
Figure 33D:
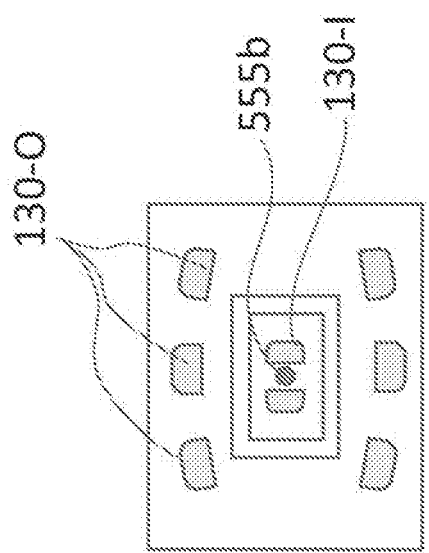

In FIG. 33B, the 2 inner fingers of FIG. 33A remain substantially the same, but the two outer pairs arranged along the non-longitudinal directions are instead replaced with one outer pair. In FIG. 33C, the six outer fingers of FIG. 33A remain substantially the same, but the singer inner pinching pair of fingers is replaced with two pairs. In addition, a camera 555a is arranged in the center of the overall palm to detect presence (e.g., by obscuring the camera 555a). In FIG. 33D, the 2 inner fingers of FIG. 33A remain substantially the same, but the two outer pairs arranged along the non-longitudinal directions are instead replaced with three outer pairs along non-longitudinal directions, and the longitudinal outer pair is removed.

Figure 34B:
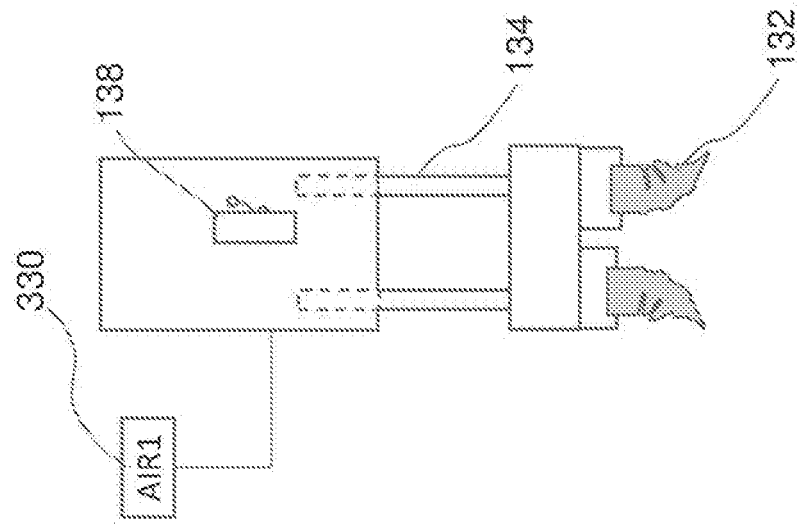
FIGS. 34A and 34B show schematic views of two structures for actuating and detecting the pinching gripper extension, retraction, and bias downward.
Figure 34A:
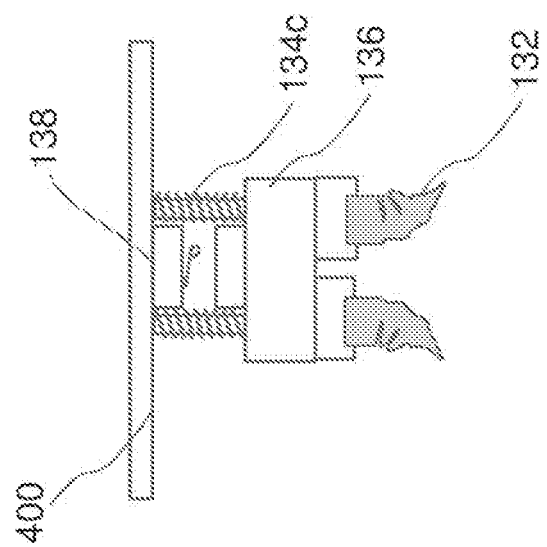
Figure 35:
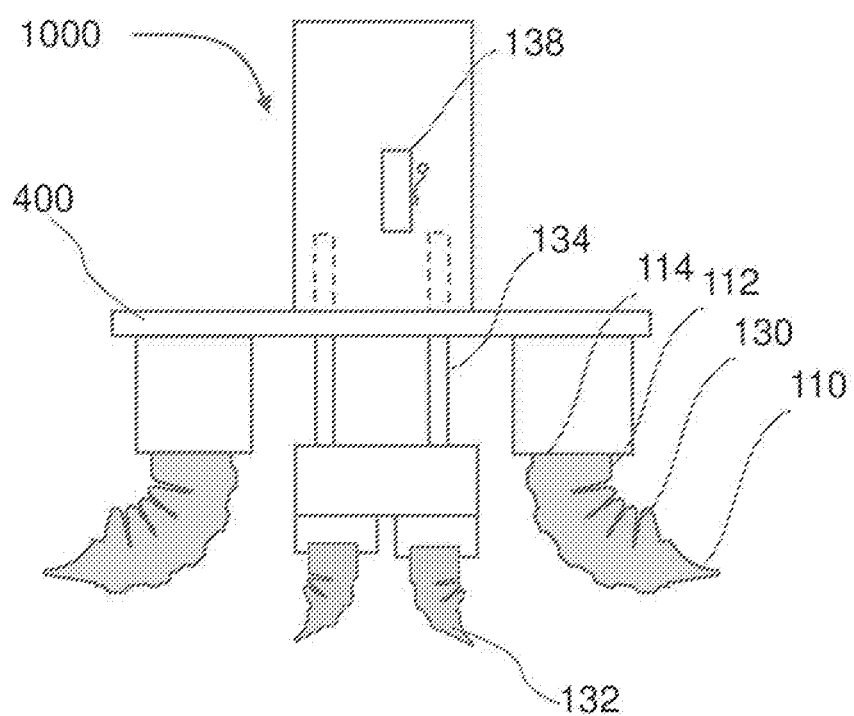
FIG. 35 is a schematic view showing the second structure of FIG. 34B in context, mounted together with the outer fingers.

FIGS. 34A and 34B show schematic views of two alternative or complementary structures for actuating and detecting the pinching gripper extension, retraction, and bias downward. In FIG. 34A, a spring loaded block 342 on guide shafts is used to support the inner fingers. The inner finger pair are mounted on a spring loaded block with a limit switch, microswitch or sensor to detect displacement of the block due to finger contact with the target object (e.g., a target garment-polybag upon a stack of the same). In FIG. 34B, a limit switch, microswitch or sensor is used with a guided air cylinder actuating piston/guide rods for extension of the inner fingers. In this case, alternatively or in addition, an air cylinder could be used to actuate the inner fingers up/down (extend or retract) to put them in an optimized location for object grasping, or tensioning a polybag after pinching or gripping. An electro-pneumatic regulator may be used to dial in the air pressure extending the air cylinder, which allows the effective spring force biasing the inner fingers downward to be adjusted. The air cylinder limit switch may be used to signal and/or trigger finger closure actuation. FIG. 35 shows the second structure in context, mounted together with the outer fingers.

Accordingly, as shown throughout the drawings, e.g., FIGS. 1-35, et seq., a gripper system 1000 for handling a bagged object 444, the bagged object 444 having an article 444b enclosed within a bag 444a, may include a pinching gripper 402. The pinching gripper 402 may be configured to clamp a pinched fold in the bag 444, a linear actuator 222-134 configured to retract the pinching gripper 402 and clamped pinched fold to form a tented bag 444 or 444a above the article 444b; and a resilient or peripheral gripper 404 including a plurality of resilient members 130, 130a, 130b located about the pinching gripper 402, the peripheral or resilient gripper 404 configured to close the resilient members 130, 130a, 130b upon the tented bag 444.

In another example, as shown in FIGS. 1-35, a gripper system 1000 for handling a bagged object 444 may include a grasp-type gripper 404 including a plurality of resilient members 130, 130a, 130b, the resilient members 130a, 130b actuatable by a first actuator 330 to perform a grasping action. The gripper system 1000 may also include a pinching gripper 402 including opposing clamping elements 132, 132a, 132b, the pinching gripper 402 being actuatable by a second actuator 332 to form a tented bag in the bagged object 444 by forming a pinched fold between the clamping elements 132, 132a, 132b, clamping the pinched fold, and lifting the pinching gripper 402. An actuator control system q20 may be operatively connected to the first and second actuators 330, 332, that sequentially commands the second actuator 332 to form the tented bag 444a, 444b, 444 and the first actuator 330 to perform the grasping action upon the tented bag 444a, 444b, 444.

The resilient gripper 404 may be a grasp-type gripper 404 in which each resilient member 130, 130a, 130b curls in a closing direction in response to a first direction of actuation.

Optionally, the pinching gripper 132, 132a, 132b may include opposing clamping elements. The pinching gripper 402, linear actuator 222-134, and resilient gripper 404 may be independently actuated by respective first through third actuators 332, 336, 330.

As shown in FIGS. 6B, 11C and 11D, 33, and 34 the gripper system 1000 may further include comprising a presence sensor (e.g., camera 555a in FIG. 33, or limit switch/springs 555b or 555c in FIG. 34), wherein first resilient members 130-I, comprising fewer than all available of the plurality of resilient members 130-I, 130-O, are closed in response to a first signal from the presence sensor 555a, b, or c, and second resilient members 130-O or 130-I and 130-O, comprising at least some of the plurality of resilient members 130-I not in the first set, are closed in response to a second signal from the presence sensor 555a, b, or c.

At least some of the plurality of resilient members 130, 130-I, 130-O, 130a, 130b, 132, 132a, or 132b may be one of inflatable members (FIG. 2A), cable-driven elastomeric members (FIG. 2C), or a linkage including at least one of a resilient elastomeric link or a living hinge (FIG. 2B).

As shown throughout the several Figures, the pinching gripper 402 may include pinching members or fingers 132, 132a, 132b, the pinching fingers 132, 132a, 132b being less than ½ the length of the e.g., grasping resilient members 130, 130a, 130b.

As shown in FIGS. 1-35, the gripper system 1000 may further include an extension actuator 222-134 configured to retract the pinching gripper 402 together with the pinched fold, wherein the grasp-type gripper 404 is configured to close about the retracted pinched fold. The grasp type gripper 404 may include a first set of resilient members 130-I and a second set of resilient members 130-O, and may be actuated in a first mode to close the first set of resilient members 130-I, and in a second mode to close both the first set 130-I and the second set of resilient members 130-O.

As shown in FIGS. 1-35, a gripper system 1000 for handling a bagged object 444 may include a multiform gripper tool 1000 including a pinching gripper 402 configured to form a fold in a bag 444a of the bagged object 444 and to clamp upon the fold. An actuator 222-134 and/or 206 may be configured to lift the pinching gripper 402 together with the clamped fold, and a peripheral gripper 404 may include a first set of resilient members 130-I or 130-I, 130-O arranged about the pinching gripper 402 and configured to close the resilient members 130-I/130-O about the lifted clamped fold. An actuator array 330-332-334-336/222-134 may be connected to selectively actuate one or more of the pinching gripper 402, actuator 336/222-134, or peripheral gripper 404 of the multiform tool 1000.

Optionally, the actuator array 330-332-334-336 may include a plurality of individual actuators 330, 332, 334, 336, 222-134, each connected to a respective one of the pinching gripper 402, the extension actuator 222-134, and the peripheral gripper 404 (130-I and/or 130-O). The peripheral gripper 404 may include a second set of resilient members 130-O arranged about the pinching gripper 402 and configured to close about the lifted clamped fold independently of the first set of resilient members 130-I, about the retracted clamped fold. The actuator array 330-332-334-

336 may be selectively actuated to hold the bagged object 444 by both the pinched fold and the resilient members 130-I and/or 130-O to resist the bagged object 444 slipping from the first set of resilient members 130-I and/or 130-O while the first set of resilient members 130-I and bagged object are being swung by a manipulator arm 206. The actuator 222-134 may be configured to lift the pinched fold to form a tented bag 444a over the bagged object 444b, 444, the peripheral gripper 404 closing the first set of resilient members 130-I upon the tented bag.

As shown in FIGS. 1-35, a gripper system 1000 for handling a bagged object 444 may alternatively include a pinching gripper 402 mounted to the linear actuator below the palm, the pinching gripper 402 configured to form a fold in the bagged object 444 below the palm 400a, pinch the formed fold, and to be retracted by the linear actuator 222-134 toward the palm 400a. A resilient grasper 404 may be mounted to the palm 400a and configured to grasp the bagged object 444 about the pinching gripper 402 and below the retracted formed fold, the grasper 404 having a first set of resilient members 130 separated from one another and configured to close toward the pinching gripper 402. A presence detector 555a, 555b may be carried by the gripper base 400 and configured to respond to the successful grasp of a bagged object 444 by the resilient grasper 402 below the retracted formed fold. A control circuit 120 in electrical communication with the manipulator 206 (and, e.g., detector 555a and/or 555b and/or actuators 330, 332, 334, and/or 336) may be configured to close the pinching gripper 402, retract the pinching gripper 402, close the resilient grasper 404, and in response to occlusion (or switching, or sensing) of the presence sensor 555a and/or 555b by a bagged object 444, control the manipulator 206 to maneuver the bagged object 444 from the picking location 5000 to the placing location 2108.

Systems

Figure 3B:
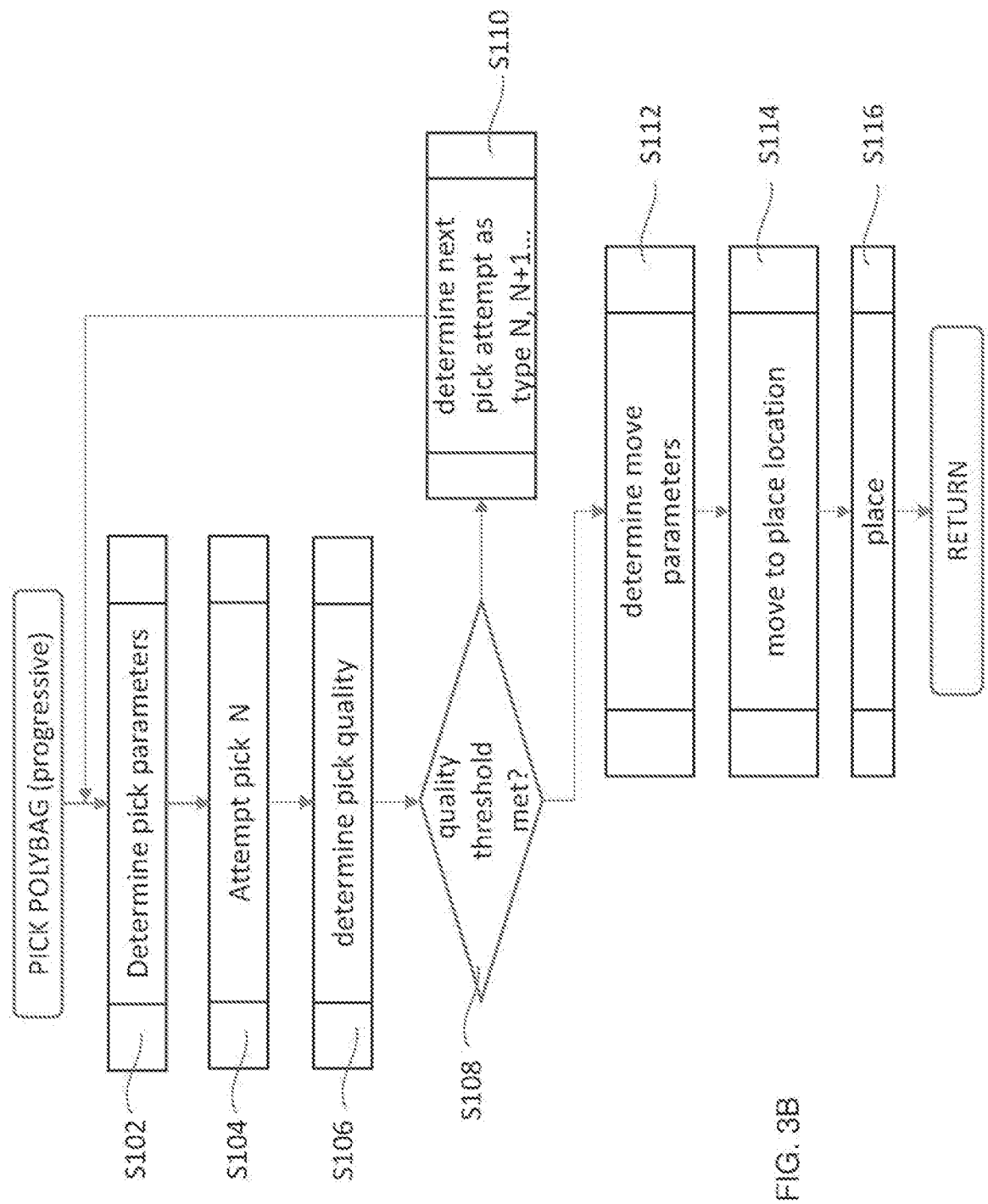
FIG. 3B is a flow chart showing steps and/or acts in a process of picking, re-picking and placing a bagged article using a system such as that in FIG. 2E or 3A.

FIG. 3A is a schematic view of a source conveyance system 5000, a manipulator-EOAT system 206/1000 integrated with a 3D (e.g., RGBD, point-cloud generating) vision and illumination system 4000, multi-side image/model capture and/or code scanning system 2000 and a destination conveyance system 3000. FIG. 3B is a flowchart showing a pick polybag 444 routine, and includes various subsidiary routines to carry out a multi-stage pick with real-time adaptation to circumstances.

As used together with the grippers 1000 discussed herein, articulated robots 206 include both industrial robots and collaborative robots. Industrial robots tend to be far faster. Due to the risk of injury from collision between a high speed robot arm and a worker, industrial robots are used with safety zones for excluding workers. Collaborative robots are slower than industrial robots, and in some cases have mechanical systems more amenable for working alongside workers.

As described herein, a variety of end-of-arm tools (EOATs) are used to pick and place different articles, and many EOATs may be used on both industrial and collaborative robots. On-line shopping and on-demand delivery require many warehouse-to-address shipments, and the restocking of items that are returned to the warehouse.

The use of standardized cardboard box sizes in these shipments causes the problem of shipping many oversized boxes, with an enclosed article much smaller than the box surrounded by with packing material or air volume. Air cargo companies may be based on a volume-based pricing model or a weight-based pricing model. This has lead to higher adoption of polybags 444a instead of boxes. Polybags 444a—robust polymer bags, envelope, flat, or gusset shaped—are often part of a minimum weight, minimum volume packaging solution.

Polybagged articles 444 are, however, notoriously difficult for conventional articulated arms and EOATs to pick and place. Especially with mixed articles, there may be many variables for a system to handle. Weights may be highly variable. The outer bag 444a—a thin plastic film of varying thickness (from roughly ¼ mil through 10 mil)—may or may not follow the inner article 444b. The inner article 444b may be soft, flexible, or odd-shaped. Many small articles 444b may be collected in one bag, or different sized articles 44b may be collected in one bag. The shape, form, or indicia of the inner article 444b may be obscured or optically distorted.

Accordingly, there are several problems to be solved to achieve fully autonomous polybag pick-and-place for polybagged articles 444, especially with varying enclosed articles 444b. For example, in recognition or targeting, a polybagged article 444 shape, outline, or perimeter is not readily recognized or categorized via computer vision when polybags 444 are randomly piled, e.g., in a bin 5002.

Additionally, many polybag assemblies 444 are not amenable to high speed slewing or swinging. For example, with an astrictive pick upon heavy articles, articles are dropped. With a rigid gripper, bags 444a or the articles 444b within may be damaged.

A soft robotic or other compliant gripper 1000 may provide a partial solution, as it may target and successively pick a variety of shapes or sizes of polybagged article 444 without a model of the target's form, and may securely slew or swing the article from station to station at high speed. The soft robotic or other compliant solution can pick and transport many polybagged articles 444, but may encounter two further problems.

A soft or compliant robotic gripper 1000 constructed to envelop an article may, on occasion, pick more than one bagged article 444. Also, a soft or compliant robotic gripper 1000 grasping an article may obscure the article 444, preventing some methods of stand-off scanning while the article 444 is grasped (e.g., remote bar code scanning via laser scanner 2000, 2004).

The present approaches solve different combinations of these problems.

In one example, a first soft robotic system 402 is used for singulating a polybagged article 444 by tenting the polybag itself 444a and/or slightly lifting the polybagged article 444 via the polybag 444a itself (generally with low-speed, low-acceleration motion). An, e.g., second soft robotic system 404 captures and/or secures the lifted, singulated article 444 for subsequent high-speed, high-acceleration slewing or swinging manipulation to a receiving or "place" station 2108.

The singulating 402 and high-speed capture 404 systems may use independent systems, and if so, the different soft robotic fingers 130, 132 may be concentric. Independent systems may include differently controlled, arranged, shaped, or type of fingers. Different automatic recognition methods are employed, often using indicia. Various kinds of 2D and 3D feature, image, shape, color, object, and/or class recognition are available, with various illumination, sensors and cameras. Bar codes are among the most common legacy recognition indicia.

In some legacy systems, and in some cases in the presently described system, bar codes are often scanned in a process in which a human operator manipulates an article 444 to a satisfactory pose, and aims a hand-held scanner at the article. Alternatively, a person may manipulate an article 444 to pass in an effective orientation through a volumetric scanner 2000 or 2004, often adapting the pose of the article 444 until the scanner 2000 or 2004 signals successful recognition. The article 444 is manipulated based on their human observation and judgment, for efficacy for a particular imaging or scanning sensor or configuration.

Manipulation by a person is the most common technique, as polybagged articles 444 are easily deformed, crumpled, etc., and indicia or codes (of various kinds, including area codes like QR codes, color codes, etc.) may be printed upon the polybag or upon one or more stickers, on side of an article. There may be more than one code to be scanned per article.

For polybagged 'soft' articles 444, such as clothing (or other soft or deformable shapes of bags or articles within, such as courier polybags, envelopes, or "flyer" polybags) the polybag 444a may tend to follow the shape of the soft article 444b. The operator may need to intervene to flatten or smooth an article 444 for scanning. The solution for the degree of dexterity and judgement necessary to pick, manipulate, scan, and place a polybagged article in a continuous operation, successfully, is usually labor, not automation.

While bar code scanners may succeed with deformed or bent bar codes (e.g., deformed shapes like crumpled or saddle-shaped), in many cases, the bar code is intended to be planar when scanned, or at least simply scans more readily when presented to the scanner in a planar form.

Pick and Place System Operation

FIG. 3B is a flowchart showing a pick polybag 444 routine, and includes various subsidiary routines to carry out a multi-stage pick with real-time adaptation to circumstances.

In step S102, pick parameters are determined. Referencing FIG. 3A (and FIG. 36A, an additional embodiment), initially one or more sensors 4000 collect information on the state of the articles to be picked. One example of a sensor 4000 would be an RGBD scanner directed vertically down to the container 5002, collecting a depth point cloud, from which a topology and/or one or more highest points of the stack or pile of articles 444 may be determined. An RGBD scanner 4000 may also provide areal luminosity and/or color information, combined with or independent from the depth information, from which target article characteristics may be determined. In subsequent steps in FIG. 3B, pick quality is examined (e.g., pick quality may mean successful or unsuccessful pick, or a metric of grasp strength, or the like), optionally with the help of the presence sensor(s) 555a, or 555b, and as shown, should the pick quality not meet the threshold, a second or third or other combination of singulating, grasping with few fingers 130-I, and grasping with radial fingers 130, 130-I, 130-O, 130a, 130b may be attempted.

In some cases, some polybag picking routines herein may perform more successfully if the article 444 picked is the highest article 444, or one of the articles 444 that is substantially topmost in the container—an unobscured article 444 from the perspective of the scanner 4000. On the other hand, this determination is difficult, and for other polybag picking routines may be unnecessary. For example, several of the routines herein may singulate and lift an article based on pinching the polybag 444a, and grasp the article 444 only after the article 444 has been separated from the pile. Others may singulate and lift based on astrictive gripping (e.g., via a vacuum cup 133a, 133b as shown in FIG. 2D).

In the case of pinching, it may not be not necessary to determine the perimeter of the article 444, a center or centroid of the article 444, or even to select an unobscured article 444. Pinching and lifting by a corner, center, or any other point may be sufficient. Articles 444 that are not pinched may simply be not lifted, or may fall back down as part of the singulation. In fact, an article 444 that falls back into the bin during singulation may repeat as the most likely next best article 444 to singulate.

It is an extension of this concept that an article 444 once pinched, lifted and dropped may be among the better candidates for a subsequent pick, in the case of a series of unsuccessful picks or other metric representing a poor success rate, a "priming" routine (not shown) may pinch, lift, and drop one or more articles 444 without transporting them.

In a case where the areal color information is used to characterize an article to be picked, different characterizations are possible. Areal color information may include blob detection information (see, e.g., https://en.wikipedia.org/wikiBlob_detection) or color patch information, such as information descriptive of a repeating pattern or article's color palette. As used herein, it may also include depth information. The areal color information may be used to, for example, characterize a perimeter or outline of an individual article 444, for example, and/or characterize a largest area, and/or a less variable diagonal span, which may tend to identify topmost articles 444, and/or article size, which may be used to determine an order of pick types (e.g., small article attempt first, large article attempt first, or priming first). Generally square-like, rectangle-like, or circle-like shapes determined by areal color information may tend to reflect less crumpled or less obscured articles. Edge, corner, or ridge detection (see, e.g., these topics in https://en.wikipedia.org/wiki/Feature_detection_(computer_vision)) upon luminosity, color, or depth information, or combinations thereof, may also be used to characterize topmost articles 444 or article size. For example, a higher rate of depth change near a perimeter of an identified blob may characterize a thicker article. For example, a higher rate of topology variation in an identified blob may characterize a looser polybag 444a about an enclosed article 444b, and a lower rate of topology variation may characterize a tighter polybag 444a about an enclosed article 444b.

One expression of a solution uses a gripper 404 that envelops or cages an article 444, crumpling and/or cradling the article 444. This may include gripper 1000 including a tenter/singulater 130, 130a, 130b, 133b, and a grasper/securer 404 for lifting and swinging articles with one or both. One way of 'singulating' is to tent and lift to singulate, then using the tented shape to secure from top, side, or bottom, crumpling either or both of the bag 444a or internal textile or cloth 444b. An articulated arm 206 may move the gripper 1000 and cradled article 444 from the pick location 5002 to the place location 2108.

Figure 36A:
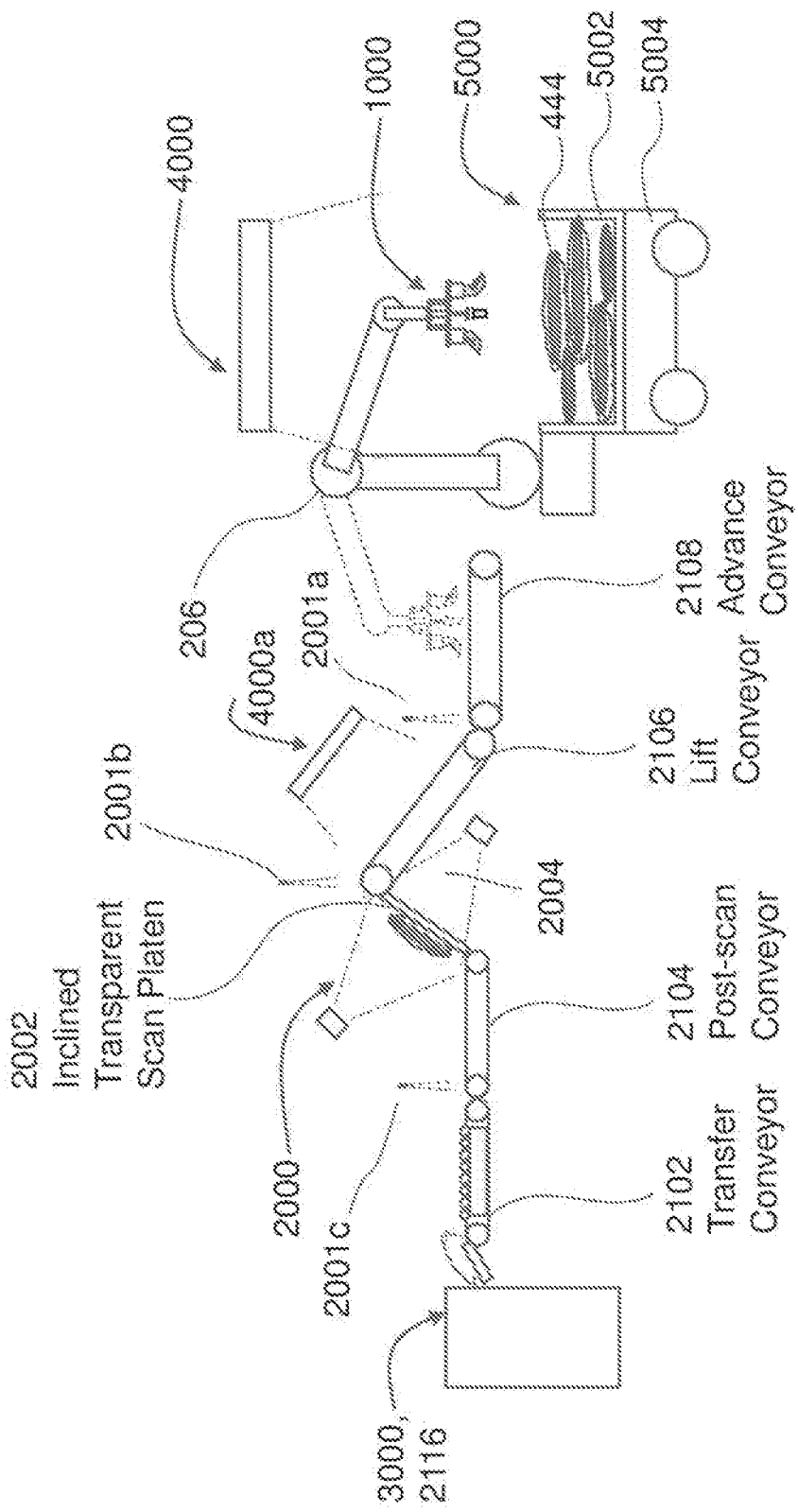
FIG. 36A is a schematic view of a source and destination conveyance systems together with a manipulator-EOAT system and code scanning system.
Figure 36B:
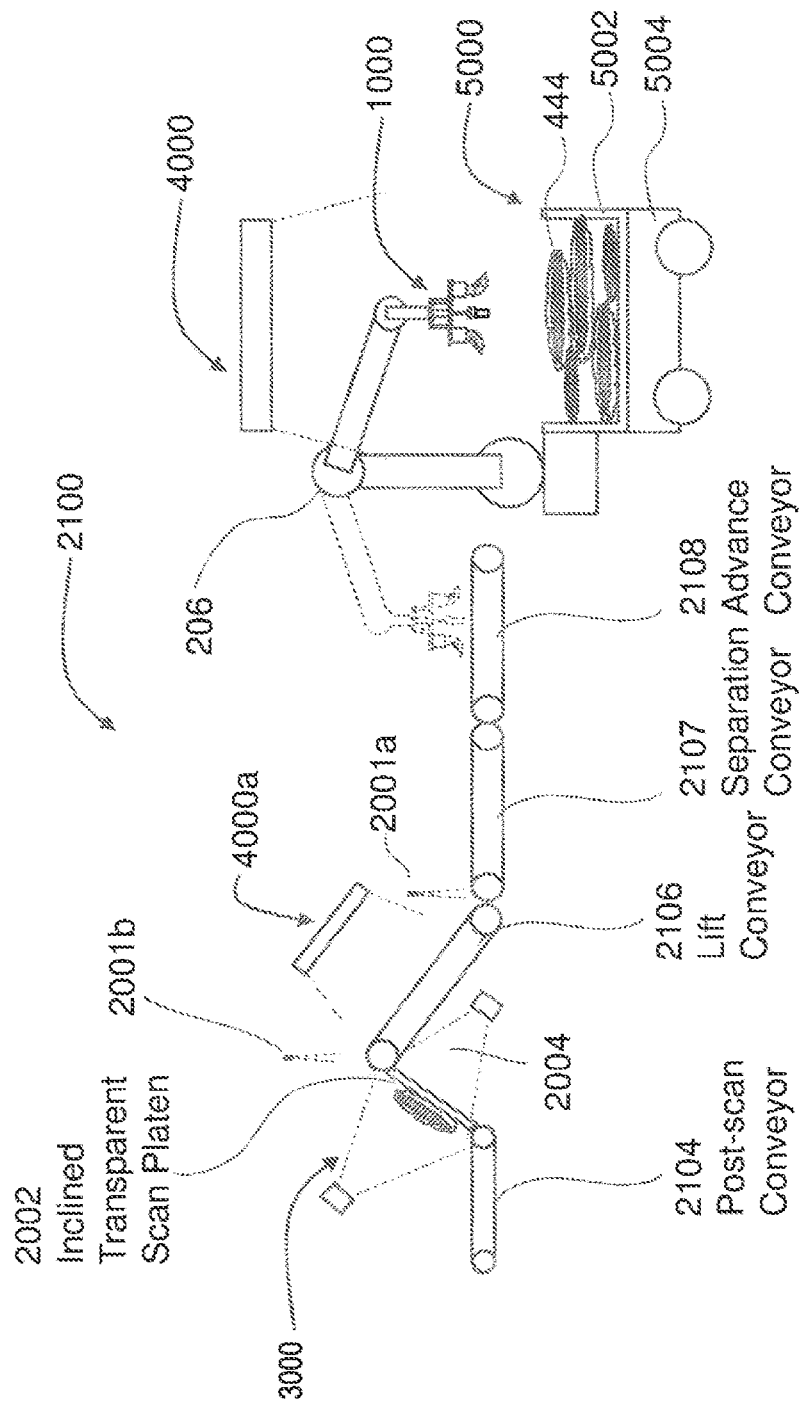
FIG. 36B is a schematic view of a source and destination conveyance systems together with a manipulator-EOAT system and code scanning system, in which an additional or alternative separation conveyor is provided.

FIGS. 36A-36B are similar to FIG. 3A, and are a schematic views of a source conveyance system 5000, a manipulator-EOAT system 206/1000 integrated with a 3D (e.g., RGBD, point-cloud generating) vision and illumination system 4000, multi-side image/model capture and/or code scanning system 2100 and a destination conveyance system 3000. In FIG. 36B, an alternative or additional separation conveyor 2107 intervenes between the advance conveyor 2108 and the lift conveyor 2106. These systems may be used together with the buffer or cache systems shown in FIGS. 37-41.

As shown in FIGS. 3A, 36A, and 36B, as well as 37-41, in order to scan, image, or recognize the article 444, a flat table 2002, transparent to the wavelengths or frequencies of an underside scanner 2004, may be provided, against which the placed article 444 flattens under gravity when placed. Alternatively, the flat table 2002 may be inclined, and the placed article slides down the table 2002 under gravity when placed. A stand-off scanning system, including at least a "top" scanner 2000 and an "underside" scanner 2004 may be aimed at both sides of the article 444—in other words, a first scanner 2000 scans the top of the article, while a second scanner 2004 aims through the flat table 2002 and scans the bottom of the article 444. Further scanners (not shown) may be placed to the sides to scan angled articles 444. A flattening mechanism may compress the article 444 for scanning, and may include a scanner-frequency-transparent plate through which a flattened article is scanned. A slider (including gravity, a push rod, or the like) may slide the article across the flat table 2002 after scanning.

One of the addressable common failure modes with autonomous picking of mixed polybagged articles 444, including clothing or other textile items, is a double or triple pick when a singulation attempt is made. These tend to occur with thin items (e.g., a t-shirt 444a in a bag 444b), and less with thicker items (e.g., a folded bulky sweater 444a in a bag 444b).

Figure 36C:
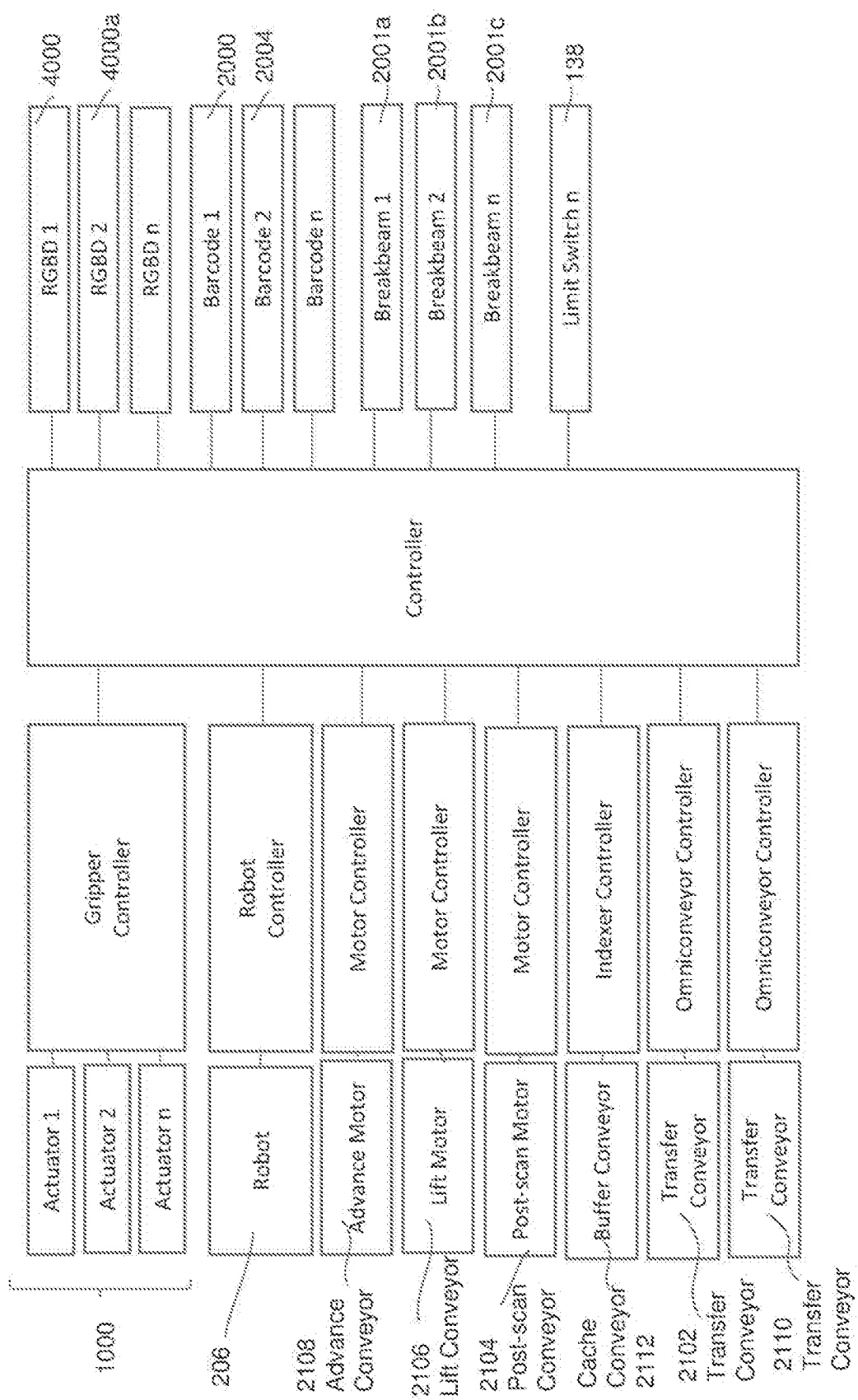
FIG. 36C is a block diagram of electronic systems and structures corresponding to FIGS. 36A and/or 36B.

FIG. 36C is a block diagram schematically showing sensor, actuator, and control systems of FIG. 36A or 36B. Each motor, actuator or robot is connected to a corresponding controller and to a general purpose controller, and each sensor is connected to the general purpose controller.

Figure 36E:
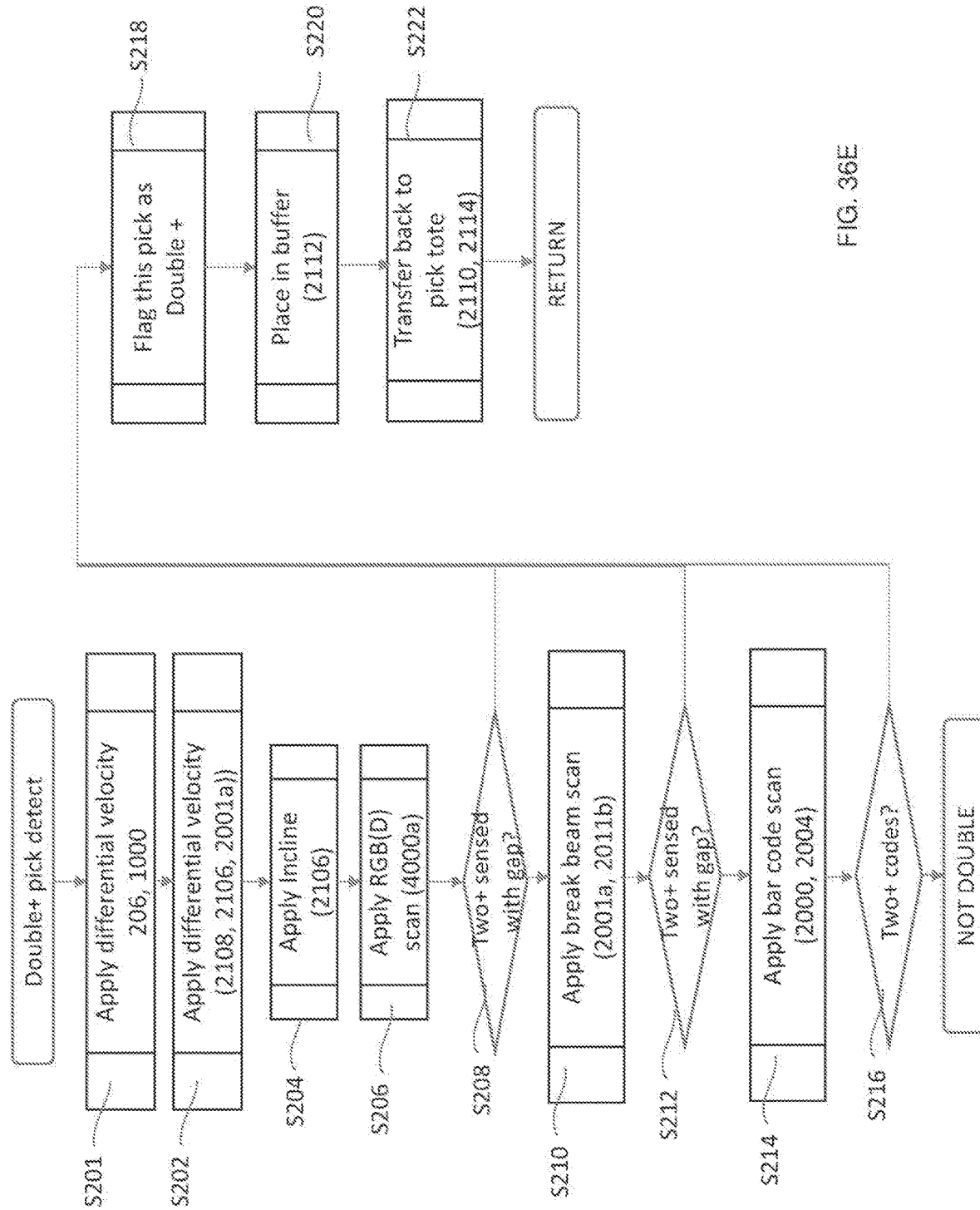

FIGS. 36D and 36E are flow charts schematically showing a double pick or more (e.g., 2, or 3, or more, although 2 is most frequent) detection routine, with three optional double item detection processes, described with reference to FIGS. 36A-36C. Much of FIGS. 36A through 36E is independent of the use of a tenting or multimode gripper to pick polybagged articles—i.e., the systems for detection of double or more picks can be independent of the picking system, and useful whether the rate of double picks is high or low. FIG. 36E includes an additional or alternative differential speed application in comparison to FIG. 36D.

As shown in FIGS. 36D and 36E, before applying a visual or sensor-based double detection, it is effective to use adjacent mechanical systems to separate polybags. One example would be to apply a differential speed or velocity to the bottom of the bagged article being advanced, e.g., by the two adjacent conveyors 2108 (advance) and 2106 (lift) of FIG. 36A. In one approach of step S202, a break beam or other occupancy sensor 2001a is placed at the terminal end of the advance conveyor 2108, or a timer may be used in addition or the alternative. When it is estimated or detected that a bagged article 444 has been advanced to a position where the advance conveyor 2108 abuts the lift conveyor 2106, the advance conveyor is temporarily stopped or frozen (or optionally quickly reversed), and the lift conveyor continues forward or is started forward. If two piled or adjacent bagged articles are at the abutment, then the forward article tends to advance, while the rearward article tends to remain in place.

In the alternative shown in FIG. 36B, an additional or alternative separation conveyor may be used to apply an additional differential velocity. In this case, additional or alternative advancing, accelerating, stopping or reversing— each an application of differential velocity—at the interfaces between neighboring conveyors 2106, 2107, and 2108 may be used to separate two or more articles from one another along the path. With respect to FIG. 36D, two or more subsequent or parallel steps S202 may be used for such additional application of differential velocity and separation.

In the alternative shown in FIG. 36B, an additional or alternative separation mechanism may be used to apply an additional differential velocity. In this case, the manipulator arm 206 continues to swing for a brief period of time (e.g., 0.05-0.5 seconds) after the multiform gripper 1000 is opened. As a result, if two or more bagged articles had been picked, they are flung, launched, or released laterally in slightly different directions and/or slightly different speeds, and tend to separate from one another. A hopper or guiding wall may be used to direct the launched articles to the advance conveyor 2108. "Place" as used herein to describe delivering a bagged article to the advance conveyor 2108 includes such launching as well as firm placement or drop placement.

In addition, another mechanical system that tends to separate polybagged articles is to advance the polybagged article up an incline, e.g., the lift conveyor 2106, as in step S204. If two articles are stacked or adjacent, they may tend to slide apart or tumble back at different rates upon the inclined lift conveyor 2106. The amount of incline is between 20 degrees and 60 degrees, e.g., 30 degrees. More incline will tend to cause more separation, but more incline also increases the tendency of articles to fall all the way back to the advance conveyor.

In step S206, after or optionally during the application of the separating incline in step S204, an RGB or RGBD camera may be used to scan for two or more articles. If using RGB, sufficient white (e.g., for a white conveyor surface) space between two detected non-white blobs may signify two articles adjacent to one another, but separated. Using an RGBD camera, sufficient flat space between two detected non-flat objects may signify the same. The color blob/white space and object/flat detection may be used together. As shown, in step S208, should two bagged articles be detected, then the current pick being advanced along the scan lane 6002 is flagged as a double+ pick in step S218, and after being advanced along the scan lane 6002, is transferred to the buffer 2112 in step S220, and at an appropriate timing, is transferred back into the box or tote 2114, 5002 by the transfer omniconveyor 2110.

This detection is sufficient, without a break beam scan or bar code scan, such that the bagged article should be recirculated back into the tote bin. However, as the article moves along the 6002, additional detections may be performed to double-, triple-, or further check for double+ picks.

In step S210, a break beam scan is checked. This break beam may be located at a location immediately adjacent the abutment of the advance and lift conveyor 2108, 2016 2001a, between the lift conveyor and the scan platen 2001b, or immediately before the transfer conveyor 2001c, or all these locations. It should also be noted that this step S210 does not necessarily follow or precede step S206 or step S214, and may be performed before, during, or after other detections, or in more than one location along the scan lane 6002. The break beam is, e.g., an infrared beam emitter/detector and/or retroreflector extending across the conveyor, and two interruptions of the beam as noted in step S212 may signify a double+ pick of adjacent articles along the scan lane 6002, resulting in the same double pick remediation through stems S218, S220, S222 as previously described.

In step S214, a bar code scan is checked, in the case when each bagged item has a SKU or other barcode upon it sensed by the standoff bar code scanners 2000, 2004. If two different bar codes are detected in step S216, this again results in the same double pick remediation through stems S218, S220, S222 as previously described.

In steps S202-S222, at least two different types of double pick scans are performed along the scan lane to provide redundancy and the benefits of sensor fusion. Additional detections may be used (e.g. sonar, electrical detection of capacitance or inductance, limit switches, "feeler" switches, and the like.

Returning to methods and systems for singulating and securing articles, when using a tenter 402 as described herein to form a tent in the bag above the article 444, thin light things may sometimes be lifted by the tenter or singulator 402 alone without bunching, with a lesser chance of the double pick, and then slewed at high speed by the arm 206 without being crumpled or cradled.

Thinner, yet heavier bagged articles 444 may benefit from having a surface tenter or singulator 402 to singulate them without a double-pinch, then may be crumpled and/or cradled for high-speed slewing. In some implementations, the control system 120 may assume an article 444 is thin and light, then attempt a strategy based upon this assumption, and may switch to a strategy for thin but heavier articles 444, or bulky articles 444, using a presence sensor 555b or a weight sensor 555a to detect success or failure and move on to the next strategy accordingly.

As noted, some articles within polybags 444 may be gently lifted by the bag 444a itself, if sufficient lifting can be achieved without damaging the bag 444a. In this case, in some cases, despite a successful singulation, subsequently rapidly manipulating or transporting the lifted polybag assembly 444 through space in a rapid pick-and-place motion is difficult, if to be performed without damaging the bag nor dropping the polybagged article 444.

Lifting a polybag 444 may occasionally be achieved with vacuum cups 133b or other astrictive approach, but not necessarily with sufficient purchase to transport the polybagged article 444 intact, quickly, and reliably across an unpredictable variety of thin, thick, loose, tight, porous, air-tight, or other bags 444a.

One gripper system 1000 capable of operating in this manner may include an interface 400 capable of mounting to a manipulator 206. It may include a grasp-type gripper 404 and a singulating gripper 402. The grasp-type gripper 404, including a palm 400a, may be supported by the mechanical interface 400 and enveloping resilient members 130, 130a, 130b, 130-I, 130-O may extend from the palm 400a, and be actuatable by a first actuator 330 to grasp an object 444 adjacent the palm 400a. The singulating gripper 402 may include a gripper 402 retractable toward the palm 400a and actuatable by a second actuator 332 to singulate an object by seizing an object 444 and retracting the object 444 within the enveloping resilient members 130, 130a, 130b, 130-I, 130-O and to a location adjacent the palm 400. An actuator control system 120 may be operatively connected to the first and second actuators 330, 332, that sequentially commands the second actuator 332 to singulate the object 444 and the first actuator 330 to grasp the singulated object 444 adjacent the palm 400a.

The singulating gripper 402 may be a pinching gripper 402 fixed upon a retracting mechanism 222-134 to be retractable toward the palm 400a, the pinching gripper 402 including pinching clamping elements 132, 132a, 132b, the pinching gripper 402 being actuatable by a second actuator 332 to tent the bag 444a above the object 444b by first pinching a fold of the bag 444a between the pinching clamping elements 132, 132a, 132b then retracting the pinched fold of the bag 444a toward the palm 400a.

In another combination, the gripper system 1000 for handling an article 444a within a bag 444 may include a grasp-type gripper 404 including a plurality of resilient members 130, 130a, 130b, 130-I, 130-O, the resilient members actuatable by a first actuator 330 to perform a grasping action. The gripper system 1000 may also include a pinching gripper 402 including pinching clamping elements 132, 132a, 132b, the pinching gripper 402 being actuatable by a second actuator 332 to tent the bag 444a above the article 444b by first pinching a fold of the bag 444a between the pinching clamping elements 132, 132a, 132b then clamping the pinched fold of the bag 444a while the pinching gripper 402 is lifted. An actuator control system 120 operatively connected to the first and second actuators, 330, 332 that sequentially commands the second actuator 332 to tent the bag 444a above the article 444b 330 and the first actuator to perform the grasping action upon the tented bag 444.

A method for robotically manipulating a bagged object 444 may include locating, within a container, a bagged object 444 including an article 444b 444a within a bag, then pinching the bag 444a with a pinching gripper 402 to form a pinched fold. Following steps may include lifting the bag 444a by the pinched fold to form a tented bag 444a above the article 444b (e.g., by the actuator 222-134, and/or by the manipulator arm 206), then grasping the tented bag and article together 444 to secure the bagged object 444. Subsequent steps may include transporting the bagged object 444 from the container 5002 to a placing location 2108, and placing the bagged article object 444 at the placing location 2108.

In another expression of a method for robotically manipulating a series of bagged objects 444, each including an article 444b enclosed within a bag 444a, the method may include locating a selected bagged object 444 in a container 5002 holding a plurality of bagged objects 444, and pinching the bag of the selected bagged object 444 with a pinching gripper 402 to form a pinched fold. Following steps may include lifting the bag 444a by the pinched fold to form a tented bag 444a above the enclosed article 444b, and grasping the tented bag 444a and enclosed article 444b together to secure the selected bagged object 444. Subsequent steps may include transporting the selected bagged object 444 from the container 5002 to a placing location 2108, placing the selected bagged object 444 at the placing location 2108, and recirculating the selected bagged object (e.g., using the caching indexing conveyor 2112 shown in FIG. 37A and/or the three or four-way omnidirectional transfer conveyor 2110 shown in in FIG. 37A) and transporting the selected bagged object 444 from the placing location (in this case, the placing location including not merely the advance conveyor 2108, but the advance conveyor 2108 and scanning lane 6002) back to a container (e.g., container 5002).

One example of a picking system for picking and placing an article 444b within a bag 444a from a container 5002 to a placing location 2108 or 6002 may include a grasp-type gripper 404, the grasp-type gripper 404 including a plurality of resilient members 130, 130a, 130b, 130-I, 130-O actuatable by an actuator array 330-332-334-336 to perform a grasping action. A pinching gripper 402 may be mounted to move together with the grasp-type gripper 404, the pinching gripper 402 actuatable by the actuator array 330-332-334-336 to tent the bag 444a above the article 444b by first pinching a fold of the bag 444a between the pinching clamping elements 132, 132a, 132b then clamping the pinched fold of the bag 444a while the pinching gripper 402 is lifted. A gripping control system 120 may command the actuator array 330-332-334-336 to tent the bag 444a above the object 444b and to perform the grasping action upon the tented bag 444 adjacent the palm 400a to pick the article and the bag together 444 from the container 5002 as an object 444. A manipulator 206 may carry the grasp-type gripper 404 that transports the objects 444 from the container 5002 to a placing location 2108 or 6002, and a recirculation conveyor 2112 or 6004 may transport a portion of the objects transported to the placing location 2108 or 6002 back to a container 5002 from which the objects 444 are picked.

The gripper system 1000, as noted, may include an interface 400 capable of mounting to a manipulator 206, and a grasp-type gripper 404, including a palm 400a supported by the mechanical interface 400 and enveloping resilient members 130, 130a, 130b, 130-I, 130-O extending from the palm 400a and actuatable by a first actuator 330 to grasp an object 444 adjacent the palm 400a. The object 444 may be brought adjacent the palm by the action of a singulating gripper 402 including a gripper 402 or 133a-133b retractable (e.g., via actuator 222-134) toward the palm 400a and actuatable by a second actuator 332 to singulate an object 444 by seizing an object 444 and retracting the object 444 within the enveloping resilient members 130, 130a, 130b, 130-I, 130-O and adjacent the palm 400a. An actuator control system 120 may be operatively connected to the first and second actuators 330, 332, that sequentially commands the second actuator 332 to singulate the object 444 and move it adjacent the palm 400a, and the first actuator 330 to grasp the singulated object 444.

The resilient members 130, 130b, 130-I, 130-O may be—if, for example, in soft robotic form, having substantially biomimetic form—e.g., fingers, limbs, appendages, tentacles, webbing. The resilient members may also be non-biomimetic form 130a, such as linkages, chains, telescoping shafts, jointed shafts, and yet be formed with resilient materials. A resilient member 130, 130-I, 130-O may include a flexible or elastic elongate body that defines a sealed void which can be pressurized or depressurized relative to the environment surrounding the resilient member 130, 130-I, 130-O. The resilient members 130, 130-I, 130-O may undergo a fixed displacement absent interaction with a workpiece 444 (e.g. a reduction or increase in the radius of curvature, or a linear displacement of a distal end of the member or finger 130, 130-I, 130-O relative to the proximal end), and may have a continuously variable, non-stepwise dynamic range. The resistance of the finger or member 130, 130-I, 130-O to changing curvature may have a controlled functional relationship to applied pressure or vacuum (linear, exponential, logarithmic, sinusoidal, etc.) and this functional relationship may be intentionally varied at different locations within the finger or member 130, 130-I, 130-O. A periodic "accordion" shaped face may oppose a flat face to uniform bending and linear strain response. The resilient member 130, 130-I, 130-O is also able to actuate in reverse in response to decreased internal pressure.

The singulating gripper 402 may include a distal clamping element 132, 132a, 132b. The distal clamping element 132, 132a, 132b may include several fingers opposing one another or radially arranged for large or heavy objects, and may employ more than one size of finger 132, 132a, 132b. This gripper 402 may singulate before grasping 404, may use the retraction to singulate, and may use distal or "fingertip" pinching (e.g., precision grasp) instead of mid phalangeal clamping or power grasping.

The grasp-type gripper 404 may be adaptive, asymmetrical and/or conformal, and may uses the palm in "power grasping". The fingers 130, 130a, 130b, 130-I, 130-O of the grasp-type gripper may be inflatable and/or multi joint or mechanically interrelated.

The combination gripping system may pinch, may use radially arranged fingers to quickly slew or large or heavy objects, and may have more than one size of finger 130, 130a, 130b, 130-I, 130-O, 132, 132a, 132b. It may pinch to separate/singulate before grasping, may use retract to separate/singulate, and may use tip clamping instead of side clamping for singulation.

A robotic cell for handling a bagged object (having an article enclosed within a bag) may include a 3D scanner (e.g., RGBD) 4000 aimed at a picking area 5002 including stacked bagged objects 444 and collecting height data from the picking area 5002, operatively connected to a processor (within or connected to scanner 4000) identifying height peaks among the stacked bagged objects 444 and within the picking area 5002. It may include a pinching gripper 402 capable of clamping a pinched fold of a bag 444 at a height peak, and a linear actuator 222-134 capable of retracting the pinching gripper 402 clamped upon the pinched fold to form a tented bag 444a above the article 444b, as well as a peripheral gripper 404 including a plurality of resilient members 130, 130a, 130b, 130-I, 130-O surrounding the pinching gripper 402, the peripheral gripper 404 positioned to be capable of closing the resilient members 130, 130a, 130b, 130-I, 130-O upon the tented bag 444. A manipulator 206 may support the pinching gripper 402, linear actuator 222-134, and peripheral gripper 404.

As shown throughout the drawings, e.g., FIGS. 36A and 36C, a gripper system 1000 for handling a bagged object 5002, the bagged object 444 having an article 444b enclosed within a bag 444a, may include the pinching gripper 402 configured to clamp a pinched fold in the bag 444a, a linear actuator 222-134 configured to retract the pinching gripper 402 and clamped pinched fold to form a tented bag 444a above the article 444b; and a resilient gripper 404 including a plurality of resilient members 130, 130a, 130b, 130-I, 130-O located about the pinching gripper 402a, the peripheral gripper 404 configured to close the resilient members 130, 130a, 130b, 130-I, 130-O upon the tented bag 404.

The resilient gripper 404 may be a grasp-type gripper in which each resilient member 130, 130a, 130b, 130-I, 130-O curls in a closing direction in response to a first direction of actuation.

Robotic Cells Including Double Pick Detection and Remediation

FIGS. 36A and 36B show schematic views of a robot system including a scanning component 2000, 2004 and conveyance for scanning 6002.

Figure 37A:
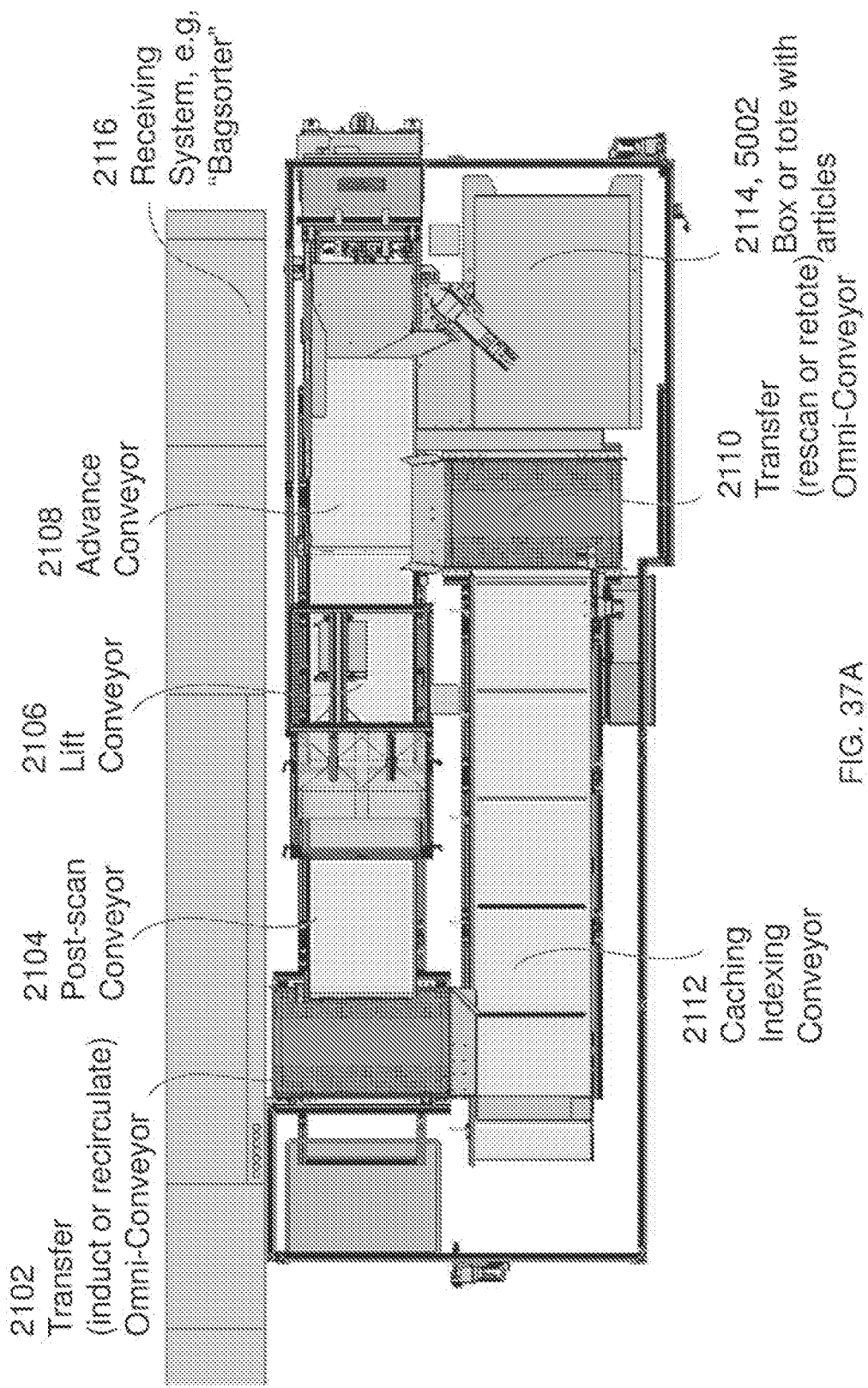
FIG. 37A is a top schematic view of the exemplary systems of FIG. 36A or 36B together with a buffering, caching, and/or indexing conveyor and transfer omni-conveyors.
Figure 37B:
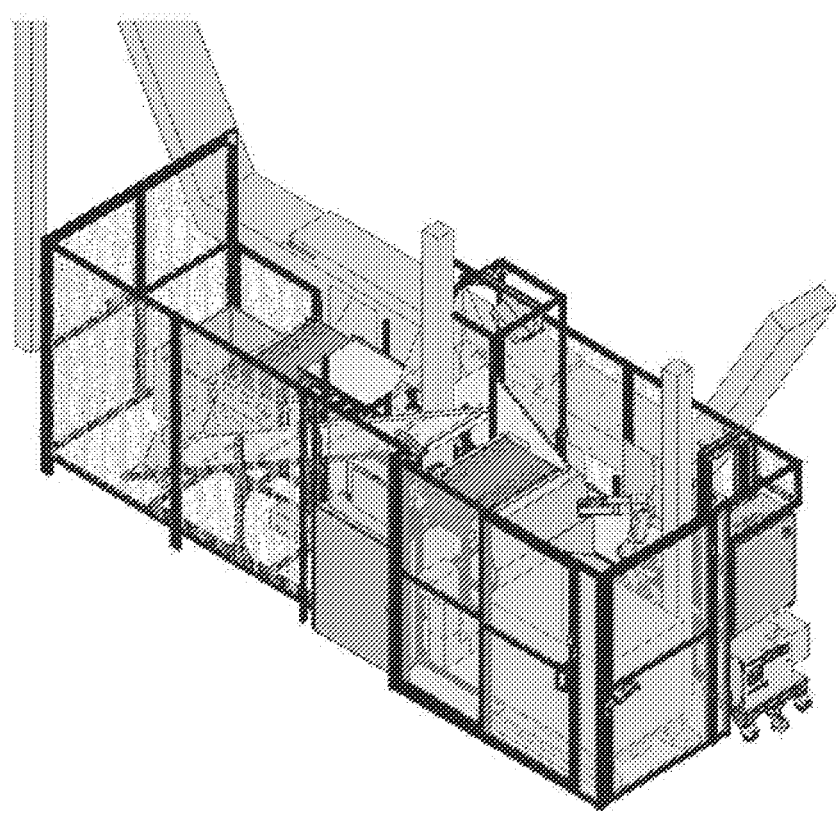
FIG. 37B is a perspective view of the exemplary systems of FIG. 36A or 36B together with a buffering, caching, and/or indexing conveyor and transfer omni-conveyors.

FIG. 37A is a top schematic view of the exemplary systems of FIG. 36A or 36B together with a buffering, caching, and/or indexing conveyor and transfer omni-conveyors, and FIG. 37B is a perspective view of the exemplary systems of FIG. 36A or 36B together with a buffering, caching, and/or indexing conveyor and transfer omni-conveyors.

In FIG. 36A, the structure of the pick, place, and scanning lanes of the system is shown. A robot arm 206 mounts a multiform gripper 1000 as disclosed herein. The robot arm 206 is located adjacent a container 5000 of articles 444, which may be a box or tote 5002, which may be carried by an autonomous vehicle 5004. The robot arm 206 may be mounted to the autonomous vehicle 5004. In one example, the cycle time of the robot arm to secure an article 444, swing it to the placement area, and swing back may be about 6-12 seconds, e.g., 9 seconds.

As described herein, the robot arm 206 and multiform gripper 1000 may pick a bagged object 444 from the box 5002, and place it on an advance conveyor 2108. The advance conveyor 2108 serves the purpose of a placement location, and also is long enough to include a zone where articles may be routed onto it, ideally other than in the placement location (e.g., to allow recirculated articles to be injected back to be scanned without interfering with the robot arm 206 operations). The advance conveyor may take 0.2-0.8 seconds to advance an item, e.g., 0.5 seconds.

The advance conveyor 2108 may advance the article 444 to a lift conveyor 2106 which lifts the article 444 up an incline (in order to be dropped for scanning). A second RGBD scanner 4000a may be placed facing the lift conveyor 2106 in order to identify double or triple articles 444 dropped by the multiform tool 1000. The lift conveyor may take 0.2-0.8 seconds to lift an item, e.g., 0.5 seconds.

The lift conveyor 2106 forces the articles 444 over a "cliff" to drop along the inclined transparent scan platen 2002. Scanners 2000, 2004, (e.g., bar code scanners) scan both sides of the article 444 (one from the top, and one through the transparent scan platen 2002). The article 444 is picked up by and moved along by a post-scan conveyor 2104. The scanning and post-scan conveyor may take 0.2-0.8 seconds, e.g., 0.5 seconds).

The post-scan conveyor 2104 moves the article 444 to a transfer conveyor 2102, which is, for example, an omnidirectional conveyor capable of routing items in 4 directions. According to the result of the scan at the scanners 2000, 2004, and in some cases the double-pick detection of the RGBD scanner, the controller 120 controls the transfer conveyor 2102 to advance successfully scanned items to induction, e.g., into a receiving system 2114, 3000. The transfer conveyor 2102 may send unsuccessfully scanned items into the buffer lane 6004. Optionally, the transfer conveyor 2102 may send multiple-fail items that have failed a plurality of recirculation attempts to a discard bin.

As shown in FIG. 37A, the buffer lane 6004 may include an inclined caching or indexing conveyor 2112, which maintains a plurality of locations for items being recirculated and the controller 120 keeps track of their disposition. The indexing conveyor 2112 outputs to another transfer conveyor. Articles 444 that are to be rescanned are routed back to the advance conveyor in a time period when the advance conveyor is not occupied by an item moved by the robot arm 206 from the box or tote 2114, 5002. Articles that may be multiples (doubles) or otherwise may benefit from re-manipulation may be routed back into the box or tote 2114, 5002.

Operation of the Robotic Cells

FIGS. 38 through 41 show this system together with a recirculation conveyor 6004 for routing scanned articles to a next station (e.g., bag sorter 2116), or to be rescanned, or back into a tote or box 2114, 5002 to be re-picked. Each of FIGS. 38 through 41 is in two parts—the upper portion is a schematic representation of the robot and conveyance systems for reference, and the lower portion is a timeline of a particular operation and occupied stations or zones as well as transfers between stations or zones. Below the representation of the system and its zones and conveyance times, each of FIGS. 38 through 41 show exemplary routing and a timeline of successfully scanned or failed scan articles transitioning between four zones—the "Arm/EOAT" zone in which the robot arm and gripper pick, handle, and place the bagged object, and also must swing to return back to the tote or bin to pick a new object; the "placement" zone 2108 in which the bagged object 444 is placed on a conveyor to be routed to the scanners 2000, 2004 (and to which a bagged object 444 may be routed when the arm/EOAT is swinging back to the bin without a grasped article); a scan lane 6002 for scanning; and a buffer lane 6004 for holding articles waiting to be rescanned. The "placement" or drop zone representing the conveyance location to which bagged articles are placed, dropped, or launched, and the "buffer lane" represents the caching, buffering, and/or indexing conveyor. Each zone tends to be occupied or unoccupied, although the buffer lane has a register or stack of locations to occupy. When a zone is unoccupied, a bagged article may be delivered there.

Figure 38:
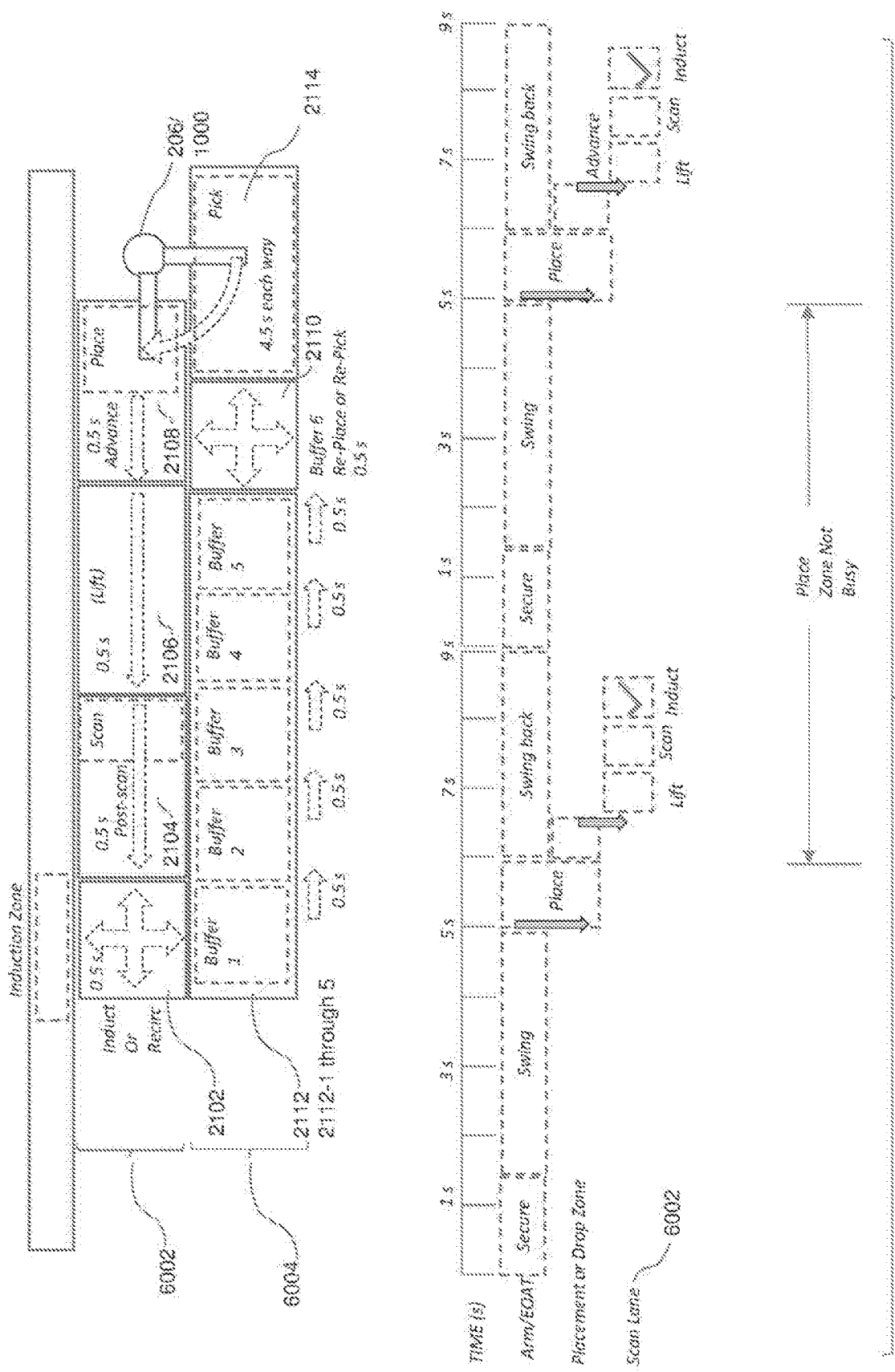
FIG. 38 shows a combined schematic including a view of the robotic cell and peripherals combined with a transfer timeline for an exemplary operation of two succeeding successful scan-and-induct operations.
Figure 39:
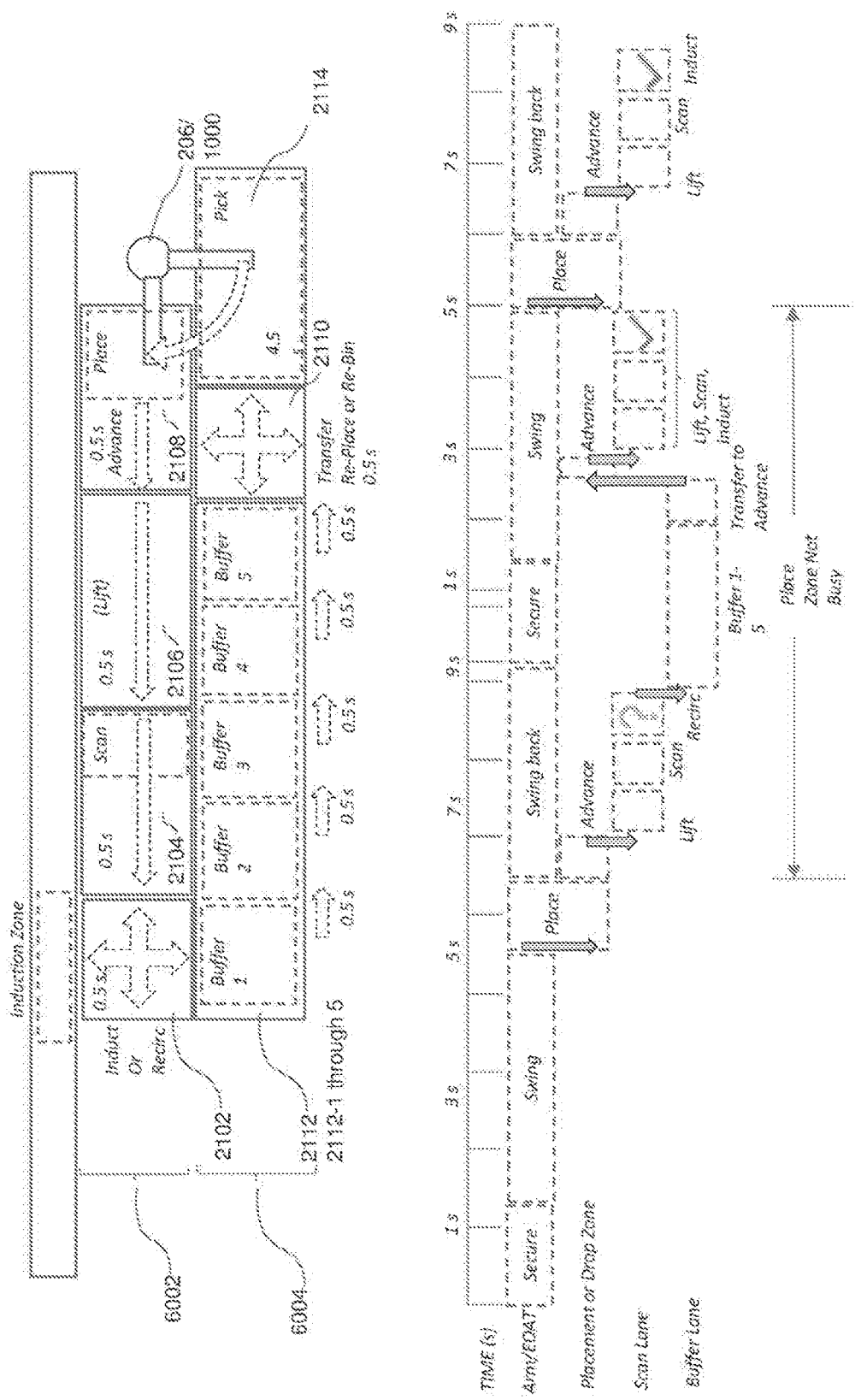
FIG. 39 shows a combined schematic similar to FIG. 38 an exemplary operation of recirculating and rescanning a previously failed scan while the robot arm is otherwise occupied.
Figure 40:
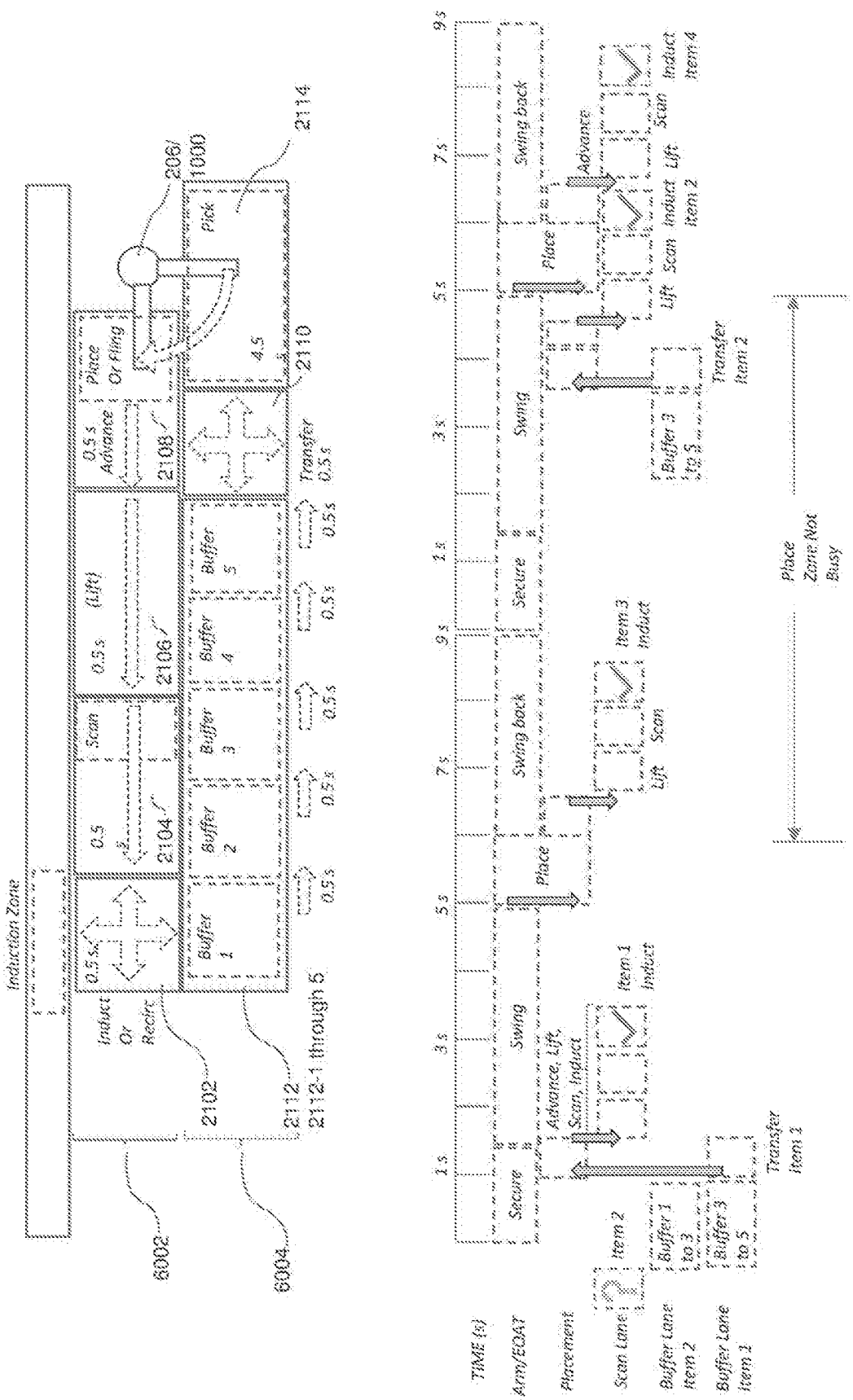
FIG. 40 shows a combined schematic similar to FIG. 38 for an exemplary operation of managing previously unscanned articles in the buffer lane together with ongoing new inductions.
Figure 41:
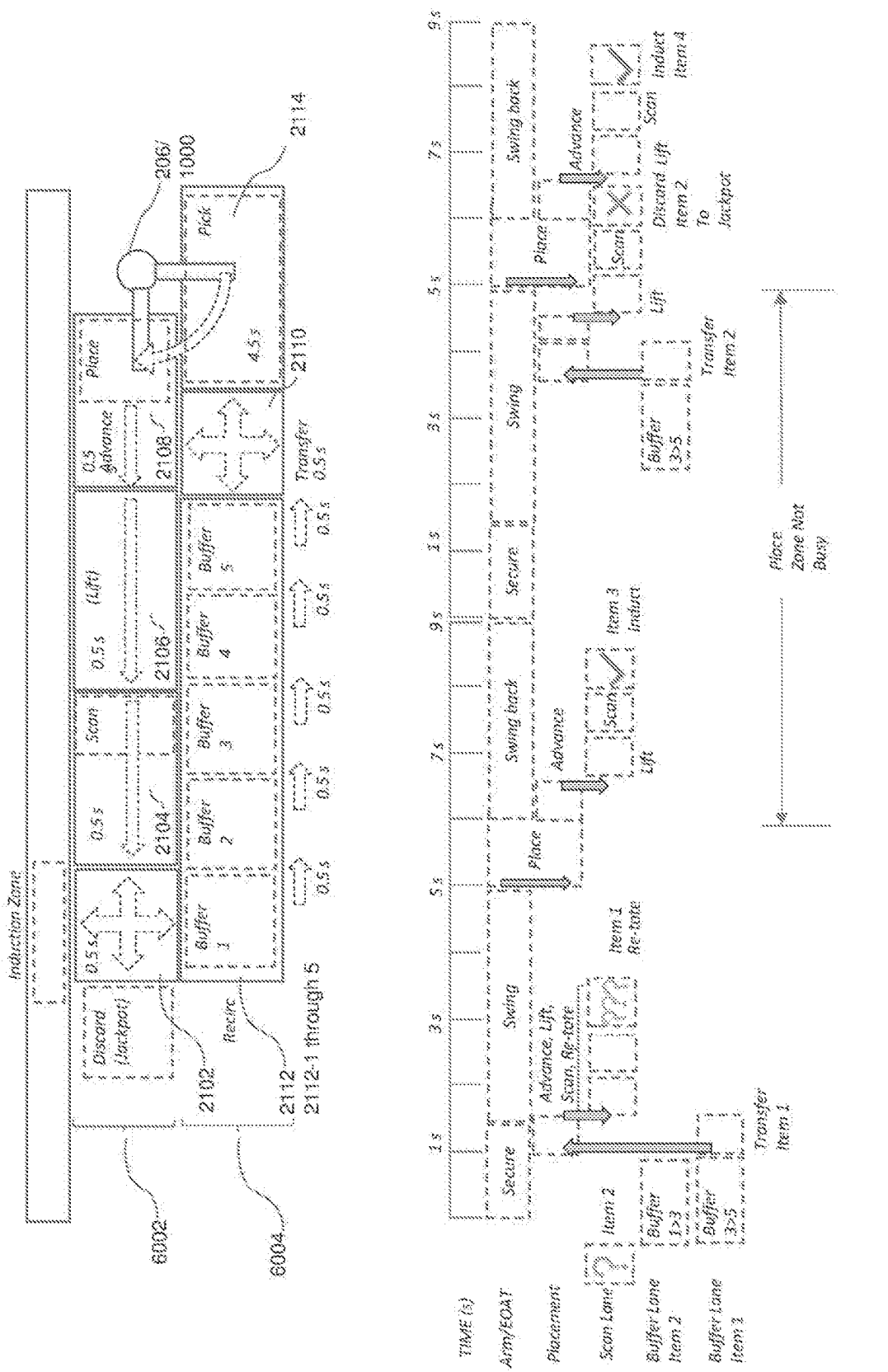
FIG. 41 shows a combined schematic similar to FIG. 38 for an exemplary operation of returning one payload to the original tote or bin to be repicked, and a payload deemed unsuitable for retrying routed to a jackpot (for later processing, in most cases by a person).

FIG. 38 shows two subsequent bagged articles successfully scanned and inducted into the receiving conveyance system; FIG. 39 shows a failed scan recirculated and rescanned while a subsequent pick and place operation is ongoing; FIG. 40 shows buffer lane and rescanning management in which two previous payloads were found unsuitable for induction; and FIG. 41 shows a payload returned to the original tote or bin to be repicked, and a payload deemed unsuitable for retrying routed to a jackpot bin.

As shown in FIGS. 38-41, a timeline depicts repeated "Arm/EOAT" cycles, approximately 9 seconds per cycle in this example, of Secure (e.g., pinch and grasp an article 444), Swing (e.g., swing the arm 206 to the placement or drop zone), Place (e.g., drop the article 444), and Swing Back (e.g., swing the arm 206 back to the box or tote 2114). In this cycle, the place zone and advance conveyor 2108 are usually not occupied, e.g., only for about 0.5-1 seconds of e.g., 9 seconds.

A parallel timeline depicts Placement and advance, so as to illustrate avoidance of conflict in the placement or drop zone, and the advance conveyor 2018.

A third timeline is depicted as the scan lane 6002, and includes Advance (the item moving along the conveyor 2108 for 0.2-0.8, e.g., 0.5 seconds) Lift (the item moving along the lift conveyor 2106 for 0.2-0.8, e.g., 0.5 seconds) Scan (the item being dropped along the inclined plate, scanned by the scanners 2000, 2004, and being moved along the post-scan conveyor 2104 for 0.2-0.8, e.g., 0.5 seconds), and Induct/Recirculate (the item being transferred either to induction or to the recirculation lane 6004, for 0.2-0.8, e.g., 0.5 seconds).

As shown in FIGS. 36-41, a bagged object handling robot may include a grasper 404 having a plurality of resilient members 130, 130a, 130b, 130-I, 130-O, a presence sensor (4000, 555a, and/or 555b), and a control system 120 operatively connected to the presence detector and to the grasper 404. The control system 120 may be configured to monitor the presence sensor for a response to a bagged object 444 within the grasper 404, and to change the operation of the robot from a lighter object grasping mode in which the grasper 404 closes fewer than all available resilient fingers (e.g., 130-I) upon a bagged object 444 to a heavier object grasping mode in which the grasper closes all available resilient members (e.g., 130-I and 130-O) upon a bagged object 444 depending upon the response of the presence sensor to the bagged object 444 in the lighter object grasping mode.

The robot may include the pinching gripper 402, configured to clamp a pinched fold in a bag 444a of the bagged object, the grasper 402 closing resilient members 130, 130a, 130b, 130-I, 130-O about the pinched fold and upon the bagged object 444. In this case, the pinched fold may be lifted to form a tented bag 444a over the bagged object 444b, the grasper 404 closing resilient members upon the tented bag 444. A retracting actuator 222-134 may be configured to retract the pinching gripper 402 toward the grasper 404 to lift the pinched fold. The bagged object 444 may be held by both the pinched fold and the resilient members 130, 130a, 130b, 130-I, and/or 130-O to resist the bagged object slipping from the grasper 404 while the grasper 404 and bagged object 444 are being swung by a manipulator arm 206.

The robot may include a depth camera 4000 (e.g., see FIG. 36) that provides a signal including a location of a peaked portion of the bagged object 444, wherein the pinched fold is formed via the pinching gripper 402 substantially at the location of the peaked portion. Each resilient member 130, 130a, 130b, 130-I, 130-O may curl in a closing direction in response to a first direction of actuation.

As shown in FIGS. 1-41, a method for picking, placing, and scanning may include locating, within a container 5002, a bagged object including an article 444b within a bag 444a, pinching the bag 444a with a pinching gripper 402 to form a pinched fold, then lifting the bag 444a by the pinched fold to form a tented bag 444a above the article 444b. Following steps may include closing a first set of resilient members 130, 130a, 130b, 130-I, 130-O upon both the tented bag 444a and article 444b to secure the bagged object 444, transporting the bagged object 444 from the container 5002 to a placing location 2108 or 6002, and placing the bagged object at the placing location 2108 or 6002.

Subsequent steps may include retracting the pinching gripper 402 together with the clamped fold toward a base 400 of the resilient members 130-I, and optionally closing a second set of resilient members 130-O, proximate to but separate from the first set of resilient members 130-O, upon both the tented bag and article to secure the bagged object 444. Other subsequent steps may include closing the first set of resilient members 130-I in response to a first signal from a presence sensor (4000, 555a, and/or 555b), and closing both the first set and the second set of resilient members 130-I and 130-O in response to a second signal from the presence sensor (the second signal may be the absence of the first signal). Additional steps may include monitoring the presence sensor for a response to a bagged object 444 within the grasper 402, and changing the operation of the robot from a lighter object grasping mode in which the grasper closes fewer than all available resilient fingers 130-I upon a bagged object to a heavier object grasping mode in which the grasper closes all available resilient members 130-I and 130-O upon a bagged object depending upon the response of the presence sensor to the bagged object in the lighter object grasping mode. Further steps may include curling each resilient member 130-I or 130-O in a closing direction in response to a first direction of actuation; holding the bagged object 444 by both the pinched fold and the resilient members to resist the bagged object 444 slipping from the resilient members while the resilient members and bagged object are being swung by a manipulator arm 206; or monitoring a depth camera 4000 for a signal including a location of a peaked portion of the bagged object 444, then optionally forming the pinched fold via the pinching gripper 402 substantially at the location of the peaked portion.

As shown in FIGS. 1-41, a bagged object picking robot may include a manipulator 206, a palm 400a movable by the manipulator 206, a linear actuator 222-134 mounted to the palm 400a and configured to extend from and retract toward the palm 400a, and a pinching gripper 402 mounted to the linear actuator below the palm, the pinching gripper 402 configured to form a fold in the bagged object below the palm 400a, pinch the formed fold, and to be retracted by the linear actuator 222-134 toward the palm. A resilient grasper 404 may be mounted to the palm and configured to grasp the bagged object about the pinching gripper 402 and below the retracted formed fold, the grasper 404 having a first set of resilient members 130, 130a, 130b, 130-I, 130-O separated from one another configured to close toward the pinching gripper 402. A presence detector 4000, 555a, 555b may be carried by the gripper base 400 and configured to respond to the successful grasp of a of a bagged object 444 by the resilient grasper below the retracted formed fold. A control circuit may be in electrical communication with the manipulator 206 and configured to close the pinching gripper 402, retract the pinching gripper 402, close the resilient grasper 404, and in response to occlusion (or switching, or sensing) of the presence sensor 4000, 555a, and/or 555b by a bagged object 444, control the manipulator 206 to maneuver the bagged object 444 from the picking location 2114 or 5002 to the placing location 2108 or 6002.

As shown in FIGS. 1-41, a method for the same techniques discussed herein may include locating a bagged object 444, the bagged object including a bag 444a enclosing an article 444b, forming a pinched fold in the bag with a multiform gripper 1000, and lifting the pinched fold with the multiform gripper 1000 to form a tented bag above the article. Subsequent steps may include closing first resilient members 130, 130a, 130b, 130-I, and/or 130-O of the multiform gripper upon the tented bag to secure the bagged object 444, wherein the bag 444a remains substantially tented above the article 444b during the closing of the first resilient members 130, 130a, 130b, 130-I, 130-O, wherein the securing includes holding the bag by the pinched fold and by the resilient members 130, 130a, 130b, 130-I, 130-O, and wherein the securing resists the bagged object 444 slipping from the multiform gripper 1000 while the multiform gripper 1000 and bagged object are being swung by a manipulator arm 206.

As shown in FIGS. 1-41, a method for handling bagged objects in containers may include identifying, via a height scanner 4000, a peaked portion of a bagged object within one of the containers 2114 or 5002, the bagged object including an article 444b within a bag 444a, and forming and pinching, via a pinching gripper 402, a pinched fold in the bag substantially at the location of the peaked portion. Following steps may include tenting, via the pinching gripper 402, the bag above the article by lifting the pinched fold; grasping, via a grasping gripper 404 the tented bag and article together by closing resilient members 130, 130a, 130b, 130-I, and/or 130-O upon the tented bag while the pinched fold remains pinched by the pinching gripper 402; and/or transporting, via a manipulator 206, the bagged object from the container 2114 or 5002 to a placing location 2108 or 6002 and placing the bagged object. Subsequent steps may include scanning, via a standoff bar code scanner 2000 and/or 2004, the bagged object 444 so placed; and recirculating (e.g., via recirculating conveyor 2112 or buffer lane 6004) a portion of scanned bagged objects 444 from the placing location 6002 to one of the containers 2114, 5002 (or another container, such as a discard container) from which the bagged objects are handled.

Additional steps may include manipulating the bagged object 444 so placed at the placing location such that different surfaces of the bagged object 444 are made available for scanning by the standoff bar code scanner 2000, 2004; and rescanning the manipulated object 444.

As shown in FIGS. 1-41, a method for handling bagged objects 444 in containers 5002 may include performing a pick and place cycle completing in a first cycle time (e.g., as shown in FIG. 38, a cycle time of Secure, Swing, Place, and Swing Back activities for the manipulator arm 206 and EOAT 1000), each pick and place cycle including picking a bagged object 444 from a pile in a container (e.g., securing the object 444) and placing the bagged object 444 in a drop zone (e.g., swinging the object and placing the object in placement zone 2108), in which the drop zone 2108 is occupied with the bagged object 444 for a first interval (e.g., the Place activity interval) but is unoccupied for a second interval (e.g., the Swing Back, Secure, and Swing activities interval); and performing a scanning cycle completing in a second cycle time (e.g., as shown in FIG. 38, the Advance, Lift, Scan, and Induct/Recirculate activities interval). Each scanning cycle conveys the bagged object 444 from the drop zone 2108 through a scan station 2000-2004 and flags the bagged object as one of a recognized or an unrecognized article (e.g., a successful or unsuccessful bar code scan). Additional steps may include performing a recirculation cycle completing in a third cycle time (e.g., as shown in FIG. 39, a Buffer 1-5 and Transfer to Advance activities cycle), each recirculation cycle conveying the bagged object 444, if flagged as an unrecognized article, back to the drop zone 2108.

The second cycle time (e.g., the Advance, Lift, Scan, and Induct/Recirculate activities cycle) and the third cycle time (e.g., the Buffer 1-5 and Transfer to Advance activities cycle) may complete together in less time than the second interval of the first cycle time, so that the bagged object 444 flagged as an unrecognized article may be recirculated and rescanned during a subsequent pick and place cycle, in the second interval of the first cycle time, in which the drop zone 2108 is unoccupied.

Optionally, the conveying of the recirculation cycle may further include holding the bagged object 444 in a buffer station 2112 for a third interval longer than the first cycle time, so that so that a bagged object 444 flagged as an unrecognized article may be held in the buffer zone 2112 and rescanned during any subsequent pick and place cycle in which the drop zone 2108 is unoccupied.

Further optionally, the conveying of the recirculation cycle may further include holding the bagged object 444 in a plurality of buffer stations 2112-1, -2, -3, -4, -5, so that a plurality of bagged objects 444 flagged as unrecognized articles may be held in the plurality of buffer stations 2112-1, -2, -3, -4, -5 and each rescanned during a selected subsequent pick and place cycle in which the drop zone 2108 is unoccupied.

As shown in FIGS. 1-41, a method for handling bagged objects 444 in containers 5002, may include performing a pick and place cycle, completing in a first cycle time, each pick and place cycle including picking a capture (e.g., one, two, or more bagged objects 444) from bagged objects 444 in a pile and placing the capture in a drop zone 2108, in which the drop zone 2108 is occupied with the capture for a first interval but is unoccupied for a second interval, and performing a scanning cycle completing in a second cycle time, each scanning cycle conveying the capture from the drop zone 2108 through a scan station 2104 and flagging the capture as one of a singulated bagged object 444 or a unsingulated plurality of bagged objects 444×n. Additional steps may include performing a recirculation cycle completing in a third cycle time, each recirculation cycle conveying the capture, if flagged as an unsingulated plurality of bagged objects 444, back to the pile in the container 5002, wherein the second cycle time and the third cycle time complete together in less time than the second interval of the first cycle time, so that the capture flagged as an unsingulated plurality of bagged objects 444 may be repicked and rescanned during a subsequent pick and place cycle, in the second interval of the first cycle time, in which the drop zone 2108 is unoccupied.

As shown in FIGS. 1-41, a method for handling bagged objects 444 in containers 5002, may include performing a pick and place cycle including: gripping a bagged object 444 at a pick station, swinging a robotic manipulator arm 206 bearing the bagged object 444, placing the bagged object 444 in a drop (or placement) zone 2108, and swinging the robotic manipulator arm 444 back to the pick station 2114. The drop (or placement) zone 2108 is occupied with the bagged object 444 for a first interval of the pick and place cycle but is unoccupied for a second interval of the pick and place cycle. An additional step may include performing a scanning and recirculation cycle, each scanning and recirculation cycle conveying the bagged object 444 from the drop zone 2108 through a scan station 2104 and conveying unrecognized bagged objects 444 back to the drop zone 2108. The scanning and recirculation cycle may complete in less time than the second interval of the pick and place cycle, so that each unrecognized bagged object 444 may be recirculated and rescanned during a subsequent pick and place cycle in which the drop zone 2108 is unoccupied but in which the robotic manipulator arm 206 and the multiform gripper 1000 are at least in part occupied.

Optionally in each example above, manipulating may include recirculating a portion of scanned bagged objects 444 from the placing location 2108 to one of the containers 5002 from which the bagged objects 444 are handled. Manipulating may include rearranging the pose of the bagged object 444 at the placing location 2108. Optionally in each example above, expanding/contracting bellows side of members or flexible (e.g., deformable, bendable, elastic, and/or stretchable) elongate bodies may use sinusoidal geometries.

As shown in FIGS. 1-41, a method for handling bagged objects 444 in containers 5002 may include attempting to scan the first bagged object 444, swinging the first bagged object 444 with the robot manipulator arm 206 from the tote 5002, 2114 toward a drop zone 2108, delivering the first bagged object 444 to a drop zone 2108, and swinging the robot manipulator arm 206 back toward the tote. Following steps may include conveying the bagged object 444 through a code scanning station 2104; receiving a second bagged object 444 delivered by a robotic manipulator arm 206; scanning the bagged object 444 as it is conveyed through the code scanning station 2104; and manipulating unsuccessfully scanned bagged objects 444 to present different poses to the code scanning station 2104. In this case, as well as throughout this specification, "swinging" may include articulated arm, cartesian, SCARA, or delta robotic motion as appropriate.

As shown in FIGS. 1-41, a method for handling bagged objects 444 in containers 5002 may include receiving a bagged object 444 delivered by a robotic gripper 1000 to a drop zone 2108 of a conveyor; conveying the bagged object 444 through a code scanning station 2104; scanning the bagged object 444 as it is conveyed through the code scanning station 2104; and manipulating unsuccessfully scanned bagged objects 444 to present different poses to the code scanning station 2104. In this case, as well as throughout this specification, "containers" may-include box-like, barrel-like, or tube-like forms as well as flat forms like pallets or trays.

As shown in FIGS. 1-41, a method for handling bagged objects from a supply or container 5002, 2114, may include identifying a peaked portion among a plurality of bagged objects 444. A pinched fold may be formed and pinched substantially at the location of the peaked portion, and a grasp formed about the pinched fold while the pinched fold remains pinched. Any bagged objects 444 (e.g., in a single or multiple capture of bagged objects 444) within the grasp may be transported to a drop zone 2108. From the drop zone 2108, bagged objects 444 may be separated from one another by tugging a leading bagged object 444 with a faster conveyance (e.g., separation conveyor 2107 and/or lift conveyor 2106) while a trailing bagged object 444 lags restrained by a slower conveyance (e.g., advance conveyor). For separated bagged objects 444, a detector (e.g., break beam, vision, camera, bar code scanner) may detect that more than one bagged object 555 is conveyed from the drop zone 2108. In such a case, the bagged objects 444 may be recirculated to a supply 5002, 2114 (either the original supply or another one) from which bagged objects 444 are handled.

Optionally bagged objects 444 within the grasp may be swung to a drop zone 2108, and the grasped fold and pinched fold may be released before the swinging has stopped to lend different velocities to any bagged objects 444 within the grasp, to thereby separate any bagged objects 444 at the drop zone 2018.

Also as shown in FIGS. 1-41, a method for handling bagged objects from a supply or container 5002, 2114, may include identifying a peaked portion among a plurality of bagged objects 444. A pinched fold may be formed and pinched substantially at the location of the peaked portion, and a grasp formed about the pinched fold while the pinched fold remains pinched. Any bagged objects 444 (e.g., in a single or multiple capture of bagged objects 444) within the grasp may be swung to a drop zone 2108. The grasped fold and pinched fold may be released before the swinging has stopped to lend different velocities to any bagged objects 444 within the grasp, to thereby separate any bagged objects 444 at the drop zone 2018. For separated bagged objects 444, a detector (e.g., break beam, vision, camera, bar code scanner) may detect that more than one bagged object 555 is conveyed from the drop zone 2108. In such a case, the bagged objects 444 may be recirculated to a supply 5002, 2114 (either the original supply or another one) from which bagged objects 444 are handled.

Certain Definitions

Some language used herein is consistent with language employed in "ISO 14539:2000 —Manipulating industrial robots—Object handling with grasp-type grippers—Vocabulary and presentation of characteristics" (e.g., https://www.iso.org/obp/ui/#iso: std: iso: 14539: ed-1: v1:en) and/or "NIST Special Publication 1229—Proposed Standard Terminology for Robotic Hands and Associated Performance Metrics" (e.g., https://doi.org/10.6028/NIST.SP.1229-draft), each incorporated herein by reference in its entirety. However, the use of terms of art from these publications should be considered illustrative and descriptive, not limiting. In many cases, these standards documents simply do not consider the physics and operation of soft robotics grippers, and the terminology is unnecessarily limiting. However, in some cases the use of standards-based terminology can help explain concepts of operation.

End effector: may be the device at the end of a robotic arm, designed to interact with the environment, and/or may be the last link (or endpoint) of the robot. At an endpoint, tools may be attached; or, the end effector may itself act as a tool. An end effector may include one or both of a gripper or a tool.

Gripper: an end of arm gripper tends to hold, lift, transport and/or manipulate objects. Tool: An end of arm tool may change a characteristic of the work object rather than gripping or holding it. Tool functions may include welding or fusing, spraying, dispensing, milling, screw or nut driving, flattening, cutting, and combinations of these.

Impactive end effector: grasping a work object by direct impact, including holding friction, e.g., jaws, claws, grippers.

Ingressive end effector: penetrating the work object, e.g., with needles, pins, or hackles.

Astrictive end effector: holding a work object by essentially attractive or field forces, e.g., such as Bernoulli lift, suction force, vacuum force, magnetic, electrostatic, van der Waals', ultrasonic standing waves, laser tweezing.

Contigutive holding a work object by essentially adhesive forces, e.g., via capillary action, glue, surface tension, freezing, chemical reaction.

Soft robotic gripper members may be formed of elastomeric materials, such as rubber, and/or thin walls of plastic arranged in an accordion structure that is configured to unfold, stretch, and/or bend under pressure, or other suitable relatively soft materials. Soft robotic gripper members may include a channel and/or hollow interior that can be filled with a fluid, such as air, water, or saline to pressurize, inflate, and/or actuate the gripper member. Upon actuation, the shape or profile of the gripper member changes by, e.g., variably curving, curling, including in opposing directions, or straightening. Alternatively or in addition, the gripper member may be actuated using a vacuum to remove inflation fluid from the gripper member and thereby change the degree to which the gripper member bends, twists, and/or extends.

Actuation may also allow the gripper member(s) to exert a force on a workpiece, such as a workpiece being grasped or pushed, as well as partially or fully conforming to the shape of the workpiece being grasped. Soft robotic gripper members can also harmlessly deflect upon collision with workpieces or the work environment.

General Notes on Terminology

"In one embodiment", "in an embodiment", "in some examples" or the like means "in at least one embodiment", not necessarily all referring to the same embodiment, and usable together in any combination in various embodiments. This description should not to be interpreted as reflecting an intention that the claimed embodiments require more features than are expressly recited in each claim. Rather, as the following claims reflect, inventive subject matter lies in less than all features of a single disclosed embodiment.

What is claimed is:

1. A gripper system for handling a bagged object, the bagged object having an article enclosed within a bag, comprising:
a pinching gripper configured to clamp a pinched fold in the bag;
a linear actuator configured to retract the pinching gripper and clamped pinched fold to form a tented bag above the article; and
a resilient gripper including a plurality of resilient members located about the pinching gripper, the peripheral gripper configured to close the resilient members upon the tented bag, wherein the resilient gripper is a grasping gripper in which each resilient member curls in a closing direction in response to a first direction of actuation.

2. The gripper system according to claim 1, wherein the pinching gripper includes opposing clamping elements.

3. The gripper system according to claim 1, wherein the pinching gripper, linear actuator, and resilient gripper are independently actuated by respective first through third actuators.

4. The gripper system according to claim 1, further comprising a presence sensor, wherein first resilient members, comprising a subset of the plurality of resilient members of the resilient gripper, are closed in response to a first signal from the presence sensor, and second resilient members, comprising at least some of the plurality of resilient members not in the subset, are closed in response to a second signal from the presence sensor.

5. The gripper system according to claim 1, wherein at least some of the plurality of resilient members are one of inflatable members, cable-driven elastomeric members, or a linkage including at least one of a resilient elastomeric link or a living hinge.

6. The gripper system according to claim 1, wherein the pinching gripper includes pinching members, and the pinching fingers are less than ½ the length of the resilient members.

7. A gripper system for handling a bagged object, comprising:
a grasping gripper including a plurality of resilient members, the resilient members actuatable by a first actuator to perform a grasping action;
a pinching gripper including opposing clamping elements, the pinching gripper being actuatable by a second actuator to form a tented bag in the bagged object by forming a pinched fold between the clamping elements, clamping the pinched fold, and lifting the pinching gripper; and
an actuator control system operatively connected to the first and second actuators, that sequentially commands the second actuator to form the tented bag and the first actuator to perform the grasping action upon the tented bag.

8. The gripper system according to claim 7, further comprising:
an extension actuator configured to retract the pinching gripper together with the pinched fold, wherein the grasping gripper is configured to close about the retracted pinched fold.

9. The gripper system according to claim 7, wherein the grasping gripper includes a first set of resilient members and a second set of resilient members, and is actuated in a first mode to close the first set of resilient members, and in a second mode to close both the first set and the second set of resilient members.

10. The gripper system according to claim 9, further comprising a presence sensor, wherein the first set of resilient members are closed in response to a first signal from the presence sensor, and both the first set and the second set of resilient members are closed in response to a second signal from the presence sensor.

11. The gripper system according to claim 7, wherein the bag remains substantially tented above the article during the grasping action, the bag is held by both the pinched fold and the resilient members to resist the bagged object slipping from the gripper system while the gripper system and bagged object are being swung by a manipulator arm.

12. The gripper system according to claim 7, wherein each resilient member curls in a closing direction in response to a first direction of actuation.

13. The gripper system according to claim 7, wherein the pinching gripper includes pinching members, and the pinching fingers are less than ½ the length of the resilient members.

14. The gripper system according to claim 7, wherein at least some of the plurality of resilient members are one of inflatable members, cable-driven elastomeric members, or a linkage including at least one of a resilient elastomeric link or a living hinge.

15. The bagged object handling robot according to claim 7, wherein each resilient member curls in a closing direction in response to a first direction of actuation.

16. A bagged object handling robot comprising:
a grasper having a plurality of resilient members;
a presence sensor; and
a control system operatively connected to the presence detector and to the grasper, wherein the control system is configured to monitor the presence sensor for a response to a bagged object within the grasper, and to change the operation of the robot from a lighter object grasping mode in which the grasper closes a subset of the resilient fingers of the grasper upon a bagged object to a heavier object grasping mode in which the grasper closes all of the plurality of resilient members of the grasper upon a bagged object depending upon the response of the presence sensor to the bagged object in the lighter object grasping mode.

17. The bagged object handling robot according to claim 16, further comprising:
a pinching gripper configured to clamp a pinched fold in a bag of the bagged object, the grasper closing resilient members about the pinched fold and upon the bagged object.

18. The bagged object handling robot according to claim 17, the pinched fold being lifted form a tented bag over the bagged object, the grasper closing resilient members upon the tented bag.

19. The bagged object handling robot according to claim 18, further comprising a retracting actuator configured to retract the pinching gripper toward the grasper to lift the pinched fold.

20. The bagged object handling robot according to claim 17, wherein the bagged object is held by both the pinched fold and the resilient members to resist the bagged object slipping from the grasper while the grasper and bagged object are being swung by a manipulator arm.

21. The bagged object handling robot according to claim 17, further comprising a depth camera that provides a signal including a location of a peaked portion of the bagged object, wherein the pinched fold is formed via the pinching gripper substantially at the location of the peaked portion.

22. A gripper system for handling a bagged object, comprising:
a multiform gripper tool including:
a pinching gripper configured to form a fold in a bag of the bagged object and to clamp upon the fold,
an actuator configured to lift the pinching gripper together with the clamped fold, and
a peripheral gripper including a first set of resilient members arranged about the
pinching gripper and configured to close the resilient members about the lifted clamped fold; and an actuator array connected to selectively actuate one or more of the pinching gripper, actuator, or peripheral gripper of the multiform tool.

23. The gripper system according to claim 22, the actuator array comprising a plurality of individual actuators, each connected to a respective one of the pinching gripper, the extension actuator, and the peripheral gripper.

24. The gripper system according to claim 22, wherein the peripheral gripper includes a second set of resilient members arranged about the pinching gripper and configured to close about the lifted clamped fold independently of the first set of resilient members, about the retracted clamped fold.

25. The gripper system according to claim 22, wherein the actuator array is selectively actuated to hold the bagged object by both the pinched fold and the resilient members to resist the bagged object slipping from the first set of resilient members while the first set of resilient members and bagged object are being swung by a manipulator arm.

26. The gripper system according to claim 22, wherein the actuator is configured to lift the pinched fold to form a tented bag over the bagged object, the peripheral gripper closing the first set of resilient members upon the tented bag.

27. A gripper system for handling a bagged object, comprising:
    a pinching gripper mounted to a linear actuator below a palm, the pinching gripper configured to form a fold in the bagged object below the palm, pinch the formed fold, and to be retracted by the linear actuator toward the palm;
    a resilient grasper mounted to the palm and configured to grasp the bagged object about the pinching gripper and below the retracted formed fold, the grasper having a first set of resilient members separated from one another configured to close toward the pinching gripper;
    a presence detector carried by the gripper base and configured to respond to the successful grasp of a of a bagged object by the resilient grasper below the retracted formed fold; and
    a control circuit in electrical communication with the manipulator and configured to close the pinching gripper, retract the pinching gripper, close the resilient grasper, and in response to occlusion of the presence sensor by a bagged object, control the manipulator to maneuver the bagged object from the picking location to the placing location.

28. A bagged object picking robot, comprising
    a manipulator;
    a palm movable by the manipulator;
    a linear actuator mounted to the palm and configured to extend from and retract toward the palm;
    a pinching gripper mounted to the linear actuator below the palm, the pinching gripper configured to form a fold in the bagged object below the palm, pinch the formed fold, and to be retracted by the linear actuator toward the palm;
    a resilient grasper mounted to the palm and configured to grasp the bagged object about the pinching gripper and below the retracted formed fold, the grasper having a first set of resilient members separated from one another configured to close toward the pinching gripper;
    a presence detector carried by the gripper base and configured to respond to the successful grasp of a of a bagged object by the resilient grasper below the retracted formed fold; and
    a control circuit in electrical communication with the manipulator and configured to close the pinching gripper, retract the pinching gripper, close the resilient grasper, and in response to occlusion of the presence sensor by a bagged object, control the manipulator to maneuver the bagged object from the picking location to the placing location.

29. A gripper suitable for picking polybagged articles, comprising:
    a gripper carriage;
    a tenting tool supported by the gripper carriage, the tenting tool capable of pinching a thin article in a folded state between at least two compliant fingers; and
    a perimeter gripper supported by the gripper carriage, the perimeter gripper capable of gathering a thin article in a folded state among at least three compliant fingers surrounding the tenting tool.

30. An automated robotic system for picking polybagged articles, comprising:
    a controller;
    a multi-axis robotic arm;
    a gripper carriage secured as an end-of-arm tool to the robotic arm;
    a tenting tool supported by the gripper carriage, the tenting tool capable of pinching a thin article in a folded state between at least two compliant fingers; and
    a perimeter gripper supported by the gripper carriage, the perimeter gripper capable of gathering a thin article in a folded state among at least three compliant fingers surrounding the tenting tool.

* * * * *

UNITED STATES PATENT AND TRADEMARK OFFICE
CERTIFICATE OF CORRECTION

| | |
|---|---|
| PATENT NO. | : 11,738,893 B2 |
| APPLICATION NO. | : 16/863071 |
| DATED | : August 29, 2023 |
| INVENTOR(S) | : Jeffrey Curhan et al. |

It is certified that error appears in the above-identified patent and that said Letters Patent is hereby corrected as shown below:

In the Claims

At Column 47, Claim 27, Line 37, replace: "configured to respond to the successful grasp of a of a" with --configured to respond to the successful grasp of a--

Signed and Sealed this
Tenth Day of October, 2023

Katherine Kelly Vidal
*Director of the United States Patent and Trademark Office*